US011146599B1

(12) United States Patent
Jackson et al.

(10) Patent No.: US 11,146,599 B1
(45) Date of Patent: Oct. 12, 2021

(54) DATA STREAM PROCESSING TO FACILITATE CONFERENCING BASED ON PROTOCOLS

(71) Applicant: C/HCA, Inc., Nashville, TN (US)

(72) Inventors: Edmund Jackson, Nashville, TN (US);
Cody Hall, Nashville, TN (US);
William Gregg, Nashville, TN (US);
Jim Jirjis, Nashville, TN (US);
William Rice, Nashville, TN (US);
Warren Sadler, Nashville, TN (US);
Igor Ges, Nashville, TN (US);
Annabaker Garber, Nashville, TN (US)

(73) Assignee: C/HCA, Inc., Nashville, TN (US)

( * ) Notice: Subject to any disclaimer, the term of this patent is extended or adjusted under 35 U.S.C. 154(b) by 0 days.

(21) Appl. No.: 16/782,042

(22) Filed: Feb. 4, 2020

Related U.S. Application Data

(60) Provisional application No. 62/800,990, filed on Feb. 4, 2019.

(51) Int. Cl.
*H04L 29/06* (2006.01)
*H04L 12/26* (2006.01)
*H04L 12/24* (2006.01)

(52) U.S. Cl.
CPC ........ *H04L 65/403* (2013.01); *H04L 41/0816* (2013.01); *H04L 43/08* (2013.01); *H04L 65/1003* (2013.01)

(58) Field of Classification Search
CPC .............................. H04L 51/02; H04L 65/403
See application file for complete search history.

(56) References Cited

U.S. PATENT DOCUMENTS

| 7,013,326 | B1* | 3/2006 | Suzuki | H04L 12/1813 709/203 |
| 7,603,413 | B1* | 10/2009 | Herold | G06Q 10/10 709/204 |
| 2008/0269625 | A1* | 10/2008 | Halperin | A61B 5/6892 600/508 |
| 2014/0372522 | A1* | 12/2014 | Orona | G16H 40/63 709/204 |

(Continued)

*Primary Examiner* — Andrew C Georgandellis
(74) *Attorney, Agent, or Firm* — Kilpatrick Townsend & Stockton, LLP

(57) ABSTRACT

Systems, methods, and machine-readable storage media for processing data streams in accordance with protocols to selectively transmit content to endpoint devices to facilitate conferencing are disclosed. Electronic communications may be received, via one or more networks, from endpoint devices, segregated, and routed to facilitate conferencing environments. Listening for data changes in data streams may be performed, each data stream corresponding to a particular source. Data changes that are generated based on events may be detected and mapped to a particular load identifier and a particular conferencing environment. A conferencing protocol may be identified and mapped to the particular conferencing environment. Consequent to determining that the data changes correspond to the one or more, the particular conferencing environment may be updated. a content composite may be created based at least in part on the data changes and may be transmitted endpoint devices mapped to a particular population of resource identifiers.

17 Claims, 18 Drawing Sheets

(56) References Cited

U.S. PATENT DOCUMENTS

| | | | |
|---|---|---|---|
| 2018/0107879 A1* | 4/2018 | Laput | G06K 9/00993 |
| 2018/0152411 A1* | 5/2018 | Lee | G06Q 10/107 |
| 2018/0261070 A1* | 9/2018 | Stevens | H04W 4/70 |
| 2020/0221951 A1* | 7/2020 | Amble | G16H 30/20 |

* cited by examiner

| | |
|---|---|
| sepsiscoordinator 2:45 PM | |
| encounter CCBXX011111 | |
| | |
| parameter | value |
| age | 65 |
| admitted | 2016-01-26 13:22:00.0 |
| name | DOE,JOHN |
| ssn | XXX000000 |
| account | XXX111111 |
| status | ADMIN |
| bed | H.B315-1 |
| sex | F |
| location | H.B3MED |
| accomodation | S-SEMI-PR |
| bot 2:45 PM | |

FIG. 14

DATA STREAM PROCESSING TO FACILITATE CONFERENCING BASED ON PROTOCOLS

CROSS REFERENCE TO RELATED APPLICATION

This application claims the benefit of and priority to U.S. Provisional Application No. 62/800,990, filed Feb. 4, 2019, which is hereby incorporated by reference in its entirety for all purposes.

FIELD

Certain embodiments of the present disclosure relate generally to synchronous conferencing and, in particular but not by way of limitation, to systems, methods, and machine-readable media for selective data stream processing to facilitate conferencing based on protocols.

BACKGROUND

Conventional conferencing systems fail to effectively adapt to changing conditions of transmitters, receivers, and the devices, applications, and systems therebetween. Conventional conferencing systems further fail to effectively process and use data streams to facilitate conferencing. Therefore, there is a need in the art for improvements that address the limitations and technical challenges that have limited conventional systems. This and others needs are addressed by the present disclosure

BRIEF SUMMARY

Certain embodiments of the present disclosure relate generally to synchronous conferencing and, in particular but not by way of limitation, to systems, methods, and machine-readable media for selective data stream processing to facilitate conferencing based on protocols.

In one aspect, a method for processing data streams in accordance with protocols to selectively transmit content to endpoint devices to facilitate conferencing is disclosed. The method may include one or a combination of the following. A plurality of electronic communications may be received, via one or more networks, from endpoint devices. Electronic communications of the plurality of electronic communications may be segregated and routed to facilitate a plurality of conferencing environments. Each conferencing environment of the plurality of conferencing environments may be mapped to a load identifier and a population of resource identifiers. Each resource identifier of the population of resource identifiers may correspond to authenticated access to a subset of the electronic communications addressed to the conferencing environment. Listening for data changes in one or more data streams may be performed, each data stream of the one or more data streams corresponding to a particular source and comprising a plurality of data elements. One or more data changes that are generated based on one or more events may be detected. The one or more data changes may be mapped to a particular load identifier and a particular conferencing environment corresponding to the particular load identifier. A conferencing protocol that applies to the one or more data changes may be identified, the conferencing protocol mapped to the particular conferencing environment. It may be determined whether the one or more data changes correspond to one or more state changes specified in the conferencing protocol. Consequent to determining that the one or more data changes correspond to the one or more state changes, the particular conferencing environment may be updated. The updating may include creating a content composite based at least in part on the one or more data changes and transmitting the content composite to a plurality of endpoint devices mapped to a particular population of resource identifiers corresponding to the particular conferencing environment.

In another aspect, an adaptive communications and control system to process data streams in accordance with protocols to selectively transmit content to endpoint devices to facilitate conferencing is disclosed. The adaptive communications and control system may include one or more network interfaces, memory storing computer-executable instructions; and one or more processing devices in communication with the memory and configured to execute the computer-executable instructions to perform operations including one or a combination of the following. A plurality of electronic communications received, via one or more networks, from endpoint devices may be processed. Electronic communications of the plurality of electronic communications may be segregated and routed to facilitate a plurality of conferencing environments. Each conferencing environment of the plurality of conferencing environments may be mapped to a load identifier and a population of resource identifiers. Each resource identifier of the population of resource identifiers may correspond to authenticated access to a subset of the electronic communications addressed to the conferencing environment. Listening for data changes in one or more data streams may be performed, each data stream of the one or more data streams corresponding to a particular source and comprising a plurality of data elements. One or more data changes that are generated based on one or more events may be detected. The one or more data changes may be mapped to a particular load identifier and a particular conferencing environment corresponding to the particular load identifier. A conferencing protocol that applies to the one or more data changes may be identified, the conferencing protocol mapped to the particular conferencing environment. It may be determined whether the one or more data changes correspond to one or more state changes specified in the conferencing protocol. Consequent to determining that the one or more data changes correspond to the one or more state changes, the particular conferencing environment may be updated. The updating may include creating a content composite based at least in part on the one or more data changes and transmitting the content composite to a plurality of endpoint devices mapped to a particular population of resource identifiers corresponding to the particular conferencing environment.

In yet another aspect, one or more non-transitory, machine-readable media are disclosed. The one or more non-transitory, machine-readable media may store machine-executable instructions that, when executed by one or more computer systems, cause the one or more computer systems to perform operations that may include one or a combination of the following. A plurality of electronic communications received, via one or more networks, from endpoint devices may be processed. Electronic communications of the plurality of electronic communications may be segregated and routed to facilitate a plurality of conferencing environments. Each conferencing environment of the plurality of conferencing environments may be mapped to a load identifier and a population of resource identifiers. Each resource identifier of the population of resource identifiers may correspond to authenticated access to a subset of the electronic communications addressed to the conferencing environment. Listening for data changes in one or more data streams may be performed, each data stream of the one or more data streams corresponding to a particular source and comprising a plurality of data elements. One or more data changes that are generated based on one or more events may be detected. The one or more data changes may be mapped to a particular load identifier and a particular conferencing environment corresponding to the particular load identifier. A conferencing protocol that applies to the one or more data changes may be identified, the conferencing protocol mapped to the particular conferencing environment. It may be determined whether the one or more data changes correspond to one or more state changes specified in the conferencing protocol. Consequent to determining that the one or more data changes correspond to the one or more state changes, the particular conferencing environment may be updated. The updating may include creating a content composite based at least in part on the one or more data changes and transmitting the content composite to a plurality of endpoint devices mapped to a particular population of resource identifiers corresponding to the particular conferencing environment.

In various embodiments of the above, the updating the particular conferencing environment may further include reconfiguring conferencing parameters of the particular conferencing environment, where the content composite indicates the reconfigured conferencing parameters. In various embodiments of the above, the reconfiguring conferencing parameters may correspond to selectively prohibiting authenticated access of at least one resource identifier from a prior instance of the particular population of resource identifiers corresponding to the particular conferencing environment. The transmitting the content composite may correspond to a subsequent instance of the particular population of resource identifiers such that the content composite is not transmitted to an endpoint device mapped to the at least one resource identifier. In various embodiments of the above, the reconfiguring conferencing parameters may correspond=to selectively granting authenticated access to at least one resource identifier such that the at least one resource identifier is added to the particular population of resource identifiers corresponding to the particular conferencing environment. The transmitting the content composite may include transmitting the content composite to an endpoint device mapped to the at least one resource identifier.

In various embodiments of the above, an action plan may be identified based at least in part on the one or more data changes and the conferencing protocol, the action plan specifying one or more actions responsive to the one or more state changes, where the one or more state changes correspond to at least one load condition indicated by the one or more data changes, and the content composite indicates the action plan. In various embodiments of the above, the listening for the data changes in the one or more data streams may include: monitoring a data network that is external and separate from the plurality of conferencing environments, where the one or more data changes are detected consequent to the monitoring, and recognizing a pattern from the one or more data changes from the data network, where the pattern corresponds to the one or more state changes. In various embodiments of the above, load specifications from one or more sensor devices that are configured to detect the phenomena corresponding to respective loads of a plurality of loads may be monitored, where the one or more data changes correspond to the load specifications detected consequent to the monitoring. A trigger event from the load specifications may be recognized, where the trigger event corresponds to the one or more state changes.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Various embodiments in accordance with the present disclosure will be described with reference to the following appended drawings.

FIG. 14 illustrates a portion of an exemplary chat interface, in accordance with embodiments of the present disclosure.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In various aspects, disclosed embodiments may provide for a load-specific platform that may provide for many synchronous conferencing environments, such as chat rooms and chat channels. Taking chat rooms as a non-limiting example of the synchronous conferencing environments, each chat room in the platform may be dedicated to a single load. Resources of a resource subsystem assigned to each load may be specified as users in the chat room. Additionally, disclosed embodiments may provide for integration with various client applications and products, where each may correspond to a different proprietary platform, software, equipment, formats, and/or the like. Disclosed embodiments may handle electronic communications from each endpoint device and/or application with a receiving service and a router subsystem that receive, inspect, validate, convert, and translate messages in order to create messages to route to the appropriate chat room channel. Disclosed embodiments may route inbound messages, route outbound messages, generate customized chat room interfaces, and created customized chat room summaries and chat room other content. Disclosed embodiments may conform bot-provided chat room communications to the particularized contexts of the various chat room channels.

Figure 1:
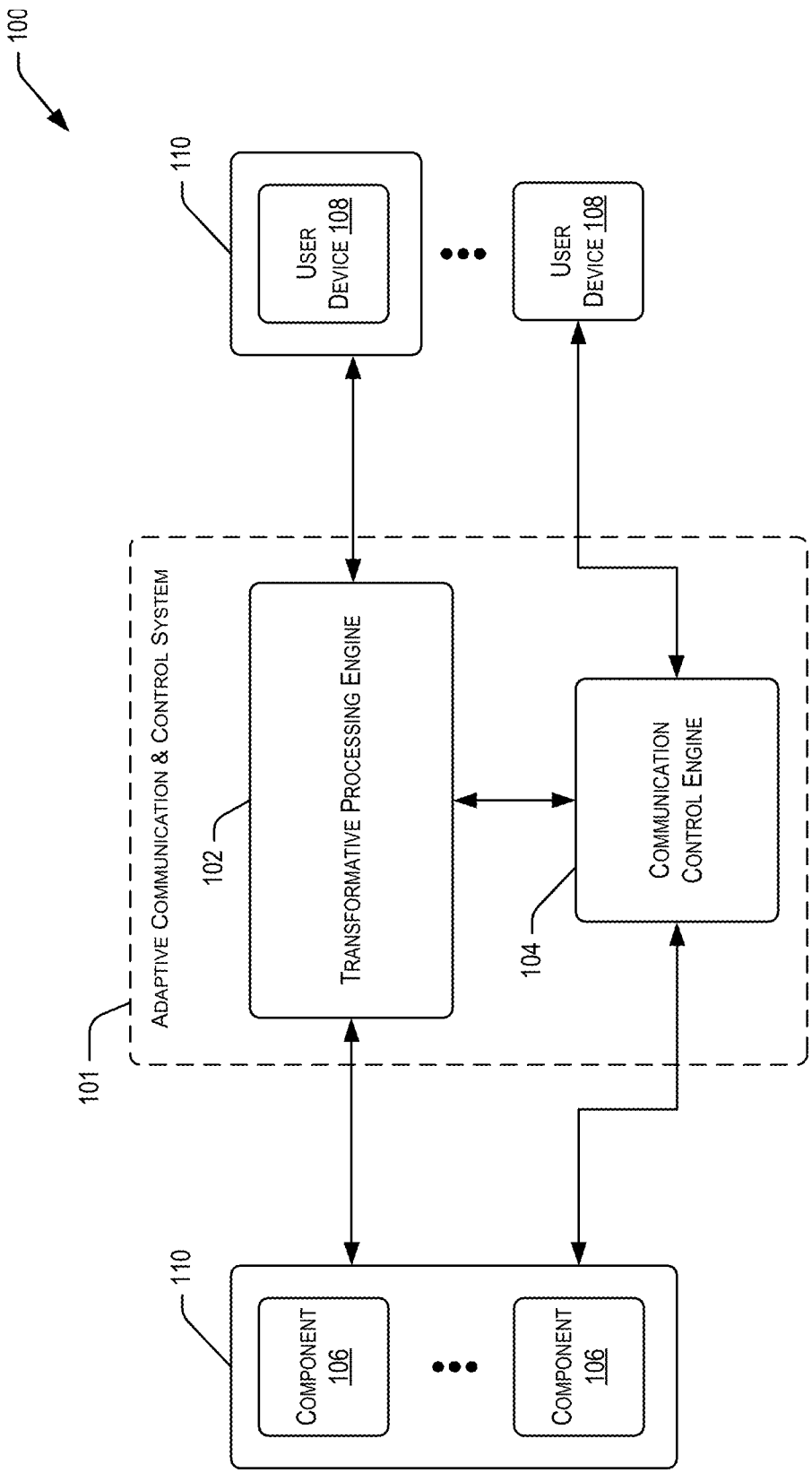
FIG. 1 is an example block diagram of an interaction system with an adaptive communication, control, and documentation system, in accordance with embodiments of the present disclosure.

Various embodiments will now be discussed in detail with reference to the accompanying figures, beginning with FIG. 1. FIG. 1 depicts a block diagram of an embodiment of an interaction system 100 with an adaptive communication and control system 101 (referenced herein as the adaptive system 101) is illustrated. As disclosed herein, among other things, the adaptive system 101 may provide for a chat room platform; intelligent, adaptive, and proactive chat room and communication management; decision making and workflow management; enforcement of protocols; and acceleration of documentation. In various embodiments, the adaptive system 101 may at least partially include one or both of a transformative processing engine 102 and a communication control engine 104. Generally, in interaction system 100, data may be generated at one or more system components 106 and/or devices 108. Communication control engine 104 may control the flow of communications within interaction system. Transformative processing engine 102 may receive, intercept, track, integrate, process and/or store such data.

Data flowing in interaction system 100 may include a set of communications. Each of one, some of all communications may include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include secured information.

For example, a system component 106 may include, for example, a sensor to detect a sensor measurement and may thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier may be determined, for example, based on detection of a nearby electronic tag (e.g., RFID tag), a detected input received at a user interface of component 106 and/or data in a corresponding communication received from a user device.

As another example, a device 108 may be configured to detect input received at a user interface of the device. The input may include, for example, an identifier of an object or entity, an instruction, a characterization of an object or entity, an identification of an analysis to be performed, a specification of an aggregation or data processing to be performed, and/or an identification of a destination for a data-analysis report. User device 108 may further be configured to detect input requesting particular data, to generate a request communication (e.g., to be sent to transformative processing engine), to receive the requested data and/or to present the received data.

The depicted engines, devices and/or components may communicate over one or more networks. A network of one or more networks may include a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 106 and one or more devices 108 are illustrated as communicating via transformative processing engine 102 and/or control engine 104, this specification is not so limited. For example, each of one or more components 106 may communicate with each of one or more devices 108 directly via other or the same communication networks.

A component 106 may be configured to detect, process and/or receive data, such as environmental data, geophysical data, biometric data, chemical data (e.g., chemical composition or concentration analysis data), and/or network data. The data may be based on data detected, for example, via a sensor, received signal or input. A user device 108 may include a device configured to receive data from a user and/or present data to a user. It will be appreciated that, in some instances, a component 106 is also a user device 108 and vice-versa. For example, a single device may be configured to detect sensor measurements, receive input and present output.

A component 106 may be configured to generate a communication that is in one or more formats, some of which may be proprietary. For example, an imaging machine (e.g., one of one or more components 106) manufactured by company A, located within a first premises (e.g., premises 110), and belonging to a first client, may save and transfer data in a first format. An imaging machine (e.g., one of one or more components 106) manufactured by company B, located within the first premises (e.g., premises 110), and belonging to the first client, may save and transfer data in a second format. In some examples, data from certain components is transformed, translated, or otherwise adjusted to be recognizable by transformative processing engine 102. Thus, continuing with the example from above, when the imaging machines manufactured by companies A and B are located within the first premises belonging to the first client, they may nevertheless save and transfer data in different formats. In some examples, one or more components 106 communicate using a defined format.

In some examples, each of one or more components 106 are each associated with one or more clients within a same or different interaction systems. For example, certain ones of one or more components 106 may be associated with a first client, while other ones of one or more components 106 may be associated with a second client. Additionally, each of one or more components 106 may be associated with a premises 110 (e.g., client premises). Each premises 110 may correspond to a single location and/or processing focus. Exemplary types of premises include server farm premises, webserver premises, data-storage premises, technical-support premises, telecommunication premises, and/or operation premises. For example, a first premises may include a structure at a first location at which one or more resources (e.g., computational resources, equipment resources, laboratory resources and/or human resources) are provided. Each of the one or more resources may be of a first type in a first set of types. A resource type may be identified based on, for example, a characteristic of the resource (e.g., sensor inclusion) and/or a capability of providing each of one or more services. Thus, for example, resources at a first premises may be better configured for handling a particular type of service requests compared to those in another premises. As another examples, different premises may include resources of similar or same types but may vary in terms of, for example, user accessibility, location, managing client, etc.

Transmission of data from one or more components 106 to transformative processing engine 102 may be triggered by a variety of different events. For example, the data may be transmitted periodically, upon detection of an event (e.g., completion of an analysis or end of a procedure), upon detection of an event defined by a rule (e.g., a user-defined rule), upon receiving input triggering the transmission, or upon receiving a data request from transformative processing engine 102. Each transmission may include, e.g., a single record pertaining to a single entity, object, procedure, or analysis or multiple records pertaining to multiple entities, objects, procedures, or analyses.

In some examples, at least some of one or more devices 108 are associated with premises 110. In some examples, at least some of one or more devices 108 need not be associated with premises 110 or any other premises. Similar to one or more components 106, one or more devices 108 may be capable of receiving, generating, processing and/or transmitting data. Examples of one or more devices 108 include, for example, a computer, a mobile device, a smart phone, a laptop, an electronic badge, a set-top box, a thin client device, a tablet, a pager, and other similar user devices). One or more devices 108 may be configured to run one or more applications developed for interacting with data collected by transformative processing engine 102. For example, those user devices of one or more devices 108 that are not associated with premises 110 may be configured to run one or more third-party applications that may rely in part on the data gathered by transformative processing engine 102.

Each of one or more components 106 and one or more devices 108 may be utilized by one or more users (not shown). Each of the one or more users may be associated with one or more clients. For example, one of the one or more users may be associated with a client as a result of being employed by the client, physically located at a location of the client, being an agent of the client or receiving a service from the client.

In some examples, one or more components 106 and one or more devices 108 may communicate with transformative processing engine 102 and control engine 104 via different information formats, different proprietary protocols, different encryption techniques, different languages, different machine languages, and the like. As will be discussed with reference to FIG. 2, transformative processing engine 102 is configured to receive these many different communications from one or more components 106, and in some examples from one or more devices 108, in their native formats and transform them into any of one or more formats. The received and/or transformed communications may be transmitted to one or more other devices (e.g., control engine 104, an entity device and/or a user device) and/or locally or remotely stored. In some examples, transformative processing engine 102 receives data in a particular format (e.g., the HL7 format) or conforming to any other suitable format and/or is configured to transform received data to conform with the particular format.

One or more components 106 of premises 110 may include and/or has access to a local or remote memory for storing generated data. In some examples, the data is stored by one or more servers local to premises 110. Such storage may enable premises 110 to retain locally data pertaining to its premises prior to (or in conjunction with) the data being shared with transformative processing engine 102 and/or control engine 104. In some examples, the one or more servers of premises 110 share data directly with a record service (not shown), and the record service makes the data available to transformative processing engine 102 and/or control engine 104. Once an electronic record is updated at premises 110, an indication of the update may be provide to the record service. The record service may then update a corresponding record associated with the electronic record.

The record service may be granted access to the data generated and/or transmitted by one or more components 106. In some examples, the record service may include a server or a plurality of servers arranged in a cluster or the like. These server(s) of the record service may process and/or store data generated by one or more components 106. For example, one or more records may be generated for each entity (e.g., each record corresponding to a different entity or being shared across entities). Upon receiving a communication with data from an component (or premises), the record service may identify a corresponding record and update the record to include the data (or processed version thereof). In some examples, the record service provides data to transformative processing engine 102. Premises 110 may include one at which a resource is located and/or service is provided. Irrespective of the type of premises, premises 110 may update data, maintain data, and communicate data to transformative processing engine 102. At least some of the data may be stored local to premises 110.

A user interacting with a user device 108 may include, for example, a client customer, client agent and/or a third party. A user may interact with user device 108 and/or component 106 so as to, for example, facilitate or initiate data collection (e.g., by a component 106), provide data, initiate transmission of a data request, access data and/or initiate transmission of a data-processing or data-storage instruction. In some instances, one or more devices 108 may operate according to a private and/or proprietary network or protocols. In other examples, one or more devices 108 may operate on public networks. In any case, however, transformative processing engine 102 may have access to the one or more components and may communicate with them via a public, private and/or proprietary network or protocols. The use of one or more private and/or proprietary protocols may promote secure transfer of data.

Figure 2:
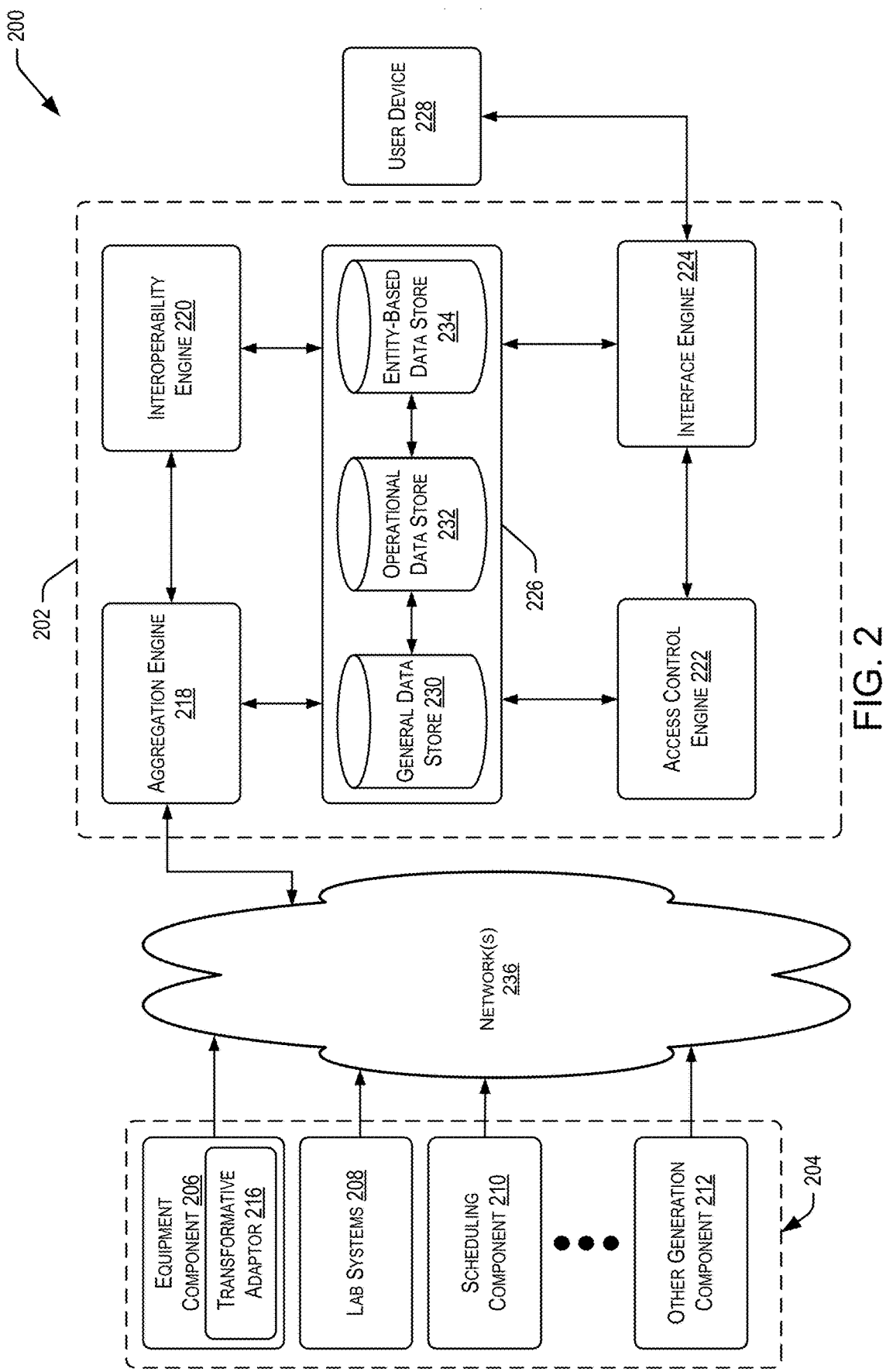
FIG. 2 is an example block diagram illustrating an interaction system in which processing data streams in accordance with protocols to selectively transmit content to endpoint devices to facilitate conferencing may be implemented, in accordance with embodiments of the present disclosure.

Referring next to FIG. 2, a block diagram of an example of an interaction system 200 is shown. Interaction system 200 may correspond to interaction system 100 illustrated in FIG. 1 and may include a transformative integration engine 202. Transformative integration engine 202 is an example of transformative processing engine 102 discussed with reference to FIG. 1. Interaction system 200 also may include one or more generation components 204. In particular, one or more generation components 204 may include an equipment component 206, a lab systems component 208, a specification component 210 and other generation components 212. One or more generation components 204 are examples of one or more components 106 discussed with reference to other figures herein.

Generally, one or more generation components 204 may include any suitable device or system capable of generating data in the context of an interaction system. For example, the other generation components 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

The one or more generation components 204 may correspond to one or more internet of things (IOT) devices. Such devices may be running software, e.g., developed in Linux, in some instances, and may be configured to send http calls via the API to send messages any time a trigger event is detected. By way of example, every time a particular door is opened, a sensor (e.g., a proximity sensor, a reed switch, a motion detector, etc.) may sense the open condition, and the corresponding IOT device may send an http call with a JSON payload with values indicative of the sensed condition, location, and time to the API to send a message to security.

As discussed in further detail herein, data generated by one or more generation components 204 may be of a variety of formats, some of which may be proprietary. For example, a single component may generate data in multiple formats, different components may generate data in different formats, and/or different component types may result in generation of data in different formats. In some instances, formatting of a data may depend on a service having been provided, a user initiating data generation, a destination to receive the data, a location at which a service was provided, etc. In some examples, a typical interaction system may include thousands of generation components producing data in hundreds of formats. In order to harness the power that comes from such a large amount of data to make informed decisions, it is desirable that all, or at least a large portion of the data, is shared. Use of transformative integration engine 202 in accordance with techniques described herein may achieve this design—making large amounts of data, in many different originating formats available to various types of users, via one or more interfaces.

While one or more generation components 204 are illustrated adjacent to each other, it is understood that each may be located within one premises or that the components may be spread out among many premises. In addition, in some examples, one or more generation components 204 belong to different clients. In some embodiments, the one or more generation components 204 may communicate with the transformative processing engine 202 via a specified protocol and the payload data of the communications may be in a variety of formats. In some embodiments, the one or more generation components 204 may communicate with the transformative processing engine 202 via a specified protocol the payload data of the communications may be in a specified format, after the payload data was transformed to the specified format, e.g., with one or more transformative adaptors disclosed herein.

Turning now to equipment component 206, this component may include any machine, contrivance, implant, or other similar related article, that is intended to aid in reaching a particular objective. In some instances, equipment component 206 may include one or more sensors to detect environmental or other stimuli. Equipment component 206 may include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 may include transformative adaptor 216. In some examples, transformative adaptor 216 is a device that transforms, translates, converts, or otherwise adjusts output data from equipment component 206. For example, an equipment component 206 may be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-defined or learned. Transformative integration engine 202 may perform similar processes as it relates to all data generated within interaction system 200. In this manner, transformative adaptor 216 may perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. The one or more generation components 204 may communicate with the transformative processing engine 202 via a specified protocol, where the payload data of the communications may be in a specified format, after the payload data was transformed to the specified format, e.g., with one or more transformative adaptors 216.

Lab systems component 208 may include any suitable laboratory equipment or system that is intended to analyze material, such as biological material. This may include, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative integration engine 202.

Specification component 210 may include any suitable computing devices used for operations-related purposes with respect to interaction system 200. For example, specification component 210 may be configured to schedule a resource for allocation for a particular entity during a particular time slot. Specification component 210 may monitor a schedule for the resource and may identify one or more available time slots that may be secured by a particular entity. Upon receiving a specification indication, specification component 210 may update a schedule of a resource to reflect that a particular time slot is to be allocated for service of a particular entity. In some embodiments, the transformative processing engine 202 may be configured to monitor data (e.g., messages) that is passed over the one or more networks 236 and, from the monitored data, select certain portions to provide to one or more authorized entities.

Each of the one or more generation components 204, as well as the one or more user devices 228 corresponding to the one or more devices 108, may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and may include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors may be implemented as one or more integrated circuits, e.g., one or more single-core or multi-core microprocessors or microcontrollers, examples of which are known in the art. In operation, the one or more processors may control the operation of the particular component. The one or more processors may access and execute the program code and at any given time.

The user interface may include any combination of input and output devices. In some instances, a user may operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative integration engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative integration engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative integration engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

In some embodiments, the transformative integration engine 202 may be configured to monitor data (e.g., messages) that is passed over the one or more networks 236 and, from the monitored data, select certain portions to provide to one or more authorized users via chat rooms/channels. For example, as disclosed herein, one or more agents may monitor data passed over the one or more networks 236. The one or more agents may, in various embodiments, correspond to a bot, a listener, and/or the like, and may conform ITI-41, HL7 v.2, HL7 v.3, C-CDA, NEMSIS, FHIR, XDs.b, XDR, or other suitable protocols. Thus, in some embodiments, one or more bots may be configured as listeners, and agent engine 118C may, in some embodiments, correspond to the bot engine 118D, which are disclosed herein.

The transformative processing engine 202 may include an aggregation engine 218, an interoperability engine 220, an access management engine 222, an interface engine 224, and a data store 226. The interface engine 224 may be configured to retrieve the data from the data store 226 and provide one or more interfaces for interacting with elements of the transformative processing engine 202. For example, the interface engine 224 may include an interface by which an application running on user device 228 may access portions of data within the data store 226. Generally aggregation engine 218 is configured to collect data from multiple communications. The data may be from one or multiple generation components 204 and/or may be of a same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 may identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 may be configured to provide data from one or more communications to interoperability engine 220. Interoperability engine 220 may be configured to perform one or more operations on the received data and store it in data store 226. For example, interoperability engine 220 may perform semantic tagging and indexing of data. This may include extracting field values from data, categorizing data (e.g., by type of data, characteristic of an entity, location of premises, characteristic of premises, and the like), anonymizing or partially-anonymizing data, and the like. Interoperability engine 220 may also include a high availability cache, an alerts engine and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which may include devices of different entities and/or a cloud server). In some examples, data store 226 may include a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, operational and analytics information, output data from one or more generation components 204, and the like may be retained. The data within the data stores 230, 232, and 234 include elements or tags such that a particular data (e.g., for a single entity, protocol, etc.) may be retrieved.

Access control engine 222 is configured to control access to features of transformative integration engine 202, including access to the data retained in data store 226. For example, access control engine 222 may verify that a user device such as user device 228 is authorized to access data store 226. To verify the user device 228, access control engine 222 may require that a user of the user device 228 input a username and password, have a profile associated with the interaction system, have paid a subscription fee associated with access to data store 226, and the like. Access control engine 222 may also verify that the user device 228 has an IP address or geographical location that corresponds to an authorized list, that the user device 228 may include a plug-in for properly accessing data store 226, that the user device 228 is running certain applications required to access data store 226, and the like.

Figure 3:
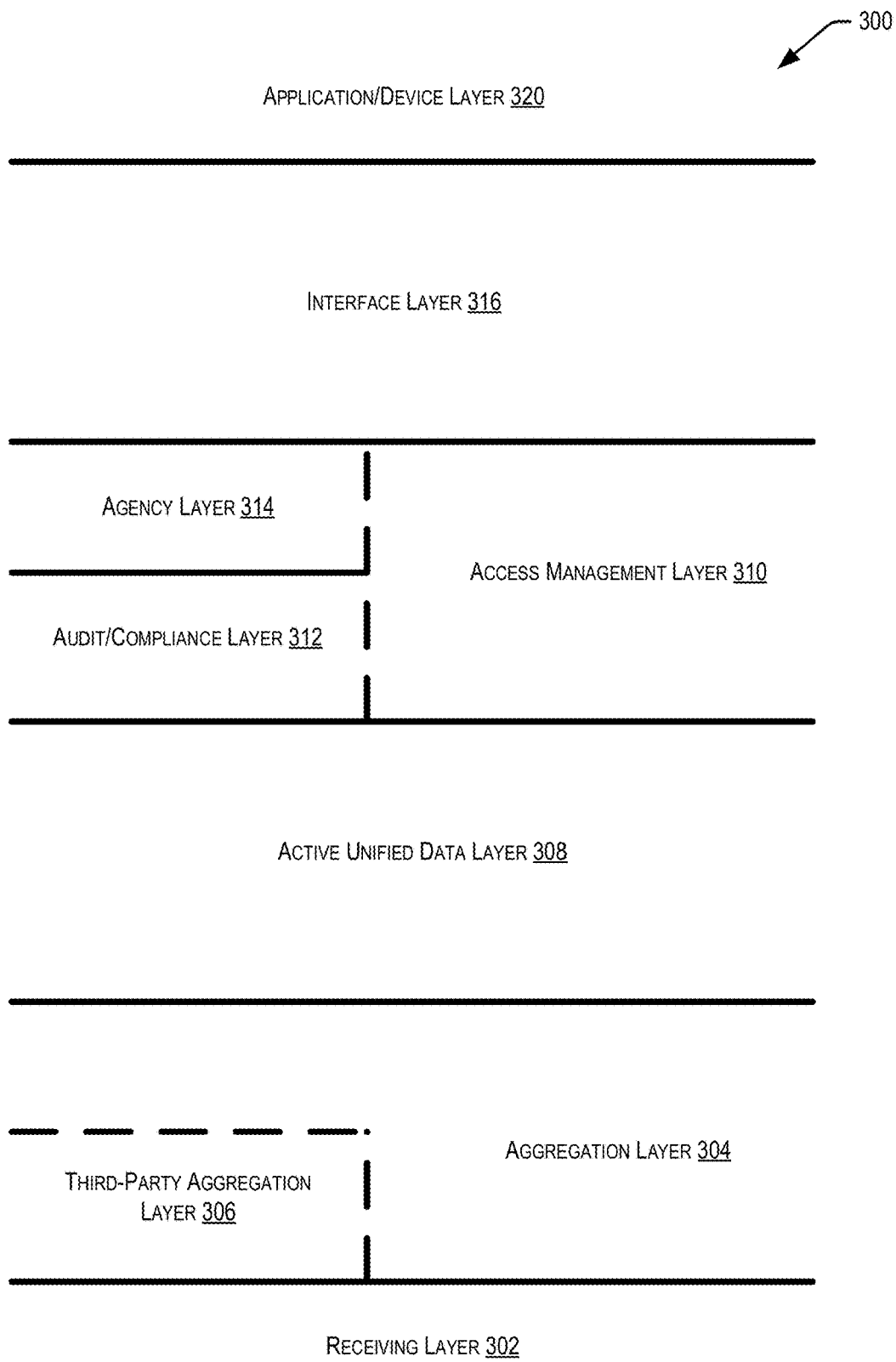
FIG. 3 illustrates a block diagram of an architecture stack for processing data streams in accordance with protocols to selectively transmit content to endpoint devices to facilitate conferencing, in accordance with embodiments of the present disclosure.

Turning next to FIG. 3, an architecture stack 300 is shown. In some examples, techniques relating to control of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 may be used to integrate different systems of different entities and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 may include a receiving layer 302 as the bottom-most layer. Receiving layer 302 may include receiving data from elements that share data with other elements within an aggregation layer 304. For example, as detailed herein, receiving layer 302 may include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a schedule, or in any other suitable manner. In some examples, data of aggregation layer 304 may be aggregated according to input and/or rules and may aggregate across records pertaining to, e.g., a premises, entity, time period, characteristic (e.g., demographic characteristic or condition), outcome, and any other suitable input and/or rules. The aggregation may include compiling the data, generating a distribution, generating a statistic pertaining to the data (e.g., average, median, extremum or variance), converting the data, transforming the data to different formats, and the like.

Next, architecture stack 300 may include an active unified data layer 308. Elements of active unified data layer 308 receive data from the elements of the other layers and store such data in a unified manner. In some examples, this may include storing the data in a manner that allows for searching and retrieval using a defined set of method calls, techniques, and or procedures. For example, the data may be stored such that a different application may access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also may include an access control layer 310, which may include an audit/compliance layer 312 and/or an agency layer 314. Access control layer 310 may include elements to control access to the data. For example, access control layer 310 may include elements to verify user login credentials, IP addresses associated with a user device, and the like prior to granting the user access to data stored within active unified data layer 308. Audit/compliance layer 312 may include elements to audit other elements of architecture stack 300 and ensure compliance with operating procedures. For example, this may include tracking and monitoring the other elements of access control layer 310.

Agency layer 314 may include an access location (e.g., a virtual private network, a data feed, or the like) for elements of agencies that are interested in the operations of the interaction system in which architecture stack 300 is implemented. For example, agency layer 314 may allow an entity access to some elements within architecture stack 300. This may be achieved by providing the entity a direct conduit (perhaps by a virtual private network) to the elements of access control layer 310 and the data within active unified data layer 308. Audit/compliance layer 312 and agency layer 314 are sub-layers of access control layer 310.

Architecture stack 300 also may include interface layer 316. Interface layer 316 provides interfaces for users to interact with the other elements of architecture stack 300. For example, clients, entities, administrators, and others belonging to the interaction system may utilize one or more user devices (interacting within application/device layer 320) to for sending and receiving communications via the active unified data layer 308. In some examples, the users may be unrelated to the interaction system and may use applications (not shown) to send and receive communications via one or more interfaces (e.g., to access data stored within active unified data layer 308).

Further, the architecture stack 300 may include application/device layer 320. The application/device layer 320 may include user devices and applications for sending and receiving communications via the elements of the interface layer 316. For example, the applications may be web-based applications, portals, mobile applications, widgets, and the like for sending and receiving communications (e.g., messages). These applications may run on one or more user devices. The user devices may be any suitable user device as detailed herein.

Figure 4:
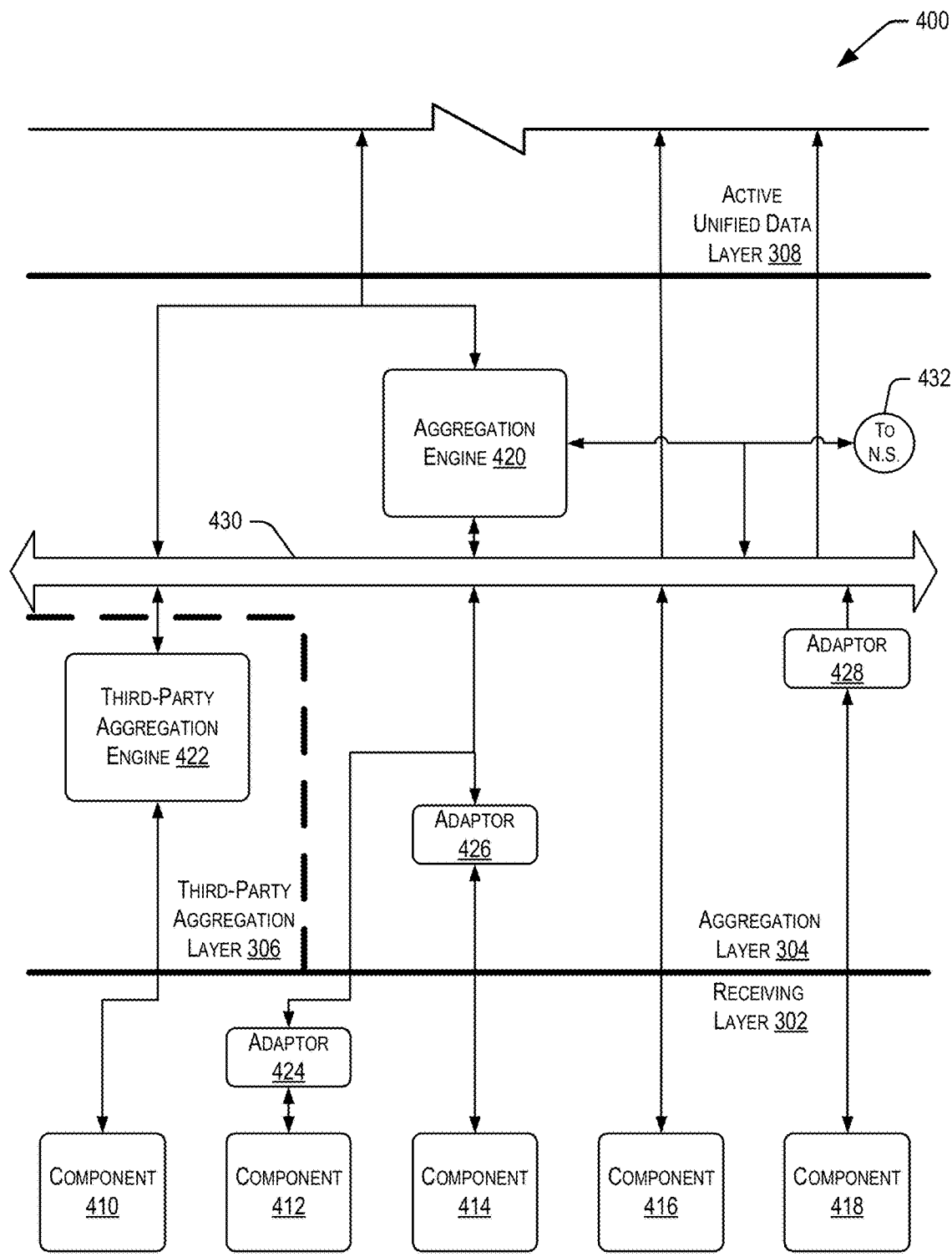
FIG. 4 illustrates a block diagram of a portion of the architecture stack, in accordance with embodiments of the present disclosure.

Turning next to FIG. 4, a diagram 400 is shown that depicts a portion of architecture stack 300 according to an embodiment of the present disclosure. In particular, the diagram 400 may include receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple premises. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data may then be transformed, translated, or otherwise adjusted before an aggregation engine 420 (e.g., aggregation engine 218) or an aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors may function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to aggregation engine 422.

In some examples, data provided by the components 410-418 may be communicated via a messaging bus 430 (e.g., the one or more networks 236). The data, in the form of messages may be put on the one or more networks 236 by the one or more components, by the aggregation engine 420, by the engine 422, and by any other suitable device capable of generating messages. In some examples, messages are taken off of the messaging bus 430 by the aggregation engine and/or by one or more listeners described in more detail herein. Thus, circle 432 indicates that data (e.g., messages) may flow from the messaging bus 430 to a notification service and processed in accordance with techniques described herein.

Aggregation engine 420 and aggregation engine 422 function in a similar manner. In some examples, aggregation engine 422 is operated by a different entity than the entity that operates aggregation engine 420. This may be because the data collected by aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the aggregation engine 422, and some of components 410-418 and elements of active unified data layer 308.

Figure 5:
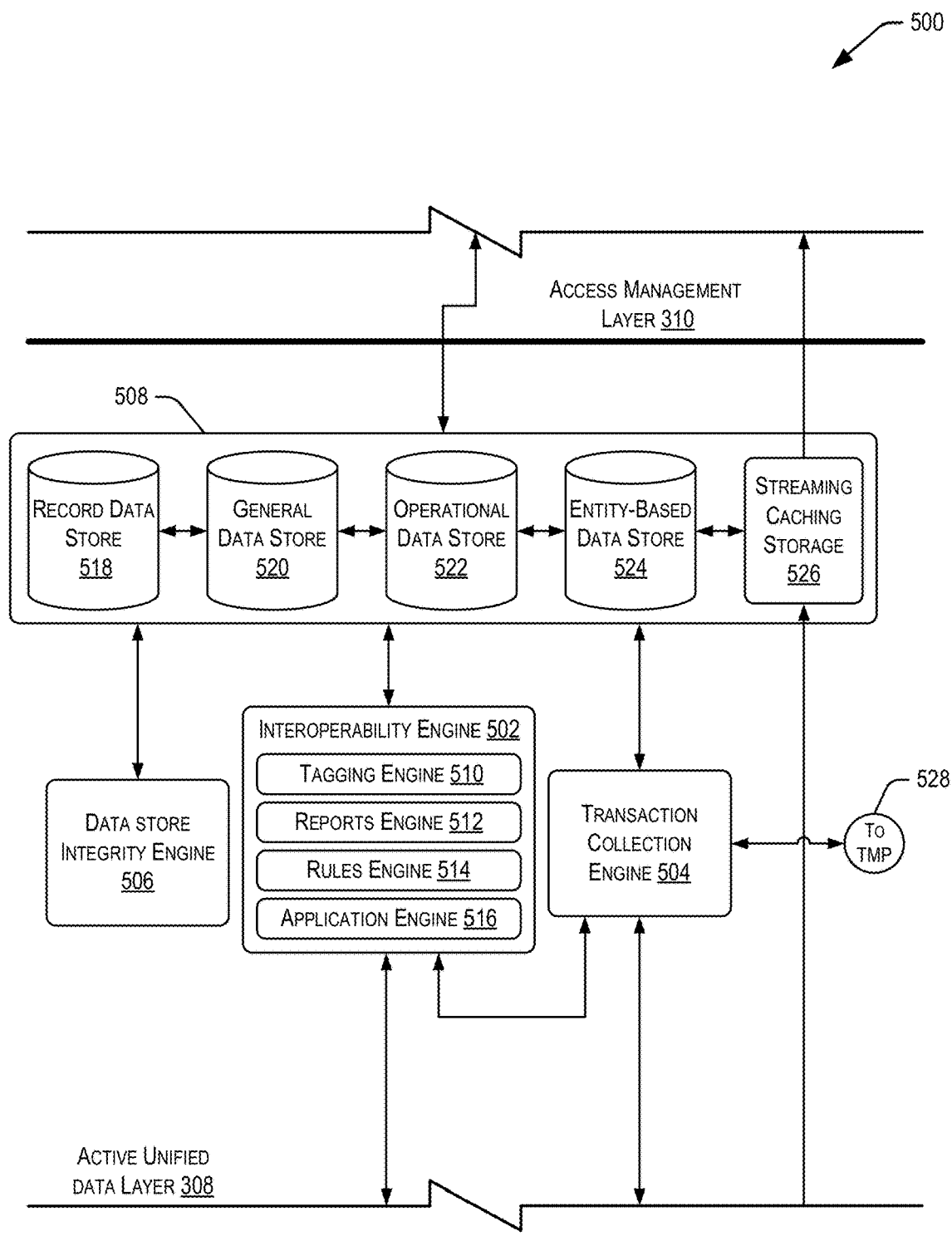
FIG. 5 illustrates a block diagram of a portion of the architecture stack, in accordance with embodiments of the present disclosure.

Referring next to FIG. 5, a diagram 500 is shown that depicts a portion of architecture stack 300 according to an embodiment of the present disclosure. In particular, diagram 500 may include active unified data layer 308 and a portion of access control layer 310. Active unified data layer 308, as illustrated in diagram 500, may include an interoperability engine 502 (e.g., interoperability engine 220), a interaction control collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Interaction control collection engine 504 is implemented as part of control engine 104. Interaction control collection engine 504 is configured to generate message indicators identifying flows of data by and between elements of an interaction system implemented using the techniques described herein. The flows of information include messages which include data, and the message indicators include unique message identifiers that may be used to identify the messages. The unique message identifiers include information that may be used to uniquely identify the messages. For example, a unique message identifier for a particular message may include a concatenation of the following information stored in a table: a source application, a premises, a message type, and a message control identification (ID). The unique message identifier may also be the message control ID. The unique message identifier may be created as messages including data are transmitted from aggregation layer 304. The table may be stored in association with the interaction control platform 528.

In some examples, the table also may include information for tracking the progress of the message from an origination node to a destination node. For example, typically when a message (e.g., any communication of data) is first received by transformative processing engine 102 (e.g., interoperability engine 502), control engine 104 (e.g., interaction control collection engine 504 of control engine 104) may generate a unique identifier for the message in order to track that message as it moves throughout the interaction system. The unique identifier may be included in the header of the message such that when the next node (e.g., component, device, server, etc.) after transformative processing engine 102 receives the message, that node may report back to control engine 104 that it saw the message. In this manner, control engine 104 may enable end-to-end tracking of messages for the life of the message.

In one example, the messages are requests. The requests may be generated based om input at one of the components. The requests may be received by transformative processing engine 102 and integrated into the system. In some examples, control engine 104 may be notified that the requests have been received and may therefore be configured to generate message IDs for each request. These message IDs may then be associated with each of the requests. As the requests continue to move throughout the interaction system (e.g., away from transformative processing engine 102), control engine 104 may be track their movement using the message IDs. If one of the requests does not make it to its destination, control engine 104 (or part of the interaction control platform 528) may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, control engine 104 (e.g., interaction control collection engine 504 of control engine 104) may receive the message and/or message identifier directly from one of components 410-418. For example, one of components 410-416 may be configured to generate the unique message identifier and/or communicate directly with control engine 104. The message also may travel via one or more intermediate nodes on its way to the destination node. In some examples, a node is a component such as components 410-418, which may be running an application. In some examples, the unique identifier and the routing of the message to its destination may be stored in a table that also may include: a geolocation of each node, a network from which the message originated, a type of node, the unique node identifier, and a time associated with the message leaving the origination node. In some examples, interaction control collection engine 504 provides unique message identifiers to other elements of the interaction system to monitor the messages as they move throughout the interaction system. Interaction control collection engine 504 also provides a portion of the unique message identifiers to an interaction control platform (indicated by a circle 528) for further analysis of the message identifiers. Such analysis may include reconciliation of lost messages, latency reporting, audit control and compliance, and other such analyses. As mentioned previously, the interoperability engine 502 may be configured to store data in the data store 508. A plurality of sub-engines 510-516 of the interoperability engine 502 may be configured to perform operations relating to storing data in the data store 508.

Interoperability engine 502 may include a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by eternal mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against. Other examples, of metadata that may be included in one or more fields include author, document type, creation time, last update time, upload time and data, geographic location, unique ID associated with the client or premises where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may include filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words. In this manner, tagging engine 510 may also index portions of the data within one or more data stores of data store 508. In some examples, such indexing may be based in part on the selected tags.

Interoperability engine 502 also may include a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications may include, for example, signals, sirens, electronic notifications, popups, emails, text messages, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also may include a rules engine 514 configured to create and control operational rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 may include an application engine 516 configured to provide service-oriented architecture web services.

Data store 508 may include an electronic/digital record information data store 518 ("record data store 518"), a general data store 520, an operational data store 522, an entity-based data store 524, and a streaming caching storage 526. While data store 508 is illustrated as including a fixed number of data stores and storage elements, it is understood that data store 508 may include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data may then be formatted, filtered, sorted and/or processed and then stored, presented and/or otherwise used. In this manner, the script may be used to produce streaming analytics.

In some instances, the data query script, when executed, identifies each of the data stores of interest. Identifying the data stores of interest may include identifying at least a portion of data from the data stores simultaneously and/or sequentially. For example, the script may identify corresponding data stores (e.g., or components of a single data store or multiple data stores) that pertain to one or more similar variables but that differ in one or more other variables. Once the portion of the data from the data stores is identified, a representation of the identified data may be output to one or more files (e.g., Extensible Markup Language (XML) files) and/or in one or more formats. Such outputs may then be used to access the data within one or more relational database accessible using Structured Query Language (SQL). Queries made using SQL may be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within record data store 518 is retained data including electronic record information. In some examples, the information within record data store 518 is organized according to entity identifying information. Thus, record data store 518, in some examples, may include individually identifiable information. But it may also include de-identified information.

Within general data store 520 is retained data. The data may be stored in a relational database format or in any other suitable format. Thus, the data within general data store 520 may be retained in a data structure that may include one or more tables capable of accessing each other. In some examples, general data store 520 may include a subset of the information that is included in operational data store 522.

Within operational data store 522 is retained data in a relational database format. Thus, the data within operational data store 522 may be retained in a data structure that may include one or more data structures (e.g., tables) capable of accessing each other. Operational data store 522 is an example of an operational data warehouse. In operational data store 522 is joined many different types of data. In some examples, the operational data ware house 522 may include data pertaining to decision making as discussed herein and other data typically used by conventional operational concerns.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, interactional, secure, database server with built-in search and a full suite of application services. An example of such a unified system may be Marklogic. Entity-based data store 524 may support data aggregation, data structuring, data indexing, data tagging and mapping to semantic standards, concept matching, concept extraction, machine learning algorithms, concept discovery, concept mining, and transformation of record information. In some examples, entity-based data store 524 may include data pertaining to decision making (similar to general data store 520) as discussed that is organized and accessed in a different manner. For example, the data within entity-based data store 524 may be optimized for providing and receiving information over one or more information exchanges. In some examples, entity-based data store 524 may include a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data may be cached. For example, assume that component 418 is a piece of equipment operating at Location A and that a user using a computer in Location B desires to view a live of substantially live stream of outputs of the piece of equipment. Component 418 may send a portion of data to streaming caching storage 526 which may retain the portion of the data for a certain period of time (e.g., 1 day). Thus, streaming caching storage 526 is configured to cache data that may be streamed.

Diagram 500 also may include data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
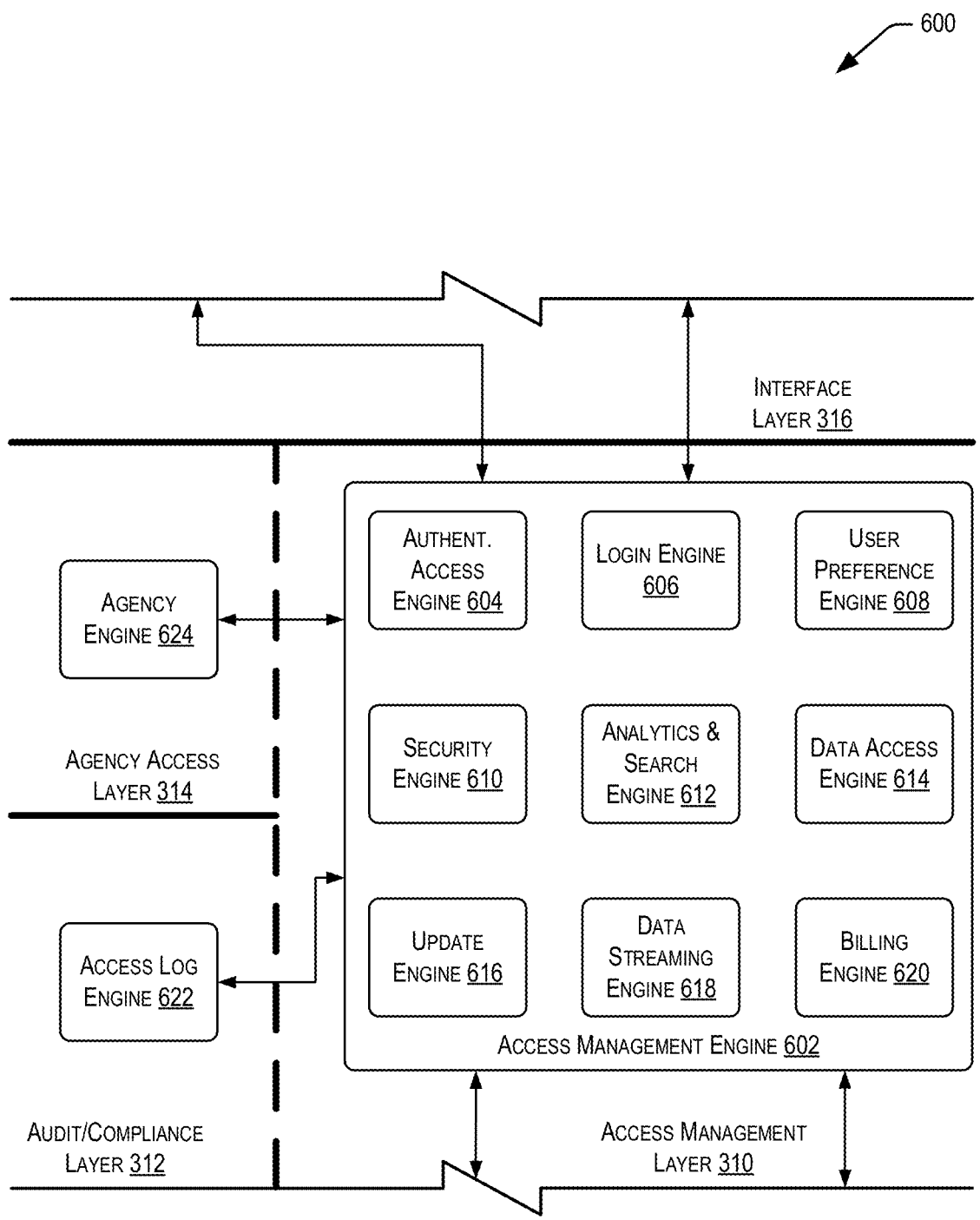
FIG. 6 illustrates a block diagram of a portion of the architecture stack, in accordance with embodiments of the present disclosure.

FIG. 6 shows a diagram 600 which depicts a portion of architecture stack 300 according to an embodiment of the present disclosure. In particular, the diagram 600 may include access control layer 310, audit/compliance layer 312, agency layer 314, and a portion of interface layer 316. Access control layer 310, as illustrated in the diagram 600, may include an access control engine 602. Access control engine 602 is an example of access control engine 222. Generally, access control engine 602 may be configured to control access to elements of transformative integration engine 202 by different components, applications, and user devices.

Access control engine 602 within access control layer 310 may also provide functionality similar to an operating system. For example, access control engine 602 may include a plurality of engines configured to control different aspects of interacting with elements of the interaction system. For example, a user who desires to access portions of data retained in data store 508, may do so by interacting with access control engine 602 using one or more applications (not shown). Thus, access control engine 602 may include a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access control engine 602 may define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 may confirm that an entered username (e.g., and password), provided biometric data or code or identifier in a scanned tag or badge matches that in an authorized user data structure.

Login engine 606 evaluates one or more user profiles associated with each authenticated user. In some examples, a user profile may include a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

The security engine 610 evaluates the rules and conditions for ensuring the security of access to the elements of the interaction system. In some examples, these rules and conditions are determined by administrators of the interaction system. In some examples, the security engine 610 provides a plurality of computer virus protection services. These services can be called up and implemented when accessing the interaction system or accessing applications associated with the interaction system. For example, because the interaction system may include sensitive data, the security engine 610 may enforce a domain-based rule that protects certain sensitive information (e.g., identifying information).

Analytics and search engine 612 evaluates the rules and conditions under which users may search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 may be used to search within various fields and potential field values. In some examples, search engine 612 may provide analytics, such as statistics, graphs, distributions and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may control which users may access parts of the interaction system, data access engine 614 may control how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access control engine 602) may be provided to developers in the form of a software development kit (SDK). SDKs may enable developers write applications that may effectively communicate with elements (e.g., data store 508) of the interaction system. In particular, applications that may access a portion of the data stored within active unified data layer 308.

Update engine 616 evaluates the rules and conditions for providing updates to other engines within access control engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access may include, in some examples, logging data conventionally collected by access log engines running in similar environments. Access log engine 622 may use this data to generate and transmit reports, for example, to stakeholders of the interaction system such that they may make informed decisions regarding that is accessing the interaction system and for what purposes.

Within agency layer 314 is located an agency engine 624. Agency engine 624 evaluates the rules and conditions under which agencies may access the interaction system. For example, agencies that may use agency engine 624 include agencies to which the interaction system provides compliance, tracking, or other reporting information. For example, agency engine 624 may be used to track one or more performance indicators identified by an agency and/or to provide report instances of defined types of events. Thus, in some examples, an agency uses agency engine 624 to collect data pertaining to compliance of the interaction system with one or more statutes or regulations. In some examples, a university is an agency that uses agency engine 624 to collect data pertaining to one or more studies. In some examples, agency engine 624 may identify one or more entities (e.g., agencies) that are to receive reports pertaining to operations or events and what types of data are to be reported to those entities. Agency engine 624 may then collect the pertinent data, potentially format and/or analyze the data, and facilitate transmission of (e.g., raw, formatted and/or analysis of) the data to the appropriate agency.

Figure 7:
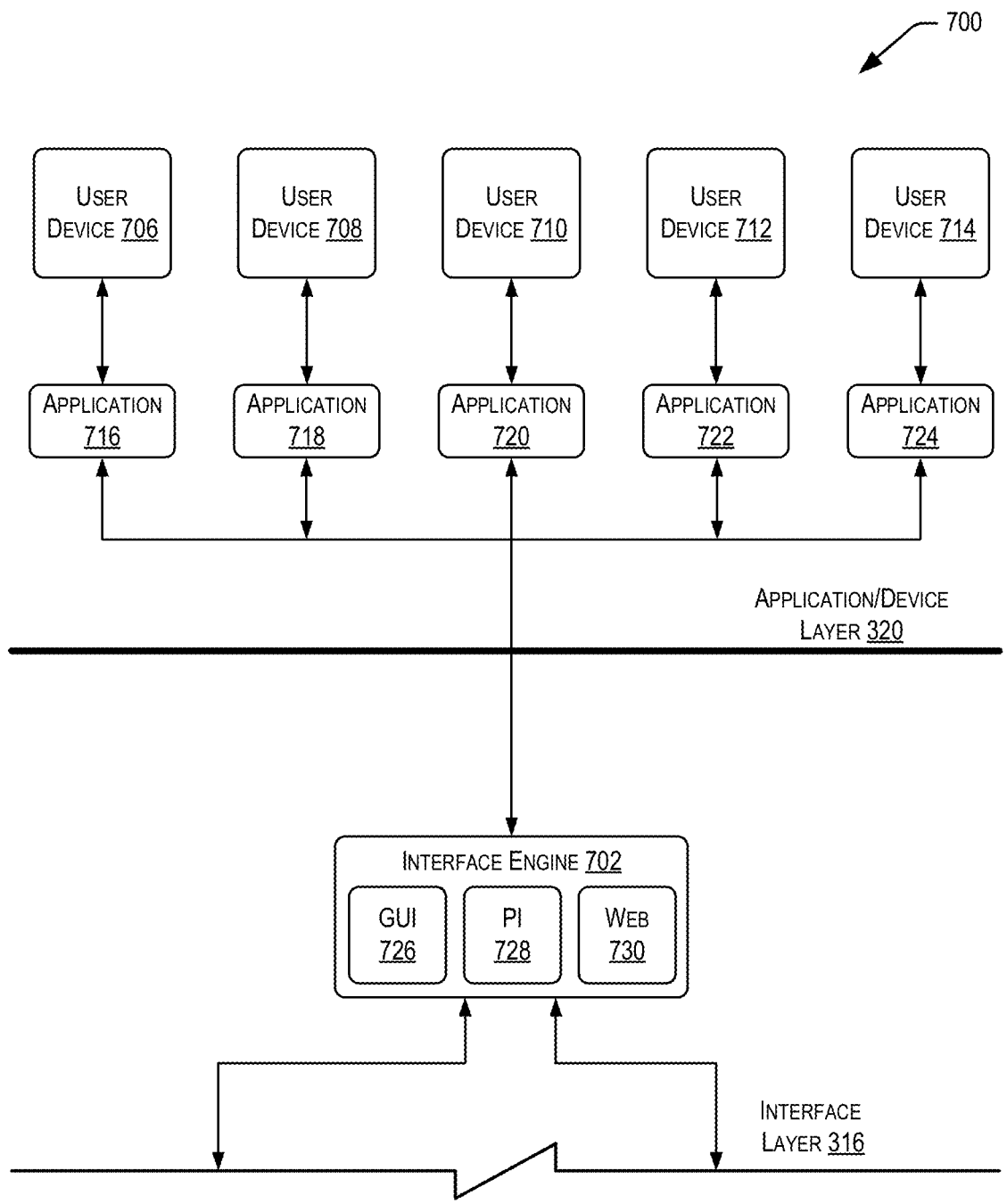
FIG. 7 illustrates a block diagram of a portion of the architecture stack, in accordance with embodiments of the present disclosure.

FIG. 7 shows a diagram 700 which depicts a portion of architecture stack 300 according to an embodiment of the present disclosure. In particular, diagram 700 may include interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access control layer 310 may be embodied.

Graphical user interface 726 is any suitable graphical user interface configured to interact with elements of the interaction system. Programmatic interface 728 may include an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive input, present dynamic presentations that depend on input, and otherwise respond to input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This may include detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 716-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that may be designed for particular users and/or uses. In one example, application 720 may include dashboards, widgets, windows, icons, and the like that are customized for an particular entity. In some examples, application 720 may present different data depending on a specialty associated with the entity and protected information associated with the entity. In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or actions, and the like. Application 720 may be configured to receive input, adjust presentations, present unprompted alerts, adjust display of content, move more relevant content to the foreground, move less relevant content to the background, populate forms for the entity.

In another example, application 722 may be specific for resources or types of resources. In this example, application 722 may include dashboards, widgets, windows, icons, and the like that are customized to individual resources. Similar to the example discussed above, in some examples, application 724 may present different data depending on a position of the resource. In this manner, application 722 adapts and automatically adjusts depending on the context in which the application is being used. For example, the resource may receive data, such as test results. In some examples, the application 722 (or any other application) may be configured to operate on a mobile device.

In some examples, application 724 may be a multi-role application for administrators and is used to control entities constitute the population of the entities within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 may provide different data depending on the role of the user. For example, whether data presented may include identifiable or de-identified information may depend on a position of the user.

In some examples, application 724 may be an operational intelligence application. In this example, application 724 is used to display operational information generated by components of the interaction system. This operational information may be used for operations, programming, and forecasting. Such operational information may include data because such data may impact operations, programming, forecasting, and the like. Accordingly, application 724 may present de-identified information in the form of one or more metrics, indicators, or the like as they pertain to operational intelligence.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
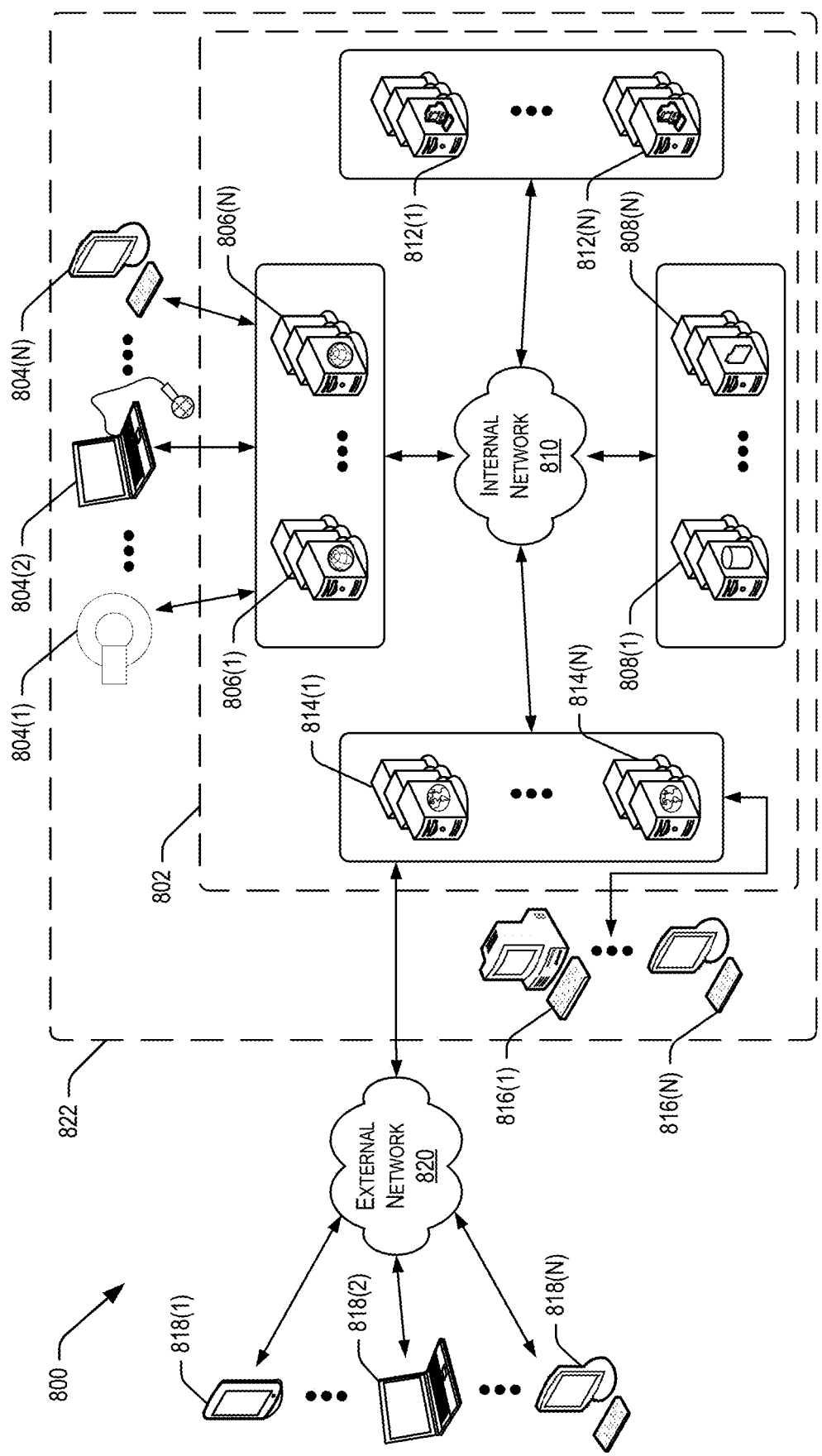
FIG. 8 illustrates an example schematic architecture illustrating the interaction system for processing data streams in accordance with protocols to selectively transmit content to endpoint devices to facilitate conferencing, in accordance with embodiments of the present disclosure.

Turning now to FIG. 8, an interaction system 800 is shown in accordance with an embodiment of the present disclosure. Interaction system 800 may correspond to interaction systems 100, 200 and may include an internal system 822 including a transformative integration engine 802. The transformative integration engine 802 is an example of transformative integration engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal system 822 may include generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810 that may correspond at least in part to the one or more network that may correspond at least in part to the one or more networks 120. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access control servers 812(1)-812(N) control access to the data retained in the data storage servers 808(1)-808(N). Access control servers 812(1)-812(N) communicate with the other elements of interaction system 800 via internal network 810 and in accordance with access control layer 310. Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) may be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) may run applications developed by third parties that access the other elements of interaction system 800 via the interfaces generated by interface servers 814(1)-814(N).

External user devices 818(1), 818(2), and 818(N) access the interfaces via external network 820 that may correspond at least in part to the one or more networks 120. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

The systems, environments, devices, components, models, and the like of FIGS. 1-8 may at least partially be used to implement a load-specific conferencing platform that facilitates presentation of contextual load information with synchronous conferencing environments, such as chat rooms and channels, each dedicated to a single load. Descriptions herein provide chat rooms as one example of conferencing environments. However, disclosed embodiments may be additionally applicable to other types of conferencing environments, including video and audio conferencing, web conferencing, virtual world conferencing, and/or the like, which may incorporate chat rooms and/or chat channels. As disclosed herein, the load-specific platform may allow for resources of a resource subsystem allocated to each load to be specified as users in the chat room that can communicate regarding the load, input textual command entries (e.g., slash commands to make orders, highlight facts to other users, etc.), ping other users to prompt other discussions (e.g., "@resource2 please screen"), and/or the like. The following figures illustrate further aspects of such a platform.

In various aspects, disclosed embodiments of the adaptive system 101 may provide for chat communication mapping and generation features. With a large-scale number of loads, resources, and ongoing changes with respect to loads and resources allocated to the loads, the platform may provide the intelligence to learn and map the changes in order to route communications to the appropriate chat rooms. The adaptive system 101 may infer which chat room is appropriate for which communication without explicit user selection. In some cases, this may be inferred from resource assignments. In some cases, this may be initiated by recognizing which data set changes affect which loads.

Some resource communications may be mapped to multiple loads. For example, the adaptive system 101 may detect allocation changes of resources of resource subsystems and generate corresponding communications/updates to the appropriate chat rooms. Say a resource is newly allocated to only a subset of collocated loads (e.g., collocated in particular rooms, floors, sections, etc.). The adaptive system 101 may identify the chat rooms mapped to the subset and may update only those chat rooms to reflect the allocation change.

In various aspects, disclosed embodiments of the adaptive system 101 may provide for selectively adding a resource as a user to a load-specific chat room including other resources as users. A load-specific chat room may include a set of preassigned users (e.g., resources) associated with a load. This set of preassigned users may constitute a resource subsystem for the load. In some examples, one or more bots may watch for updates to a data set that defines the resource subsystem. When a change is detected in the data set, a bot may automatically add or remove one or more users from the chat room based on the change. The one or more bots may also monitor messages (e.g., HL7 messages in message streams on the messaging bus 430 that are different and distinct from the chat room messages) relating to the load in order to add or remove users from the chat room. For instance, if vital signs of the load indicate sepsis, a resource with a corresponding resource specification (e.g., a sepsis coordinator role) may be automatically added.

In some examples, one or more bots may also monitor the conversations in the chat rooms. Based on this monitoring, the bot may determine that users should be automatically added or removed from the chat room. For instance, when the load is moved to a particular floor and a user posts about it, a floor coordinator for that floor may be automatically added to the chat room. A bot and/or another aspect of the adaptive system 101 may also monitor the actual conversations in one or more physical rooms or other areas, processing sensor data captured with one or more sensors. For example, the adaptive system 101 may infer which resource communications captured by microphones and/or other sensor devices should be mapped to which loads in the particular rooms in which the particular sensor devices detect conversations (which could include differentiating in situations where there are multiple loads and/or resources detected per room). The adaptive system 101 may accordingly learn and map the changes in order to route communications to the appropriate chat rooms.

In various aspects, disclosed embodiments of the adaptive system 101 may provide for conversation monitoring and corresponding workflow suggestions in a load-specific chat room based on the monitoring. For example, different bots may monitor ongoing conversations in the chat room and message stream data to determine what and when to post in the chat room. The bots may be specific to conditions, events, and/or the like. The monitoring may detect commands directed to the bot (e.g., \vitalpic), and may make automatic detections based on rule sets (e.g., the bot may detect "@resource2 what is the status?" and may then detect and provide a predefined status). In response to such commands, the adaptive system 101 can pull data corresponding to the commands and present the data in the chat room with links to further details. Additionally, when the monitored conversation indicates certain events, the bot can suggest workflows corresponding to the events. For example, if a bot determines that a load is preparing for discharge, the bot may present a list (which may correspond to an interactive, adaptive checklist in some embodiments) of discharge tasks for one or more resources of the resource subsystem.

In various aspects, disclosed embodiments of the adaptive system 101 may provide for the load data monitoring and corresponding workflow suggestions in a load-specific chat room based on the monitoring. For example, the adaptive system 101 can monitor load data and determine what and when to post in the chat room. The adaptive system 101 can listen for data (e.g., HL7, X12N, ASTM, HL2, HCPDP) and other data relating to the load with the data sets outside of the chat room context. Likewise, the adaptive system 101 may monitor load metrics detected regarding the load that can be collected via devices associated with load. The adaptive system 101 may determine when load metrics and/or other load data satisfy certain criteria and post when appropriate (e.g., "sepsis detected based on abx, temperature, and pulse-rate"). Further, the bot can suggest workflows corresponding to the detected metrics and/or conditions. Thus, the bots may react to monitoring by presenting vital data, suggesting workflows, etc.

In various aspects, disclosed embodiments of the adaptive system 101 may provide for creation, population, completion, and acceleration of documentation processes based on conversations in load-specific chat rooms. With some examples, bots may monitor ongoing conversations in load-specific chat rooms in order to create, populate, complete, and accelerate documentation based on the conversations. Among other advantages, this approach may help to avoid double documentation. A documentation acceleration bot may apply rules that define what type of documentation is required for different procedures, orders, diagnoses, visits, etc. In addition to monitoring a chat room conversation, the bot can access a load data set and data (e.g., HL7, X12N, ASTM, HL2, and/or HCPDP data) to at least partially complete the documentation and fill in the holes. For example, a surgery may be identified from the load data set and the conversation may be used to provide documentation relating to the surgery and post-surgery recovery.

In various aspects, disclosed embodiments of the adaptive system 101 may provide for resource subsystem member-specific chat interface filtering based on resource subsystem member roles. With each load-specific chat room dedicated to a particular load, a large amount of chat detail can accumulate for a given chat room. However, not all users need to see all the historical chatter captured in the chat room. Some roles need a micro level of detail; other roles only need a macro level of detail or a select set of chat details. In some examples, a bot can select a level of detail appropriate for a given chat user, where the level of detail is a function of the user role and the historical chat specific to the chat room. Thus, an interface presented for a resource having a particular role may be different content-wise from an interface presented for a resource having a different role.

In various aspects, disclosed embodiments of the adaptive system 101 may provide for chat thread content customization. With various cases, certain users only need to see a synopsis. In some examples, a bot can generate customized interface views and chat content that are a function of the user role, the load, the context of the historical chat specific to the chat room, time (recency), and the load data. Thus, an interface presented for a resource having a particular role and/or a particular specialty may be different visually and content-wise from an interface presented for a resource having a different role and/or different specialty.

In various aspects, disclosed embodiments of the adaptive system 101 may provide for chat room interface presentation adaptation according to resource subsystem member. The summary of chat content and other chat content provided by way of the chat room interface may be adapted for presentation to the user in various ways. The interface could visually change the summary of chat content and/or relatively heavily weighted items flagged for the particular user's attention to add emphasis by way of content and window positioning, modal windows, graphical characteristics, and the like. In a similar manner, the adaptive interface generation could adapt based on the tasks, suggestions, and checklists. For example, based on the context and potentially the user role, the interface could visually change to emphasize tasks by way of content and window positioning, modal windows, graphical characteristics, and the like that need to be done (e.g., with respect to a checklist for, say, discharge preparation). In a similar manner, the adaptive interface generation could adapt based on the tasks, suggestions, and checklists. For example, based on the context and potentially the user role, the interface could visually change to emphasize tasks by way of content and window positioning, modal windows, graphical characteristics, and the like that need to be done (e.g., with respect to a checklist for, say, discharge preparation).

In various aspects, disclosed embodiments of the adaptive system 101 may provide for determining when action items should be escalated based on monitoring for significant action items, time sensitivities, and whether the action items have been completed. The bots can accordingly present data in a proactive way, and chat room interface presentations may be adapted according to priority particular to each resource subsystem member. The adaptive system 101 may implement one or more chat content qualification processes to determine prioritization of chat content items for the particular team member. The chat content items, for example, may include conditions and trigger events, workflows and workflow items, load metrics, and chat messages corresponding to the particular load and chat room. The priority escalation measures can include scaled notifications through other media channels, the visually changes summarized above, and walking the resource subsystem member through the suggested workflow. In some embodiments, one user may adjust the priority of data presented to another.

As disclosed herein, the adaptive system 101 may be configured to process data streams in accordance with protocols to selectively transmit content to endpoint devices to facilitate conferencing. In so doing, the adaptive system 101 may receive, via one or more networks, a plurality of electronic communications from endpoint devices. The adaptive system 101 may segregate and route electronic communications of the plurality of electronic communications to facilitate a plurality of conferencing environments. Each conferencing environment of the plurality of conferencing environments may be mapped to a load identifier and a population of resource identifiers. Each resource identifier of the population of resource identifiers may correspond to authenticated access to a subset of the electronic communications addressed to the conferencing environment.

Figure 9:
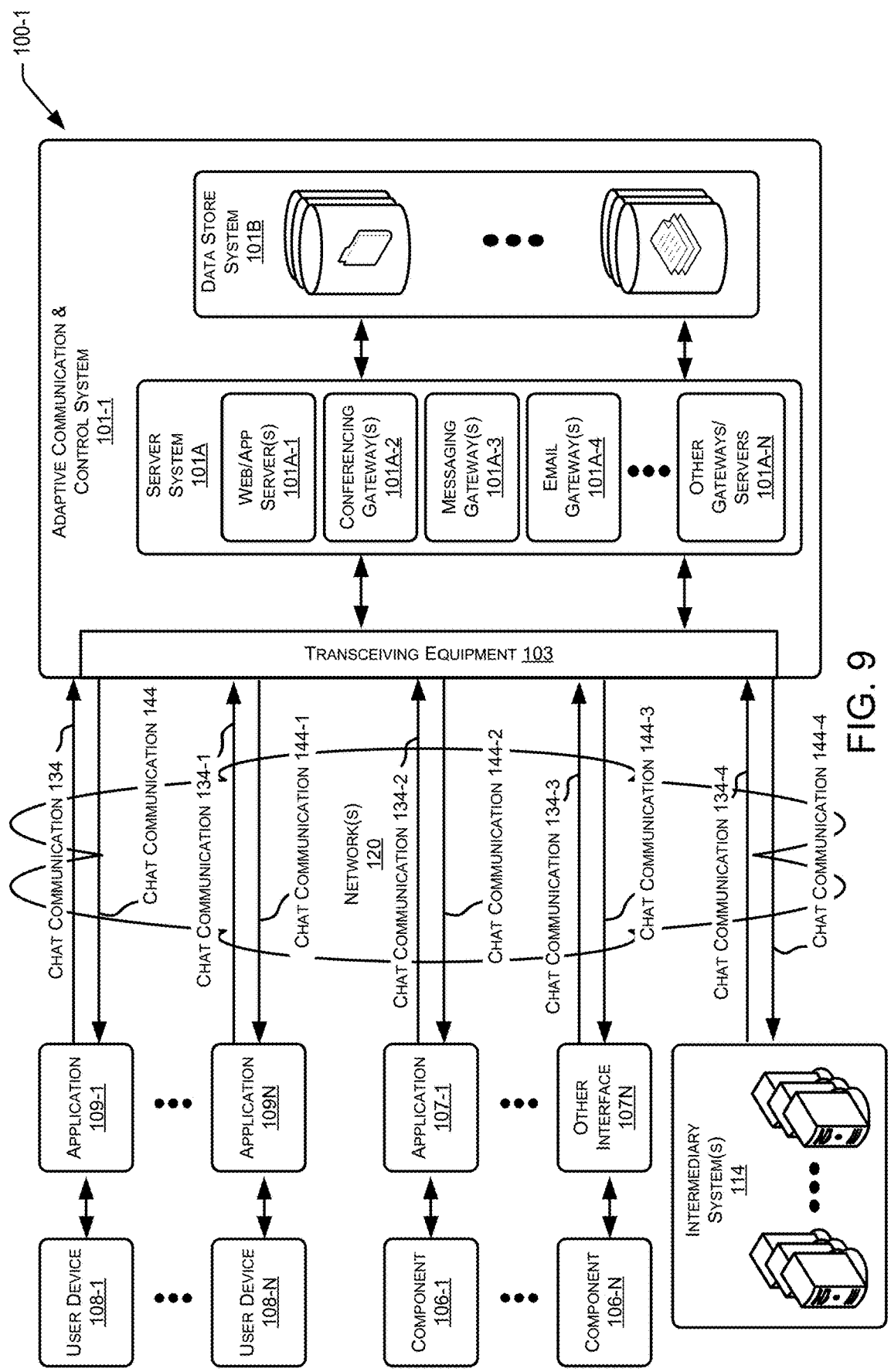
FIG. 9 illustrates a diagram of a distributed network for implementing certain embodiments of the adaptive system to provide a load-specific platform, in accordance with embodiments of the present disclosure.

For example, FIG. 9 depicts a simplified diagram of a distributed network 100-1 for implementing certain embodiments of the adaptive system 101 to provide a load-specific platform in accordance with present disclosure. The adaptive system 101 may be communicatively coupled with the one or more user devices 108 and the one or more components 106 via one or more networks 120, one or more of which may be remotely located from the adaptive system 101. The one or more user devices 108 and the one or more components 106 may be configured to execute and operate via various applications 109, applications 107, and/or other interfaces 107 in order to interface with system 101. The connections between the one or more components 106 and the one or more user devices 108 and the transformative integration engine 102 and the transaction management engine 104 may include any suitable network connection.

The applications 107 may be or include synchronous conferencing applications, such as chat applications, run with user devices 108, that facilitatate textual, video, graphical, and/or audio conferencing via chat rooms/channels in accordance with embodiments disclosed herein. The adaptive system 101 may provide for many chat rooms/channels, each being dedicated to a single load and may utilize the interface engine 224 to facilitate chat interfaces disclosed herein.

Figure 10:
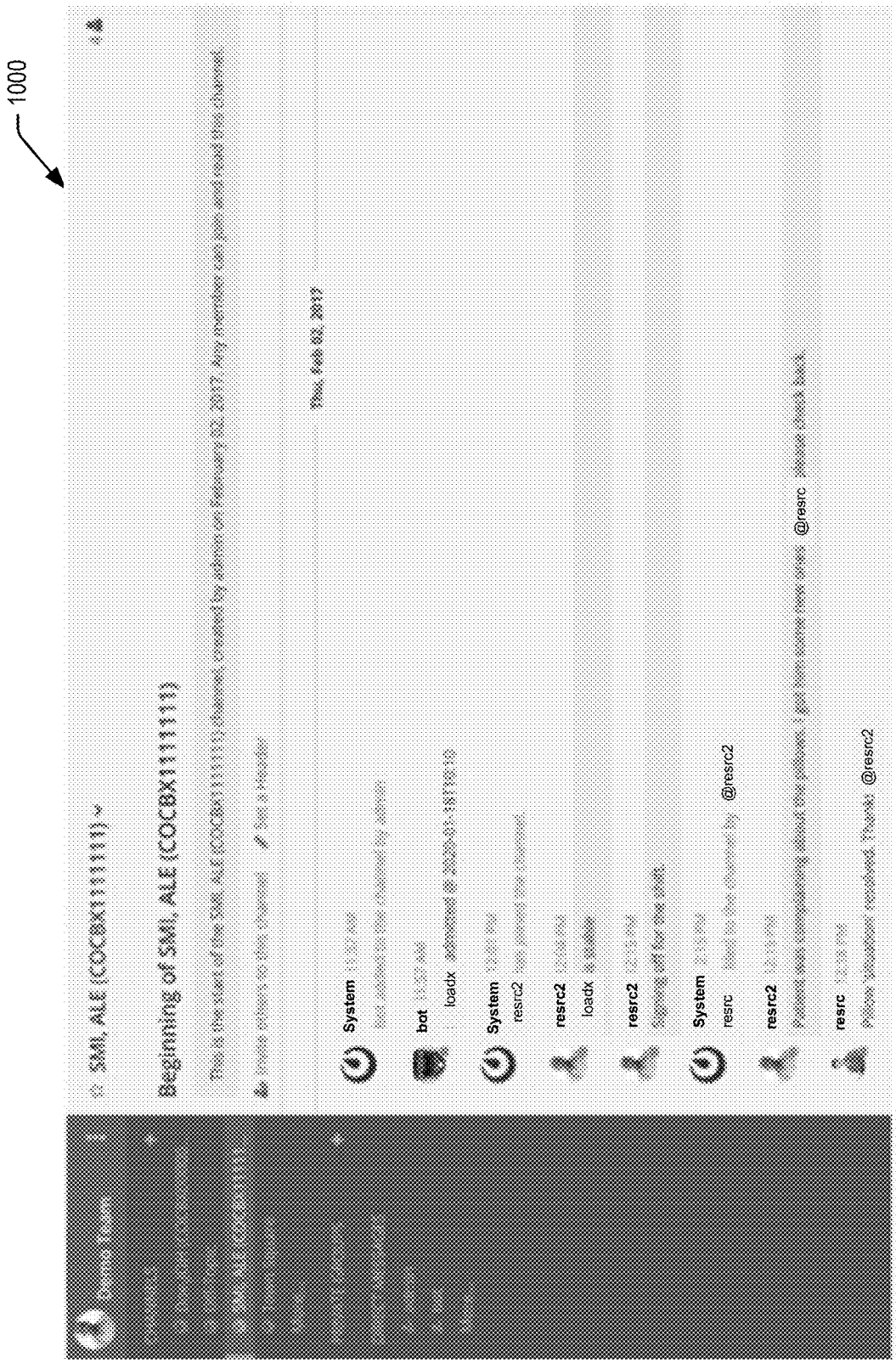
FIG. 10 illustrates a portion of an exemplary chat interface that may be used to facilitate contextual multiuser chat communication, in accordance with embodiments of the present disclosure.

To illustrate one possible chat interface, FIG. 10 depicts an exemplary chat interface 1000 that may be used to facilitate contextual multiuser chat communication, in accordance with embodiments of the present disclosure. The chat interface 1000 may represent the screenshot of one simplified illustration of a load-specific chat room with chat messages provided by various resource subsystem members and a bot associated with the chat room. The chat interface 1000 illustrates various features described further herein.

Referring again to FIG. 9, the user devices 108 may, for example, correspond to one or a combination of user devices 706-714 disclosed herein. The applications 109 may be or include interfaces configured to send data from the components 106 to the adaptive system 101-1 and receive communications and commands for the components 106 from the adaptive system 101-1 in order to facilitate the various chat features disclosed further herein. In various embodiments, the applications and other interfaces 109, 107 may further include one or a combination of applications such as web browsers, direct messaging applications, email applications, short message service (SMS) applications, multimedia message service (MMS) applications, instant messaging applications, fax applications, voice applications, video applications, proprietary client messaging applications such as iMobile and LoadKeeper, and/or other suitable messaging service applications or other interfaces.

In various embodiments, the one or more networks 120 may include one or a combination of any type of network that may support data communications using any of a variety of available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Zigbee, Bluetooth® (a family of standards promulgated by Bluetooth SIG, Inc.), Bluetooth Low Energy, Near Field Communication (NFC), and the like. Merely by way of example, network(s) 120 may be local area networks (LAN), such as one based on Ethernet, Token-Ring, and/or the like. Network(s) 120 also may be wide-area networks, such as the Internet. Networks 120 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 120.

In the illustrated simplified example, the adaptive system 101-1 may include a server system 101A and a data store system 101B. In various embodiments, the server system 101A may be adapted to run one or more services or software applications. In some embodiments, these services may be offered as web-based or cloud services or under a Software as a Service (SaaS) model to the user devices 108 and/or the components 106. The user devices 108 and/or the components 106 may in turn utilize one or more client applications to interact with the server system 101A to utilize the services provided by these components. The server system 101A may run any suitable operating system and may also run any of a variety of additional server applications and/or mid-tier applications, such that server system 101A may include one or a combination of web servers, HTTP (hypertext transport protocol) servers, Internet Information Services servers, FTP (file transfer protocol) servers, CGI (common gateway interface) servers, JAVA® servers, database servers, and/or the like. Exemplary database servers include without limitation those commercially available from Oracle, Microsoft, Sybase, IBM (International Business Machines), and the like. In the illustrated example, the server system 101A may include one or more web and/or application servers 101A-1, one or more conferencing gateways 101A-2 (e.g., a synchronous conferencing gateway configured to facilitate textual, video, graphical, and/or audio chat and/or other forms of synchronous conferencing), one or more messaging gateways 101A-3, one or more email gateways 101A-4, one or more other gateways and/or other types of servers 101A-N, such as a telephony gateway or an application gateway to interface with different servers.

The data store system 101B may include one or more databases that may reside in a variety of locations. By way of example, one or more databases may reside on a non-transitory storage medium local to (and/or resident in) the server system 101A. Alternatively, databases may be remote from the adaptive system 101A and in communication with the adaptive system 101A via a network-based or dedicated connection. In one set of embodiments, databases may reside in a storage-area network (SAN). Similarly, any necessary files for performing the functions attributed to the adaptive system 101A may be stored locally on the adaptive system 101A and/or remotely, as appropriate. In one set of embodiments, the databases of the data store system 101B may include relational databases that are adapted to store, update, and retrieve data in response to SQL-formatted commands.

As disclosed further herein, some embodiments of the adaptive system 101-1 may be configured to have a service-oriented architecture and may be configured to provide service-oriented web services to endpoint devices (e.g., the user devices 108 and/or the components 106). For example, the adaptive system 101-1 may provide web-based services that facilitate the sending and receiving of chat messages and/or other communications to endpoints on behalf of client applications 109, 107 and interfaces 107. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server system 101A and the user devices 108 and/or the components 106. With various embodiments, the client applications 109, 107 and interfaces 107 may be any application or interface that supports HTTP. SSL or TLS may use HTTP or HTTPS to provide authentication and confidentiality. In other examples, web services may be implemented using REST over HTTPS with the OAuth open standard for authentication, or using the WS-Security standard which provides for secure SOAP (e.g., Simple Object Access Protocol) messages using Extensible Markup Language (XML) encryption. The server system 101A may include specialized hardware for providing secure web services. For example, the hardware may include secure network appliances having built-in features such as hardware-accelerated SSL and HTTPS, WS-Security, and firewalls. Such specialized hardware may be installed and configured in front of web servers of the server system 101A, so that any external devices may communicate directly with the specialized hardware.

The endpoint devices may transmit chat communications 134 via the one or more networks 120. The application 107, 109 of a given endpoint device may be configured to send the chat communications 134, which, for example, may be application programming interface (API) calls to the web service to pass payloads for sending with messages (which may be chat or other synchronous conferencing messages, or may be another type of messages in accordance with embodiments disclosed herein). With some embodiments, the chat communications 134 may be HTTP calls that may or may not be made via web interface. For example, with some embodiments, as long as the endpoint device has a command line interface, the endpoint device make the HTTP calls corresponding to the chat communications 134.

The adaptive system 101 may receive and transmit chat communications 134 via transceiving equipment 103. For example, responsive to received chat communications 134, the adaptive system 101 may provide chat communications 144. The provided chat communications 144 may include transmitting chat content to user devices 108. For example, the adaptive system 101 may receive a chat communication 134 from a user device 108 and may transmit the chat communication 134 to one or more other user devices 108 for presentation in a chat room/channel. Further, in various embodiments, the particularized chat communication 134 may be a message directed to the adaptive system 101 that the adaptive system 101 then translates into a chat room message. For example, in various embodiments, the chat communications 134 may include types of messages corresponding to short message service (SMS), a multimedia message service (MMS), an instant messaging service, text-to-voice, text-to-conference (read a text over phone then join to conference), text-to-chat, iMobile, LoadKeeper, email, fax, voice, chat, and/or the like.

The adaptive system 101 may listen for data changes in one or more data streams, each data stream of the one or more data streams corresponding to a particular source and may include a plurality of data elements. The sources of such data streams may be separate and distinct from the user devices 108 transmitting chat communications 134. For example, the provided chat communications 134 may include unidirectional messages such that the that endpoints provided the chat communications 134 do not receive responsive messages from receiving entities. One or more components 106 (e.g., a diagnostic, monitoring, and/or treatment machine 106 and/or a sensor 106) may transmit chat communications 134 (e.g., load-specific data and/or sensor data) to the adaptive system 101-1. Such chat communications 134 may be responsive to commands or requests from the adaptive system 101-1. Once the adaptive system 101-1 receives such a chat communication, the adaptive system 101-1 may then translate to chat content for provisioning to one or more chat channels without the one or more components 106 receiving responsive messages from the chat channel users. However, as with most synchronous conferencing, the chat communications 134, 144 may be bidirectional such that the users of a particular chat channel receive messages originating from other users.

In some embodiments, the one or more components 106 and the one or more user devices 108 may communicate with the transformative integration engine 102 and the transaction management engine 104 via one or a combination of a specified information format, protocol, encryption technique, language, and/or the like. However, in various embodiments, the one or more components 106 and the one or more user devices 108 may communicate with the transformative integration engine 102 and the transaction management engine 104 via different information formats, different proprietary protocols, different encryption techniques, different languages, different machine languages, and the like. The transformative integration engine 102 may be configured to receive these many different communications from the one or more components 106, and in some examples from the one or more user devices 108, in their native formats and transform them into any of one or more formats suitable for the chat rooms/channels disclosed herein. The received and/or transformed communications may be transmitted by the adaptive system 101 to one or more other devices (e.g., the transaction management engine 104, an entity device, and/or another user device 108) and/or locally or remotely stored. In some examples, the transformative integration engine 102 receives data in one or more formats (e.g., HL7, X12N, ASTM, HL2, and/or HCPDP format) or conforming to any other suitable format and/or may be configured to transform received data to conform with the HL7 format or another format.

In some embodiments, the adaptive system 101 may provide for a federated messaging platform that allows for integration with various client applications and products, where each may correspond to a different proprietary platform, software, equipment, formats, and/or the like, into the chat rooms/channels disclosed herein. The adaptive system 101 may include a plurality of virtual pipes or domains, and may handle electronic communications from each endpoint device and/or application with a receiving service and a router subsystem that receive, inspect, validate, convert, and translate messages in order to create messages to route to the appropriate chat channel (room). The adaptive system 101 may function as a single synchronous conferencing turntable between devices 108, 106. In effect, such functioning reduces the number of point-to-point connections between communicating endpoint devices. Thus, each endpoint device may direct communications through the adaptive system 101 instead of going directly to other endpoint devices, servers, services, etc.

Figure 11:
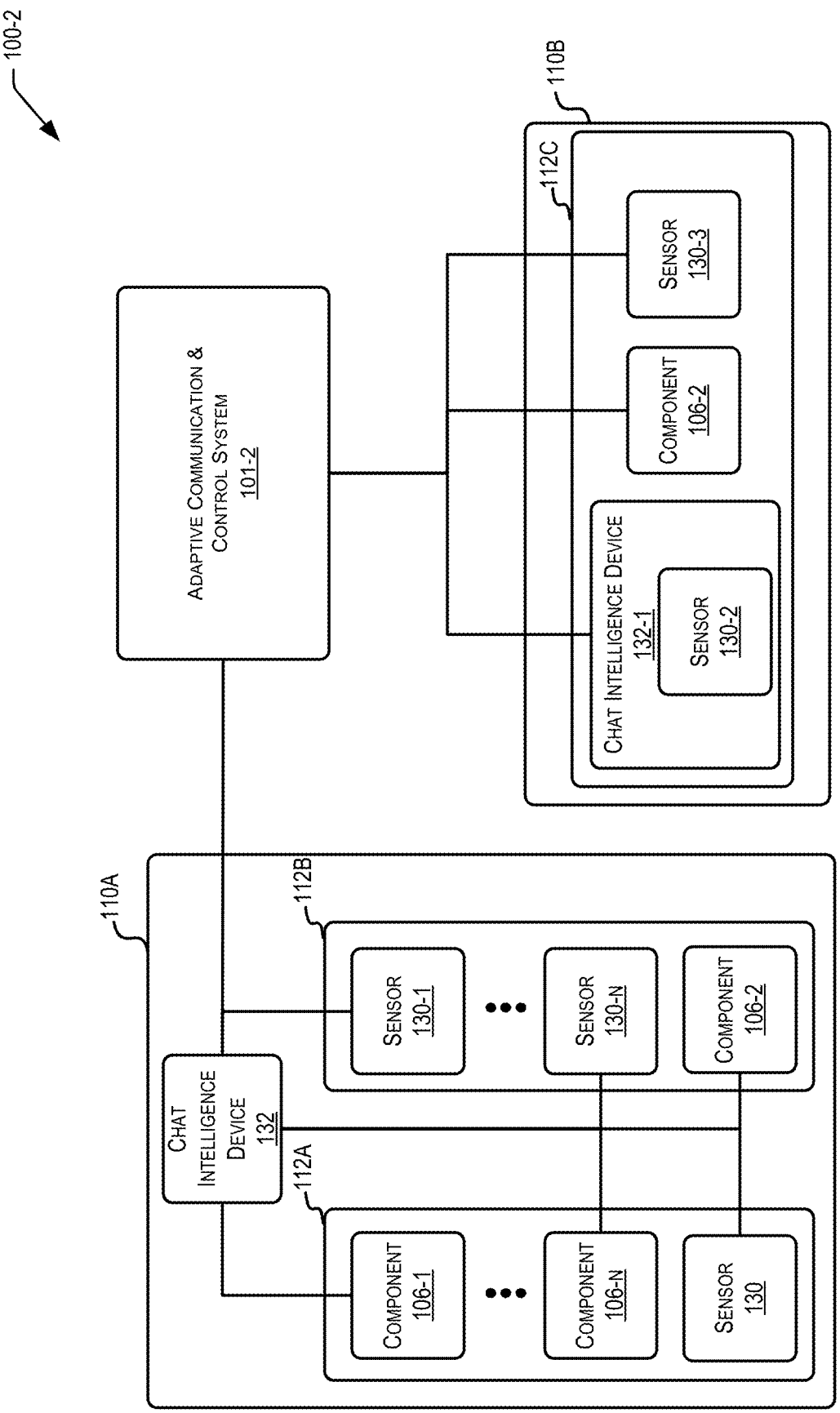
FIG. 11 illustrates a block diagram of the adaptive system of the interaction system, in accordance with embodiments of the present disclosure.

Referring next to FIG. 11, illustrated is a block diagram of the adaptive system 101-2 of the interaction system 100, in accordance with disclosed embodiments of the present disclosure. Generally, in the network 100, data can be generated at one or more of the adaptive system components 106 and/or the user devices 108. The depicted instance shows two facilities 110a, 110b. Other embodiments may include any different number of facilities. In one instance, each of the facilities 110a, 110b corresponds to or includes one or more buildings (e.g., hospitals). In another instance, the facilities 110a, 110b may correspond to subsections of a building (e.g., floors, sections, wings, rooms, etc.). Each facility 110 may include one or more units 112. In the depicted instance, a first facility 110a includes two units 112a and 112b, and a second facility 110b includes one unit 112c.

Each unit 112 may correspond to a particular space (e.g., as defined by geographic coordinates, altitude, a floor, a room number, etc.). Units within a given facility (e.g., 112a and 112b) may be geographically separated from each other, such as being within or being different rooms. In one instance, each of at least some units 112 within a facility may be of a same or similar type; may be configured for a same or similar type of use and/or may have one or more same or similar specifications or characteristics (e.g., dimensions, sizes, or intra-unit components). In one instance, each of at least some units 112 within a facility may be of different types, may be configured for different types of use and/or may have one or more different specifications or characteristics. In one instance, a unit (e.g., each of one, more, or all of units 112a-112c) may be an operating room.

Within each unit may be one or more components 106 and/or one or more sensors 130. In various embodiments, a given component 106 and/or sensor 130 may, or may not, be fixed in place (i.e., stationary), restrained to limit mobility or fully movable. A component 106 may include, for example, an anesthetic machine, operating room table, light or monitor stand (e.g., that includes one or more displays to display sensor data). A component 106 may be configured to be used by an operator or user (e.g., a resource). In some embodiments, one or more separate devices may be connected with the component 106 and/or sensor 130 to enable system communication with the component 106 and/or sensor 130. The communication device may be in the form of a dongle. In various embodiments, the component 106, sensor 130, and/or other communication device may be configured to allow for ZigBee®, Z-Wave®, and/or other forms of wireless communication, e.g., via a local wireless network. In various embodiments, the component 106, sensor 130, and/or other communication device may communicatively connect with other system portions via a USB port or via some other type of (wired) communication port.

The one or more sensors 130 may include one or more microphones and/or another audio sensor which may or may not be dedicated to capturing audio data for audio analysis. The one or more sensors 130 may include, for example, one or more cameras. The camera can be any device configured to generate image and/or audio data including, for example, still image data, video image data, and/or any sound data, corresponding to detected phenomena. The camera(s) may, in some embodiments, include infrared sensors. The camera(s) may provide a video and, in some embodiments, an audio stream. The one or more sensors 130 of different types may include infrared sensors, heat sensors, and/or other sensors configured to monitor a characteristic of an ambient environment (e.g., motion, light, vibration, temperature, humidity, and/or the like) or a characteristic of a load (e.g., a heart rate, blood pressure or oxygen). In some embodiments, the camera(s) may include one or more infrared cameras. In various embodiments, a sensor 130 may be a sensor coupled to and/or integrated with a component 106. For example, a sensor 130 may be configured to detect whether an added weight has been placed on part of a component. As another example, a sensor 130 may be included within an electronic tag reader component so as to detect electronic tag signals (e.g., a RFID signal, RuBee signal) from the electronic tag/transponder, which may be excited by signal emitted from an antenna of the electronic tag reader component. As yet another example, a sensor 130 may be included within an equipment-tracking component so as to detect equipment tags. As still another example, a sensor 130 may include a receiver to receive signals from one or more signal sources (e.g., GPS satellites or Wi-Fi access points) to enable identifying a location of a device coupled to or including the sensor.

A component 106 and/or sensor 130 may be configured to transmit chat communications 134 to the adaptive system 101 upon trigger events as disclosed herein. The electronic communications may be transmitted to the adaptive system 101 as chat communications 134, for example, upon detecting a signal that satisfies one or more thresholds, such as a sensor reading corresponding to a characteristic of a load that satisfies a threshold condition (e.g., an indicator of the load having sepsis); upon detecting a new type of signal (e.g., detecting a presence of a new device); at regular times or intervals; upon receiving a request; and/or upon detecting that a transmission condition has been satisfied. The electronic communication may be transmitted to a device that may be near or remote from the component and/or sensor. The electronic communication may include (for example) sensor-collected data, inputs received at a component, an indication that an event has been detected, an indication that a transmission condition has been satisfied, an identifier of the component 106 or sensor 130, and/or a location of the component 106 or sensor 130. The electronic communication may be transmitted, for example, over a wireless network, Wi-Fi network, short-range network, Bluetooth network, local area network, and so on, as disclosed with various embodiments herein.

A facility 110 may also include a chat intelligence device 132, which may, in various embodiments, be included in the adaptive system 101 and/or communicatively coupled to the adaptive system 101. In various instances, a chat intelligence device 132 may be located within a unit 112 and/or a facility 110. In various embodiments, a chat intelligence device 132 may include and/or may be communicatively coupled to (e.g., via a wireless or wired connection) one or more components 106 and/or one or more sensors 130. Various embodiments of the chat intelligence device 132 may be configured to provide a local integration interface for one or a combination of the sensors 130, components 106, and/or user devices 108. As such, the chat intelligence device 132 may be configured to communicate with one or a combination of the sensors 130, components 106, and/or user devices 108. As a monitoring device, the chat intelligence device 132 may receive sensor data corresponding to phenomena sensed by the sensors 130. In various embodiments, the chat intelligence device 132 may include one or more sensors 130 to detect the phenomena local to a unit 112 and/or a facility 110 and/or may include one or more presentation devices to visually and/or audially present information to local users. For example, the chat intelligence device 132 may include a smart speaker, a display device, and/or one or more other I/O devices to facilitate local user interface. In various embodiments, a chat intelligence device 132 may correspond to a standalone device or may be integrated with a user device 108 and/or component 106. The chat intelligence 132 may collect component data and facilitate the various features disclosed herein that utilize component data.

Figure 12:
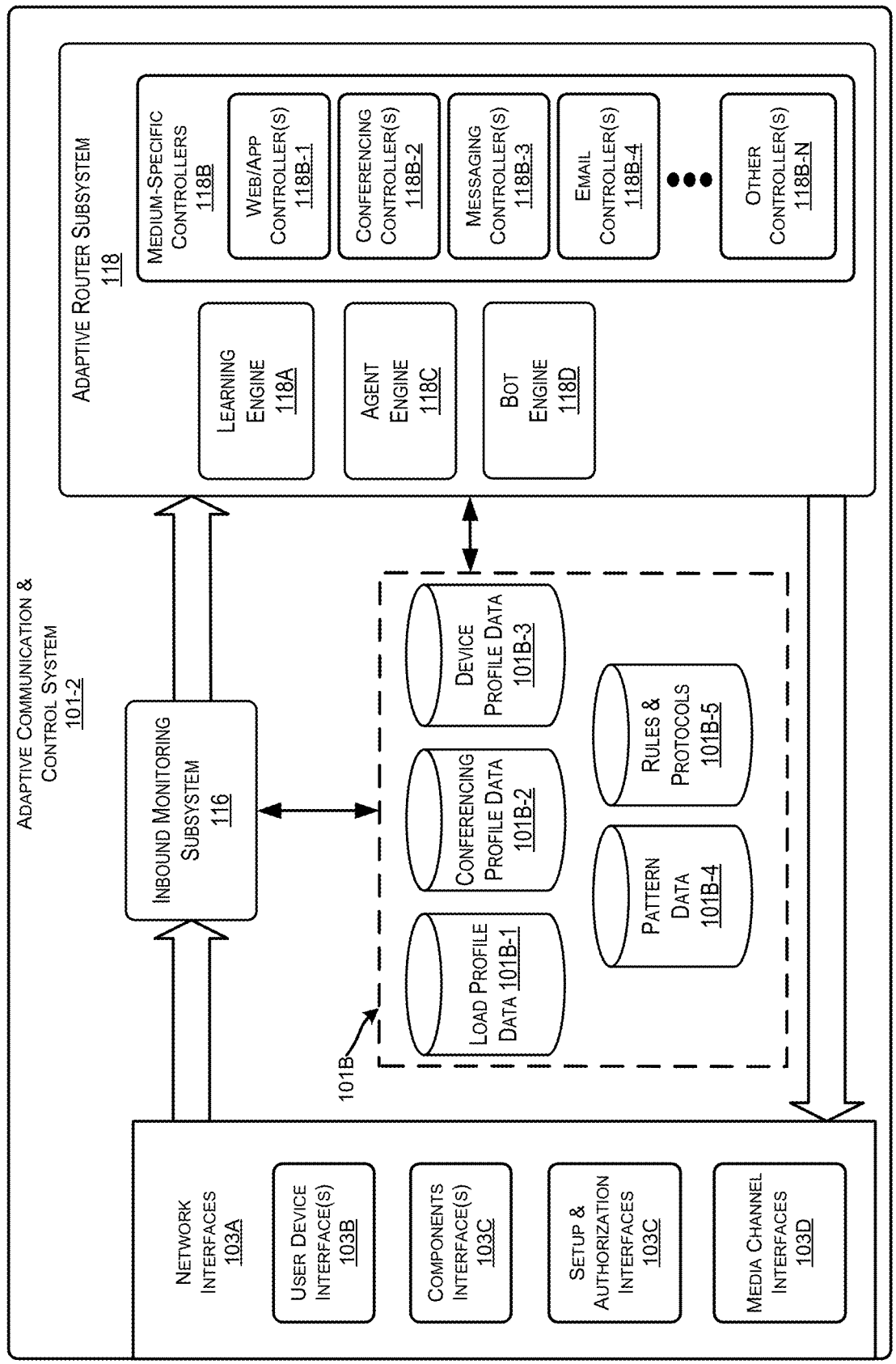
FIG. 12 illustrates a block diagram of certain aspects of the adaptive system in accordance with present disclosure, in accordance with embodiments of the present disclosure.

FIG. 12 depicts a diagram of certain aspects of the adaptive system 101 in accordance with present disclosure. The adaptive system 101 may be configured to manage one or more sub-modules, engines, components, and/or services directed to examples disclosed herein. While these aspects may be illustrated in the figures and may be described as performing discrete tasks sometimes with reference to the flow charts, it should be understood that such are example configurations and other configurations performing other tasks and/or similar tasks as those described herein may be implemented according to the techniques described herein. For example, other engines, whether embodied in software or hardware, may perform the same tasks or other tasks and may be implemented in a similar fashion or according to other configurations. While engines, repositories, and other components are described separately in this disclosure, it should be appreciated that the components may be combined and/or implemented differently in any combination to provide certain features in various embodiments with hardware, software and/or firmware. In various embodiments, different processes running on one or more shared resources may implement some of the components.

The adaptive system 101 may include a plurality of various network interfaces 103A. In various embodiments, the network interfaces 103A may include user device interfaces 103B and component interfaces 103C (which may include sensor interfaces for components 106 corresponding to sensors). In various embodiments, the adaptive system 101 may provide the applications 716-724 to the user devices 706-714, communicate with the user devices 706-

714 via the applications 716-724, and/or otherwise facilitate chat interfaces via user device interfaces 103B to expose chat features to the user devices 706-714. In some embodiments, the user device interfaces 103B may include the chat interfaces. Similarly, the adaptive system 101 may provide the applications to the components 106, communicate with the components 106 via the applications, and/or otherwise facilitate communications via component interfaces 103C to gather data and sensor data from the components 106 and to control load-coupled equipment and sensors corresponding to the components 106.

In some embodiments, the network interfaces 103A, such as the user device interfaces 103B and the component interfaces 103C, may include an API to interact with the adaptive system 101. For example, the user device interfaces 103B and/or the component interfaces 103C may include one or more API interfaces to transmit to and/or receive communications from one or a combination of user devices 108, components 106, and/or intermediary system 114 using APIs. For example, as disclosed herein, the user devices 108 and components 106 may interact with the adaptive system 101 through API calls, e.g., when sending chat communications 134. The network interfaces 103A may include one or more setup and authorization interfaces 103C that facilitate the initial configuration setup processes disclosed further herein. Further, the network interfaces 103A may include one or more media channel interfaces 103D to transmit to and/or receive communications from one or a combination of user devices 108, components 106, and/or intermediary system 114 using various media channels.

Thus, the network interfaces 103A may include one or more APIs that define protocols and routines for interfacing with the user device interfaces 103B and/or the component interfaces 103C sources via an API interface. The APIs may specify API calls to/from the user device interfaces 103B and/or the component interfaces 103C. In various embodiments, Secure Shell (SSH), Telnet, Simple Network Management Protocol ("SNMP"), and/or any other suitable protocol may be used to facilitate communications between the adaptive system 101 and the s the user device interfaces 103B and/or the component interfaces 103C.

In various embodiments, the network interfaces 103A could use a number of API translation profiles configured to allow the server system 101 to interface with the user devices 108, components 106, and/or intermediary system 114. For example, the server system 101 may use API translation profiles to translate the protocols and routines of the data source system to integrate with the adaptive system and allow communication with the adaptive system 101 by way of API calls. In various embodiments, the components 106 may be running software, e.g., developed in Linux, in some instances, and may be configured to send calls via the API to send messages any time a trigger event is detected.

In various embodiments, the adaptive system 101 may include, provide, and/or be configured for operation with the chat interfaces, for example, by making available and/or communicating with one or more of a website, a web page, a web portal, a web application, a mobile application, enterprise software, and/or any suitable application software to facilitate the emulator interface. In some embodiments, the chat interface may cause a web page to be displayed on a browser of a user device. The web page(s) may display output and receive input from a user (e.g., by using Web-based forms, via hyperlinks, electronic buttons, etc.). The adaptive system 101 may provide web applications to a user device for execution in a web browser running on the user device; and the web applications may include scripts, such as Java, JavaScript, etc., for execution within an isolated environment in a browser. A variety of techniques can be used to create the web pages and/or display/receive information, such as JavaScript, Java applications or applets, dynamic HTML and/or AJAX technologies. In some embodiments, the adaptive system 101 may provide rich-client chat applications to a user device; and the rich-client applications may be programmed in traditional programming languages to have full access to functions of the operating system running on the user device. In some embodiments, the chat interface may include or work with a mobile application.

Among other things, the adaptive system 101 may include an inbound monitoring subsystem 116, in addition to the adaptive router subsystem 118. In various embodiments, the inbound monitoring subsystem 116 and the adaptive router subsystem 118 may be separate, integrated, or one and the same portion of the adaptive system 101. In some embodiments, the inbound monitoring subsystem 116 and the adaptive router subsystem 118 may correspond to a set of servers that other servers interact with through API calls. The inbound monitoring subsystem 116 may be configured to provide a receiving service to receive and process inbound communications from endpoint devices and the intermediary system 114. The adaptive system 101 may process the chat communications 134 received from the endpoint devices. In some embodiments, this may include the adaptive system 101 (e.g., the inbound monitoring subsystem 116) using a handshake protocol with a particular application 107, 109 to authenticate a particular endpoint. The inbound monitoring subsystem 116 may also facilitate listening for data changes in one or more data streams received via the network interface 103A from various system components.

The adaptive system 101 may provide for intelligent chat routing. The adaptive system 101 (e.g., the inbound monitoring subsystem 116) may process a particularized chat communication 134 to determine an explicit or implicit intent of the particularized chat communication 134. In some embodiments, the adaptive router 118 may perform such processing. With the processing, the adaptive system 101 may be configured to identify one or more of a first digital identifier, a second digital identifier, and/or a channel specification. For example, a first digital identifier may correspond to resource identifier of a chat user and may include one or a combination of a user identification (ID), an application identifier, an IP address, a MAC address, another device identifier, a name, a telephone number, an office code, a telephone number extension, a fax number, an email address, a URL, another type of address, and/or the like. A second digital identifier, for example, may correspond to a load identifier of a load and may correspond to any suitable load identifier such as one or a combination of name, Social Security number, address, account identifier, unique load code, and/or the like. A channel specification, for example, may correspond to a particular chat room/channel and may correspond to any suitable include chat room/channel identifier.

Each chat communication 134 may be structured according to a set of one or more protocols. However, not all chat communications 134 may explicitly include each of a first identifier, a second identifier, and a channel specification. By way of example, the adaptive system 101 may be configured to identify a channel specification based at least in part on one or both of a first digital identifier and a second digital identifier, even though a chat communication 134 may not explicitly identify a channel specification. In such instances, the adaptive system 101 may map the first digital identifier and/or the second digital identifier to one or more corresponding channel specifications. As another example, the adaptive system 101 may be configured to identify a first digital identifier based at least in part on mapping one or both of a channel specification and a second digital identifier to the first digital identifier, even though a chat communication 134 may not explicitly identify a first digital identifier. Likewise, the adaptive system 101 may be configured to identify a second digital identifier based at least in part on mapping one or both of a channel specification and a first digital identifier to the second digital identifier, even though a chat communication 134 may not explicitly identify a second digital identifier.

In some instances, the second digital identifier may be the channel specification. In some instances, the second digital identifier may not be the channel specification or may not be a complete or fully correct channel specification. For example, the second digital identifier may include one or a combination of a name of an individual, another identifier of an individual (e.g., Social Security number, address, account identifier, unique load code, room number, bed number, etc.), only a partial channel specification that would require additional input to complete the channel specification before a communication may be transmitted to the chat room/channel corresponding to the channel specification, and/or the like. With such instances, the adaptive system 101 may map the second digital identifier to one or more corresponding channel specifications. Thus, various digital identifiers may be indicative of one or more channel specifications.

The load profile data 101B-1 may include data disclosed herein (e.g., disclosed herein with respect to data store 508) organized, structured, and particularized to loads in order to facilitate the chat features disclosed herein. The load profile data 101B-1 may further include correlated sets of one or more digital identifiers, channel specifications, and/or the like. The conferencing profile data 101B-2 may include particularized profiles for a plurality of entities tracked, aggregated, consolidated, and learned on a per-user basis and mapped to particular entities, which may include various chat users and bot personas. The device profile data 101B-3 may include tracked, aggregated, consolidated, and learned device data to facilitate detection, recognition, differentiation, configuration, and/or capabilities of endpoint devices, which may include user devices 108, applications 109, components 106, and/or applications/interfaces 107. The conferencing profile data 101B-2 and/or the device profile data 101B-3 may include may include correlated data sets of one or a combination of configuration data, description files, API documents, user data, endpoint device types, specifications, digital identifiers, channel specifications, and/or the like.

Figure 17:
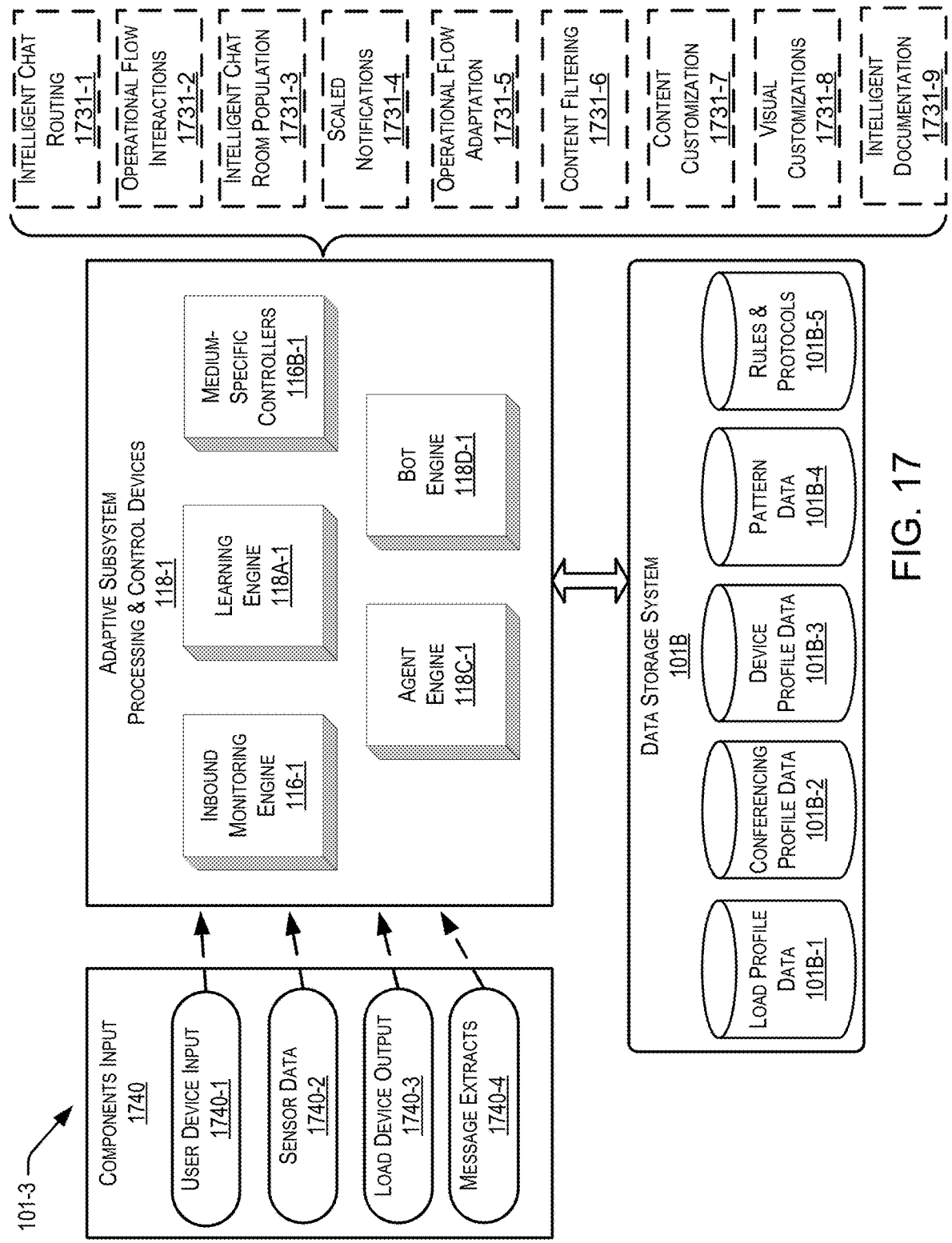
FIG. 17 shows a functional diagram of aspects of the adaptive system, in accordance with embodiments of the present disclosure.

The adaptive system 101 may include a learning engine 118 to track, model, and correlate various types of components input 1740 (indicated in FIG. 17). Data from the components input 1740 may be collected, aggregated, consolidated, transformed, and/or modeled by the learning engine 118 in order to identify meaningful patterns and relationships of load profile data 101B-1, conferencing profile data 101B-2, and device profile data 101B-3 and develop pattern data 101B-4 for continued use by the adaptive system 101. Pattern data 101B-4 may include tracked, aggregated, consolidated, and learned device action data to facilitate detection, recognition, and/or differentiation of communications and sensor data patterns mapped to particular load, chat profile (e.g., resource identifier and associated chat entity information, such as one or a combination of the resource specifications of the resource corresponding to the resource identifier), and endpoint device profile data sets. The such pattern data 101B-4 may include correlated data sets of one or a combination of chat rooms/channels used, media channels used, digital identifiers, channel specifications, types of information requests and messages transmitted (e.g., selected pre-generated information/message templates or custom created information/messages), whether responses are requested of receivers, types of receivers correlated to such communication aspects, endpoint device locations correlated to such actions (e.g., geolocation, access point location, network location, facility location, floor location, room location, etc.), device use correlated to the aforementioned communication aspects, and/or the like. The learning engine 118A may map multiple sets of data corresponding to communication aspects to a single chat entity when the learning engine 118A detects that the single chat entity utilizes the multiple communication aspects.

The pattern data 101B-4 may include temporal profile data, such as tracked, aggregated, consolidated, and learned device temporal data to facilitate detection, recognition, and/or differentiation of temporal aspects of communications mapped to particular chat entities, endpoint device profile data sets, and types of communications to facilitate chronotyping of chat entities. To refine the chronotyping, the temporal profile data may include correlated data sets of one or a combination of allocation information, availability information, date information, time of day information, time of week information, time of year information, time of month information, holiday information, and/or the like correlated to the aforementioned actions and devices. To further refine the chronotyping, such temporal profile data may include one or a combination of the aforementioned aspects mapped to availability information (e.g., the presence attributes disclosed herein), promptness of responsive actions after receiving messages, response rates, and/or the like correlated to the aforementioned device and communication aspects mapped to particular chat entities.

The adaptive system 101 may use the pattern data 101B-4 to infer which chat room is appropriate for which communication without explicit user selection. For example, the adaptive system 101 may route communications to a particular load's chat room based on patterns 101B-4 of load similarity, order pattern similarity, similarity of resources, similar treatment orders, similar medication lists, and/or the like. As an example, the adaptive system 101 may use the pattern data 101B-4 to provision operational action flows and related chat content to particular chat room according to learned patterns 101B-4 of commonalities of load specifications and the operational action flows and related chat content. As another example, the adaptive system 101 may use the pattern data 101B-4 identify and match resource specifications to load specifications (e.g., conditions). Consequently, the adaptive system 101 may identify when a particular load's chat room population is lacking one or more types of resources (e.g., specialty, role, etc.) and may automatically reconfigure conferencing parameters to add resources of the one or more types to the chat room populations.

As yet another example, the adaptive system 101 may use the pattern data 101B-4 to identify and match which types of load-coupled devices 106 match which load specifications. Consequently, the adaptive system 101 may direct alerts to a particular chat room when one or more matching types of load-coupled devices 106 are note already allocated to the particular load. Additionally or alternatively, the adaptive system 101 may use the pattern data 101B-4 to differentiate which data sets belong to which load (e.g., the data set does not explicitly identify the load, but the pattern data 101B-4 indicates that the data set belongs to the load based at least in part on previous data from various types of components input 1740).

As still another example, the adaptive system 101 may use the pattern data 101B-4 to identify and/or establish one or more trigger events disclosed herein for actions automatically taken by the adaptive system 101 with respect to one or more chat rooms. In some cases, the adaptive system 101 may use the pattern data 101B-4 to which load metric values and combinations of load metrics indicate particular load condition and may establish combinations and thresholds for the load metric values that may be used as the trigger events. As an additional example, the adaptive system 101 may use the pattern data 101B-4 to identify when one or more resources are transitioning to on-shift, off-shift, on-call, etc. and may consequently reconfigure conferencing parts to adjust the chat room populations chat rooms dedicated to loads corresponding to the one or more resources.

Tagging schema may be employed to facilitate the learning and modeling. The learning engine 118 may recognize identifiers of the above aspects from various types of components input 1740 by code mapping, keyword recognition, and/or another suitable method of recognition. For example, the learning engine 118 may identify keywords and/or codes as distinctive markings, compile them, and correlate them with recognition criteria (e.g., keyword criteria and/or code system) for the purposes of characterizing each set of data and generating correlation results. The learning engine 118 may include a reasoning module to make logical inferences from a set of the detected and differentiated data to infer one or more patterns corresponding to the load profile data 101B-1, conferencing profile data 101B-2, and device profile data 101B-3 and develop pattern data 101B-4. A pattern-based reasoner may be employed to use various statistical techniques in analyzing the data, both current and historical, in order to infer particularized pattern data from the components input 1740. In various embodiments, the system automatically establishes and develops the particularized pattern data. In some embodiments, the learning engine 118 may be configured to employ machine learning or, more specifically, deep learning, to process the data and derive the particularized pattern data 101B-4.

In some embodiments, the various types of profile data may be integrated rather than separated as illustrated. Each particularized profile may correspond to a tracked, aggregated, and consolidated set of data sets for a particular chat entity that has utilized the adaptive system 101 and/or a particular load. With respect to a particular chat entity, a particularize profile may include one or a combination of load profile data, endpoint device profile data, pattern data, and/or the like.

The data storage system 101B may also include rules and protocols 101B-5 to govern and/or otherwise facilitate one or a combination of the features provided by the adaptive system 101 disclosed herein. In various embodiments, the rules and protocols 101B-5 may include the rules governing the aggregation layer 302, the rules created and managed by the rules engine 514, the rules applied by the data store integrity engine 506, the rules evaluated and enforced by the authentication access engine 604, the user preference engine 608, the update engine 616, the streaming data engine 618, and/or the like disclosed herein. The rules and protocols 101B-5 may correspond to a rules database in some embodiments. Further, the learning engine 118A and/or the bot engine 118D may be configured to route chat communications using a plurality of routing rules and generate and present workflows using a plurality of workflow rules, which rules may include a collection of logic, one or more preconditions, one or more assumptions, and/or one or more post-conditions relating to a type of chat communication, sensor data detected, message extract, user input, and/or use case to determine routing, workflows, and bot generation of chat communications. The rules and protocols 101B-5 may specify trigger conditions and thresholds for trigger events based on the various components inputs 1740 in accordance with the various embodiments disclosed herein.

Disclosed embodiments of the adaptive system 101 may be architected to support bots. The adaptive router subsystem 118 may include a bot engine 118D that may be configured to one or a combination of build, configure, customize, deploy, interface with, communicate with, and/or otherwise manage bots in accordance with the features disclosed herein. A bot may include a program and/or artificial intelligence corresponding to one or a combination of a chatbot, a chatterbot, a talkbot, an interactive agent, artificial conversational entity, and/or the like.

In various embodiments, the bot engine 118D may be a part of, integrated with, or otherwise correspond to the learning engine 118A and/or the agent engine 118C, or may be separate from the agent engine 118C. The bot engine 118D may define a bot persona for a bot and may specify responsibilities and roles for the bot, which may include specifying one or more applications communicatively coupled to the bot, one or more chat rooms/channels as assigned to the bot, one or more locations (e.g., one or more facilities, floors, sections, wings, rooms, etc.) as assigned to the bot, and/or the like.

Figure 13:
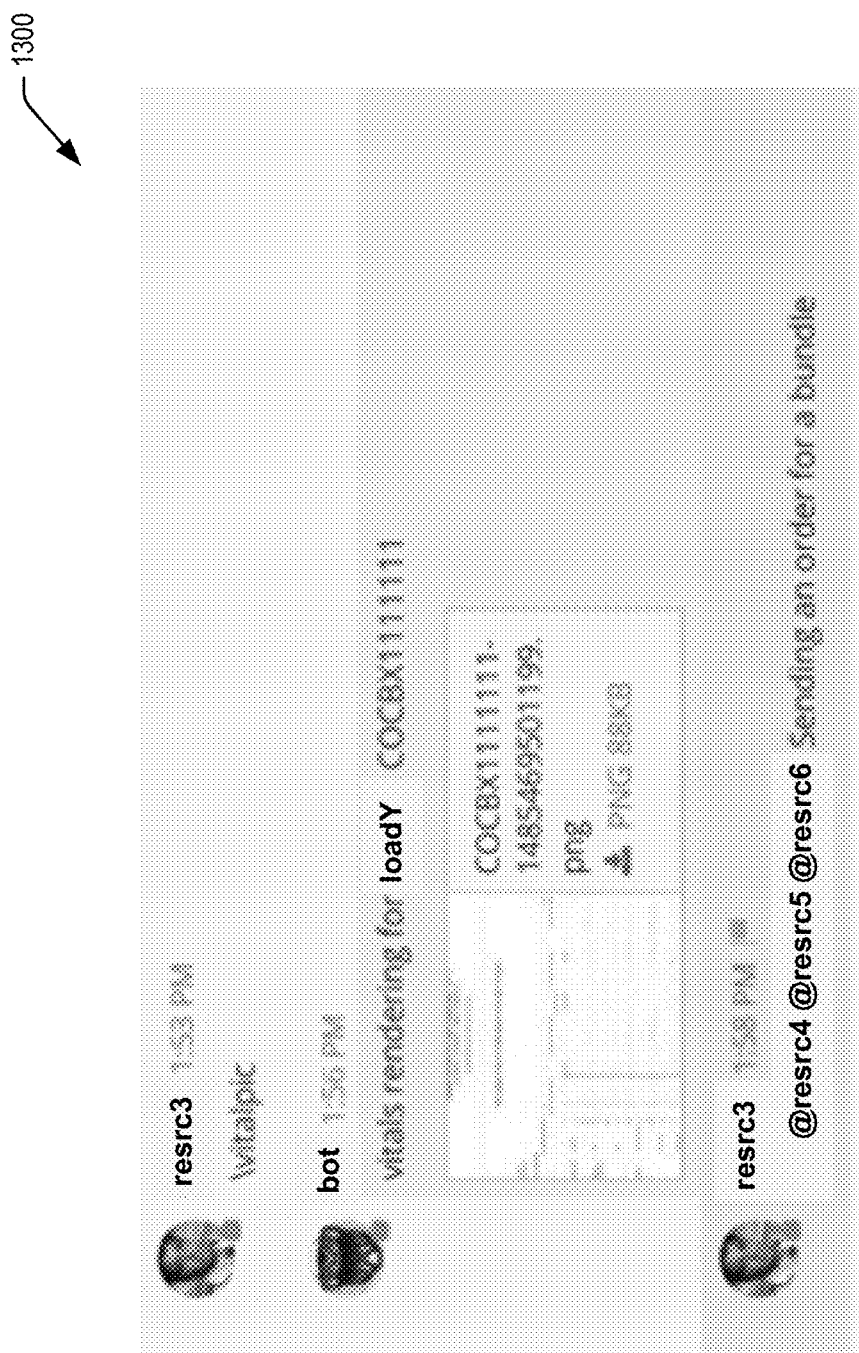
FIG. 13 illustrates a portion of an exemplary chat interface, in accordance with embodiments of the present disclosure.

Each bot may be configured to monitor chat rooms to detect commands directed to the bot and may make automatic detections based on rule sets. To illustrate, FIG. 13 depicts a portion of an exemplary chat interface 1300 where a user as directed a command to the bot, which the bot has detected, in accordance with embodiments of the present disclosure. In the example, a resource requested information on the vitals of the particular load and corresponding to the chat room with an exemplary command, \vitalpic. In response, the bot has provided information regarding the vitals for the load with a user-selectable option to access corresponding details in the form of a graphical representation. This is just one possible example.

FIG. 14 depicts another example of a portion of an exemplary chat interface 1400 where a user as directed a command to the bot, which the bot has detected, in accordance with embodiments of the present disclosure. In the example, a resource requested summary information regarding the particular load corresponding to the chat room with an exemplary command, \encounter. In response, the bot has provided summary information from the load specifications identifying the load. Other embodiments are possible. For example, the bot may detect other input, such as "@resource2 what is the status?" and then detect and provide a detected status of the load. Other features will be apparent in conjunction with the further description herein.

Referring again to FIG. 12, the agent engine 118C may be configured to initiate agents configured to detect messages that may be transferred between elements of the network 100 (e.g., via network 120, 236, 810, 820, via messaging bus 430, and/or the like) to detect one or more data changes that may be mapped to one or more particular load identifiers of one or more loads. The agents may be specific to message type, destination entity, and/or any other suitable characteristic. The agent may, in various embodiments, correspond to a bot, a listener, and/or the like, and may conform ITI-41, HL7 v.2, HL7 v.3, C-CDA, NEMSIS, FHIR, XDs.b, XDR, or other suitable protocols. The agent engine 118C may, in some embodiments, correspond to the bot engine 118E and may be included therein. The agents can be used to detect and evaluate messages based on data included with the messages or otherwise related to the messages. The messages may include any suitable transfer of data corresponding to the network 100, including messages transmitting data, document transactions (e.g., saving, modifying, creating, sending, sharing, versioning, etc.), and the like which may be monitored for specifications and changes in types of data such as, for example, names of resources, assigned resources, assigned rooms, services ordered, when tests are received, commencement of procedures, conclusion of procedures, orders for tests, and/or the like. In various embodiments, the messages may include sensor data from the sensors 130 and/or load-coupled device output from load-coupled devices 106. Accordingly, the listeners may be employed to detect trigger events corresponding to the sensors 130 detecting phenomena, the load-coupled devices 106 outputting load-specific data, and/or the transfer of sensor data and load-coupled device output data directly to the adaptive system 101 and/or indirectly to the adaptive system 101 (e.g., via a chat intelligence device or another monitoring device).

The agent engine 118C may be configured to use the agents to detect messages indicating occurrence of trigger events. The trigger events can be any suitable event that relates to a load and/or a resource subsystem member. For example, the trigger events may relate to a change in responsibility for the load, and the messages are generated when the trigger events occur. For example, a trigger event can be a discharge event, transfer of resource allocation event, an order event, a user data set adjustment event, a check-in event, and any other suitable event. In some examples, the trigger events may be defined by conferencing protocols 101B-5 that specify criteria for when one or more detected data changes constitute one or more state changes that correspond to one or more trigger events. One or more of the conferencing protocols 101B-5 may be mapped to particular conferencing environments. In some embodiments, detecting a trigger event may trigger initiating one or more listeners to detect messages based on a set of message criteria. The message criteria may indicate the message as a type of message to be intercepted. In some examples, the agent, agent engine 118C, and/or the learning engine 118A may parse the message to determine details about the message that fulfill the message criteria.

The bot engine 118D may further define interaction workflows for the bot using the conferencing protocols 101B-5. The interaction workflows (which may be specified by the conferencing protocols 101B-5 in some embodiments) may include chat messages, including questions and declarative statements, to receive and process; content composites such as chat messages, including questions and declarative statements, to send; causal triggers for chat messages received and content composites such as responses to provide, including responsive messages to send to chat rooms, triggered/responsive messages to send to endpoint devices (including endpoint devices originating service requests and endpoint devices to alert with critical information upon system recognition of trigger events); interaction decision trees governing the aforementioned types of messages and responses; and the like.

As an example case, when the adaptive system 101 detects one or more data changes (e.g., by way of the agent engine 118C) that are generated based on one or more events, the adaptive system 101 may map the one or more data changes to a particular load identifier and a particular conferencing environment corresponding to the particular load identifier. The adaptive system 101 may identify a conferencing protocol 101B-5 that applies to the one or more data changes, the conferencing protocol mapped to the particular conferencing environment. The adaptive system 101 may determine whether the one or more data changes correspond to one or more state changes specified in the conferencing protocol 101B-5. Consequent to determining that the one or more data changes correspond to the one or more state changes, adaptive system 101 may update the particular conferencing environment (e.g., by way of the bot engine 118D). The updating may include creating a content composite based at least in part on the one or more data changes and transmitting the content composite to a plurality of endpoint devices 108 mapped to a particular population of resource identifiers corresponding to the particular conferencing environment.

Figure 15:
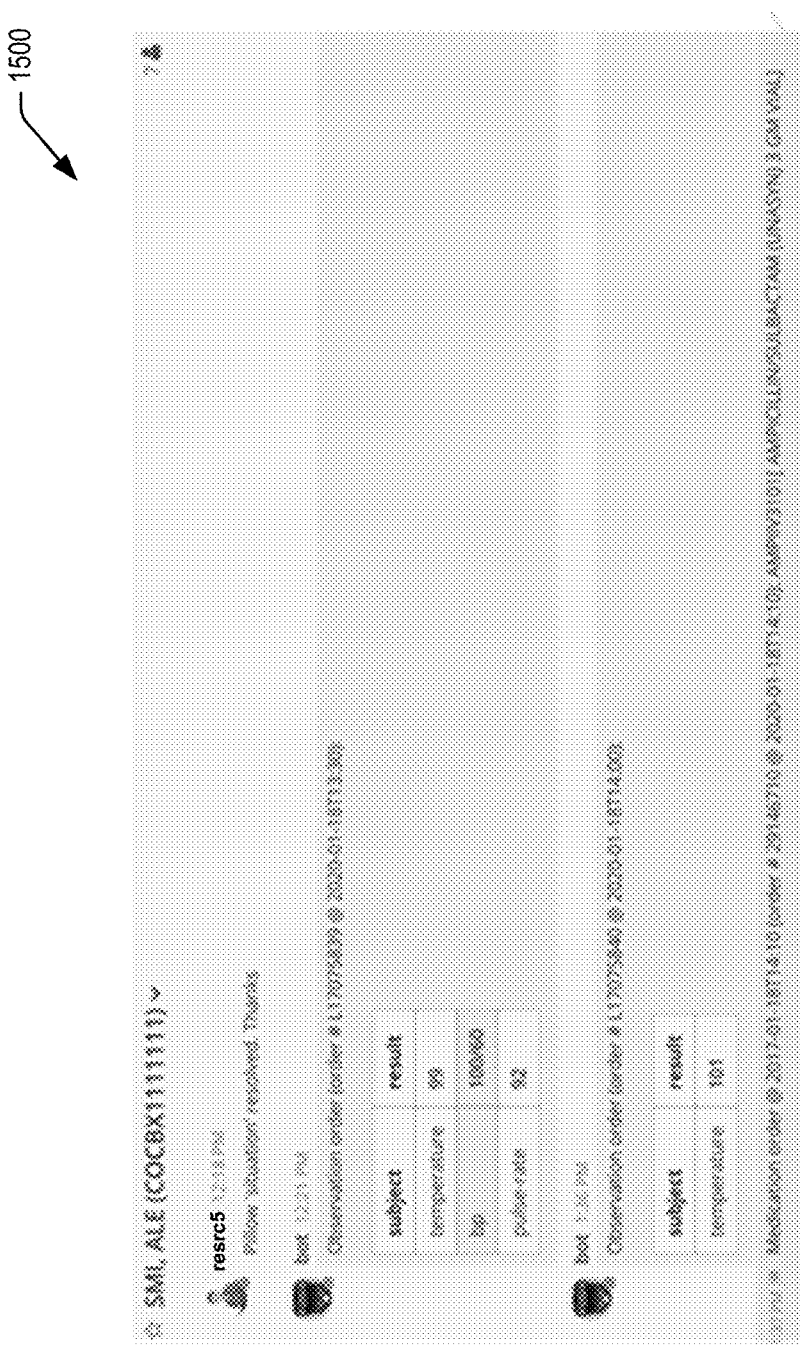
FIG. 15 illustrates a portion of an exemplary chat interface, in accordance with embodiments of the present disclosure.
Figure 16:
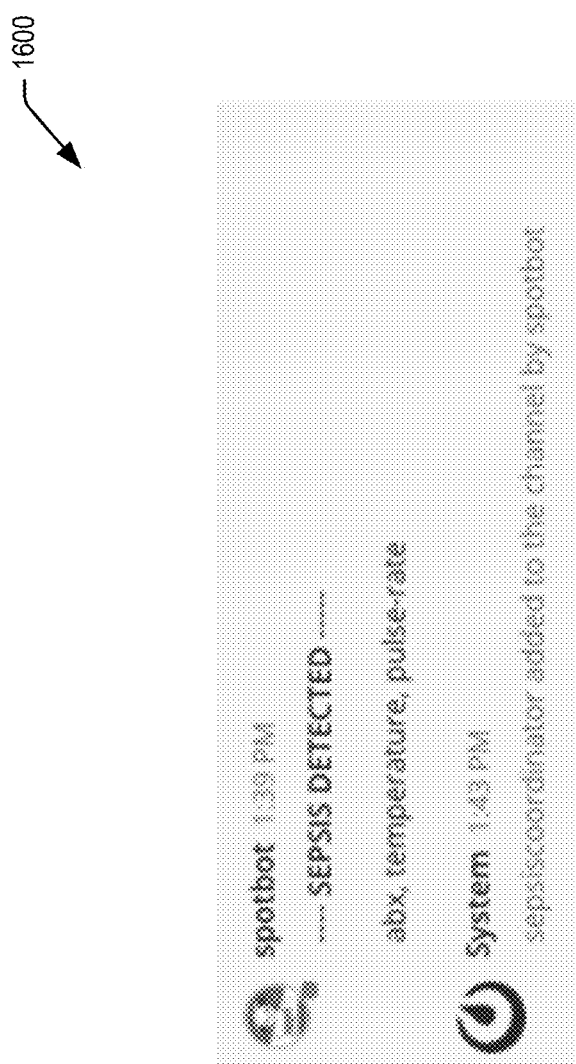
FIG. 16 illustrates a portion of an exemplary chat interface, in accordance with embodiments of the present disclosure.

By way of example, FIG. 15 depicts a portion of an exemplary chat interface 1500 where the adaptive system 101 has detected certain load metrics satisfying one or more thresholds and has reacted with an alert regarding the load metrics. The content composite may include an alert message in conjunction with indicia of the detect metric values, which may be represented in any suitable graphical form. As another example, FIG. 16 depicts a portion of an exemplary chat interface 1600 where the adaptive system 101 has detected data changes corresponding to certain load metrics. The adaptive system 101 has determined that the load metrics correspond to one or more state changes specified in the corresponding conferencing protocol 101B-5, where the load metrics are determined to satisfy one or more thresholds and the adaptive system 101 has recognized a load condition based at least in part on the load metrics. The adaptive system 101 has reacted by updating the particular conferencing environment with a content composite. In the example, the adaptive system 101 has detected a sepsis condition and has created and provided a content composite comprising an alert regarding the condition and pertinent load metrics. With some embodiments, this may result from monitoring for HL7 data pertinent to the load. Additionally, the adaptive system 101 has updated the particular conferencing environment by reconfiguring conferencing parameters of the particular conferencing environment to selectively grant authenticated access to at least one resource identifier such that the at least one resource identifier is added to the particular population of resource identifiers corresponding to the particular conferencing environment. The adaptive system 101 has automatically added a sepsis coordinator to the chat room, provided indicia of the addition, and, consequently, transmits chat room content, including the content composite, to an endpoint device 108 corresponding to the coordinator.

Referring again to FIG. 12, the bots disclosed herein may facilitate the intelligent chat communication routing and notification features of the adaptive system 101. The bots and personas may detect when various entities are logged in to certain chat sessions, for example. Indications of the logged in statuses may be passed to the learning engine 118A. The learning engine 118A may utilize such status information in determining where a person is logged in at various times, in order to facilitate the presence intelligent features disclosed herein. As part of the scaled notification features disclosed further herein, the adaptive system 101 may timely reroute notifications to chat entities via chat sessions in response to requests when the chat entities are detected as logged in to particular chat rooms and, when further escalation is needed (due to lack of response and/or no other detected log-ins), rerouting the notifications via one or more other communication channels external to the conferencing environment.

The bots may be configured to perform keyword processing to understand input/responses of a chat conversation. In various embodiments, this may be performed in conjunction with the bot engine 118D and/or the learning engine 118A, and may be performed using a natural language processing engine included therein, with the bot providing the chat conversation for further processing for keyword identification to recognize particular communication content as triggers. The language processing of chat conversations may identify keywords as distinctive markings and may compile the keywords and correlate the keywords with keyword criteria for the purposes of characterizing each set of one or more responses and generating correlation results. Such keyword processing may be performed in real time. The keyword criteria may include keywords identified by any one or combination of words, word stems, phrase, word groupings, and/or like keyword information. The keyword criteria may include weighting assigned to words, word stems, phrase, word groupings, and/or the like. For example, a keyword may be assigned a weight according to its significance. Increased word weights may be tied to increasing probability of the intended meaning of chat in the chat conversation. The keyword criteria may correspond to one or more keyword schemas that are correlated to various chat scenarios. Thus, in some embodiments, keywords of chat instances may be matched with one or more keyword schemas, which may be correlated to various triggers for responses by the bots. Different keyword schemas may be tailored to different contexts and may be categorized by field-specific category into category-specific keyword lexicons. Category-specific tags or any other suitable means of linking, for example, via a code system, may be used to associate category-specific keyword schemas to specific categories.

In some embodiments, a keyword schema may include word buckets/sets of high-correlation words, low-correlation words, and/or neutral words, that is, keyword information indicative, to varying extents of correlation, of a particular trigger, keywords indicative of triggering chat, and/or keywords that are not useful as indicia. The word buckets may be tailored to each category. Within each word bucket, various words may be assigned various weights according to their significance. Such word buckets may be implemented in any suitable manner, including word lists, word tables, matrices, and/or the like. And within a bucket, keywords may be organized in a rank order and/or any editable hierarchical structure according to weight. Some embodiments may have keywords organized according to decision tree, with contingencies so that only certain combinations of keywords may be considered. For example, certain keywords may only have significance if used in conjunction with other keywords, and/or not in conjunction with others. Some contingencies may be implemented so that only a threshold cumulative weight and/or keywords need be identified to recognize trigger chat instances.

The bot engine 118D and/or the learning engine 118A may adapt over time to modify inclusions in word buckets. Certain embodiments may apply a heuristic approach to adaptation. Adaptation may be based on which words are more frequently used words in certain chat rooms. Similar chat conversations may be analyzed together to find statistical characteristics of keywords used. The keywords may be ranked to assign greater weight to the more frequently used words.

Additionally, certain embodiments may provide feedback options for chat participants and/or endpoint devices regarding responses provided by the adaptive system 101. Questions and/or user-selectable options may be provided to allow chat participants and/or endpoint devices to provide feedback information about responses provided by the adaptive system 101. The feedback may be used for training the adaptive system 101 to heuristically adapt responses, chat recognition, and/or communication profiles, and, over time, accumulate, identify, and used the feedback to process bot-gathered communications more effectively.

In some embodiments, the adaptive system 101 may perform audio analysis of audio data captured with the audio sensors/microphones 130 to facilitate chat room communications via audio input. The learning engine 118A and/or bot engine 118D may include an audio analyzer and handling module to facilitate that detection, which may apply voice recognition to allow resource subsystem members to provide chat communications audially. By way of analyzing audio, acoustic spectrum analysis, and/or the like, the learning engine 118A may learn patterns of sensor-based data metrics corresponding to audio characteristics, such as tonal, pitch, and volume characteristics; keywords and corresponding language used; cadence, pauses, and accents; ambient noise; and/or the like as distinctive markings of particular resource subsystem members. For example, an acoustic analysis may include analyzing and identifying the sample for acoustic characteristics such as frequencies, intensities, tones, pitches, and/or the like audio metrics over time and mapping distinctive characteristics to particular individuals. Such mapping may further analyze locations of the individuals with respect to particular loads to facilitate mapping of audio chat communications to particular load chat rooms. For example, when chat communications input is received via one or more sensors 130, the adaptive system 101 may map the input to a location (e.g., a load's room or section) and particular load chat room based at least in part on location assignment information for the one or more sensors 130 and/or location detection and load room/section assignment information from the load profile data for a particular load. The location detection may be based at least in part on one or a combination of GPS, Wi-Fi access points, cellular, triangulation, equipment sensor(s), RFID device signals, and/or other techniques for determining a current location of a resource. The chat communications input may be recognized via voice recognition and may be mapped to a particular resource subsystem via acoustic metrics selected as distinctive markings for the individual and stored in the conferencing profile data.

The different audio metric types may be bases for various audio metric categories. Ranges of audio metric values for the different audio metric types may be mapped to audio metric categories. The learning engine 118A may select values of one or a combination of the acoustic metrics as distinctive markings and may compile the values as an acoustic impression for the purposes of characterizing an individual. In various embodiments, the correlation may be based at least in part on matching selected values of the acoustic metrics (e.g., distinctive values such as peaks, baselines, averages, etc.) to acoustic metric ranges of values specified for certain audio metric categories. In some embodiments, when a potential resource subsystem member is recognized via voice recognition but not assigned to the load chat room corresponding to the location, the adaptive system 101 may suggest adding or automatically add the potential resource subsystem member to the chat room in accordance with the intelligent chat room population features disclosed herein. Thus, the audio impressions may be used by the adaptive system to identify inconsistencies/nonconformities of real-time audio detection with respect to particularized patterns.

In a similar manner, with some embodiments, the adaptive system 101 may perform image analysis of image data captured with cameras to determine one or more image baselines for individuals and particular locations. Captured facial image data may be correlated to reference images using any suitable facial trait qualifications for correlation. The learning engine 118A may link particular image data to resource subsystem member specifications with image data associated with resource subsystem members, to identify a known resource subsystem member or a new resource subsystem member. The reference image data may be refined over time as an image baseline(s) for a particular resource subsystem member is developed with additional data captures. Such reference images may be used by the adaptive system to identify inconsistencies/nonconformities with respect to particularized patterns. When a potential resource subsystem member is recognized via image recognition but not assigned to the load chat room corresponding to the location, the adaptive system 101 may suggest adding or automatically add the potential resource subsystem member to the chat room in accordance with the intelligent chat room population features disclosed herein.

FIG. 17 shows a functional diagram of aspects of the adaptive system 101, in accordance with embodiments of the present disclosure. The diagram may correspond to various portions of the architecture stack 300. While engines, repositories, and other components are described separately in this disclosure, it should be appreciated that the components may be combined and/or implemented differently in any combination to provide certain features in various embodiments with hardware, software and/or firmware. In various embodiments, different processes running on one or more shared resources may implement some of the components.

As disclosed herein, the adaptive system 101 may be configured to provide a number of adaptive controls 1731 in conjunction with one or a combination of the user devices, components, applications, interfaces, and/or the like disclosed herein. The one or more adaptive processing and control devices 118-1 may be communicatively coupled with interface components and communication channels (which may take various forms in various embodiments as disclosed herein) configured to receive components input 1740. The monitoring engine 116 may be configured to listen for data changes in one or more data streams corresponding to the components input 1740 and monitor the components input 1740 for any suitable aspects to facilitate improvements with individualized adaptation features disclosed herein. The components input 1740 may include input from a plurality of different data sources. In various embodiments, the components input 1740 may include one or a combination of user device input 1740-1, such as chat communications 134, sensor data 1740-2 detected by one or more of the sensors 130, load-coupled device output 1740-3 from one or more of the components 106, and/or message extracts 1740-4 extracted by the adaptive system 101 from one or more of the chat communications 134 and/or other messages as disclosed herein.

With respect to the chat communications 134, the inbound monitoring engine 116 may process a particularized chat communication 134. In so doing, the inbound monitoring engine 116 may identify one or more of a first digital identifier, a second digital identifier, and/or a channel specification specified by the chat communication 134. Based at least in part on the identified first digital identifier, second digital identifier, and/or channel specification, the learning engine 118A may determine an explicit or implicit intent of the particularized chat communication 134, as disclosed herein, in order to effect intelligent chat routing 1731-1 of the chat communication 134 as disclosed herein.

With respect to the sensor data 1740-2 and the load-coupled device output data 1740-3, the adaptive system 101 may pull or otherwise receive the data directly from the sensors 130 and/or load-coupled devices 106 and/or indirectly from the sensors 130 and/or load-coupled devices 106 in response to the sensors 130 detecting phenomena, the load-coupled devices 106 outputting load-specific data, and/or the transfer of sensor data and/or load-coupled device output (e.g., via a chat intelligence device or another monitoring device). In some embodiments, the sensor detection and/or the load-coupled device output may trigger the data transfer. In some embodiments, the data transfer may be effected on a real-time, periodic, or occasional basis. As disclosed herein, the data may be extracted and collected by way of agents of the agent engine 118C in some embodiments. Likewise, the message extracts may be collected by way of the agent engine 118C employing agents to detect and evaluate messages that may be transferred between elements of the network 100, with the agent, agent engine 118C, and/or the learning engine 118A parsing the messages to determine details about the message that fulfill the message criteria and create the message extracts.

The learning engine 118A, agent engine 118C, and/or the bot engine 118D may include logic (which may correspond to rules and protocols 101B-5) to implement and/or otherwise facilitate any taxonomy, classification, categorization, correlation, mapping, qualification, scoring, organization, and/or the like features disclosed herein. For example, in various embodiments, the learning engine 118A may be configured to analyze, classify, categorize, characterize, tag, and/or annotate load profile data, conferencing profile data, device profile data, and/or the like. Further, the learning engine 118A may employ one or more artificial intelligence (machine learning or, more specifically, deep learning) algorithms to perform pattern matching to detect patterns of communications metrics of the chat entities.

The learning engine 118A, agent engine 118C, and/or the bot engine 118D may utilize the logic to detect trigger events based at least in part on the component input 1740. The user device input 1740-1, the sensor data 1740-2, the load-coupled device output data 1740-3, and the message extracts 1740-2 can be evaluated to detect the trigger events. The trigger events may include, for example, any suitable event that relates to a load and/or a resource subsystem member, such as a change in responsibility for the load, a discharge event, a transfer of load event, an order event, a user data set adjustment event, a check-in event, changes in assigned resources, assigned resources, assigned rooms, services ordered, when tests are received, scheduling of procedures, commencement of procedures, conclusion of procedures, orders for tests, and/or the like. The trigger events may include system recognition of load metrics of a load condition.

The learning engine 118A, agent engine 118C, and/or the bot engine 118D may include the logic to implement and/or otherwise facilitate any qualification features disclosed herein. By way of example without limitation, one or more of the engines may be configured to one or more of qualify load metrics according to a gradated scale, categorize load metrics according to a category scheme, qualify load metrics according to a load metrics scoring scheme, and/or the like. Some embodiments may qualify load metrics with a numerical expression, for example, an indicia score. An indicia score may be an assessment of how strongly a particular item of a load's metrics information, or a plurality of items, indicates a potential condition.

Accordingly, indicia scoring may provide a quantitative estimate of the probability that a potential condition applies to a given load based on the load's consolidated load metrics information. By way of example, an indicia scale could include a range of indicia scores from 0 to 10, 100, or 1,000, with the high end of the scale indicating greater probability. Various embodiments may determine an indicia score based on any one or more suitable quantifiers. Assessments may be consolidated and processed to yield a total indicia score.

Flags, notifications, and the like corresponding one or more of the adaptive controls 1731 may be based on the indicia score and could be generated contingent on one or more thresholds. For example, a minimum threshold could be employed, where a score not meeting the minimum threshold could result in no flag or other notification regarding a potential condition. Further, the specific rules may take specific time-based conditions into account. And the one or more engines may identify a time-based condition based on the specific rules, may identify a time corresponding to the condition and/or associated load metrics, may determine whether a corresponding time threshold has been met based at least in part on the time, and may generate flag/notifications and the like corresponding one or more of the adaptive controls 1731 based at least in part on the determination. Accordingly, a score above the minimum threshold may result in execution of one or more adaptive controls 1731, which could be based on one or more score bands, for example, one or more bands above the minimum threshold.

By way of example, a band above a minimum threshold could trigger execution of one or more particular adaptive controls 1731, while a band above one or more higher threshold could trigger one or more different adaptive controls 1731. Thus, various types of adaptive controls 1731 may each be associated with different bands. For instance, various types of workflows may be mapped to various bands. A lower band may be mapped to a workflow 1731-2 that prompts further testing and confirmation of the detected potential condition. A higher band may be mapped to a workflow 1731-2 that prompts resource input in the form of resource confirmation of the detected metrics, additional resource-gathered metrics, and/or resource input in the form of resource input where the workflow actions 1731-2 are contingent upon further information, metrics, and resource input to be gathered from a particular resource assigned to a given role with respect to the particular load. A higher band may be mapped to intelligent chat room populations controls 1731-3 that provides for the addition of personnel to chat room based at least in part on the detected potential condition. Further, another higher band may be mapped to scaled notifications controls 1731-4 that cause notification through other media channels to prompt one or more users to link to the chat room for expedited attention to the potential condition detected.

Such notifications 1731-4 to a resource subsystem member may be transmitted according to the notification profiles. When one of the engines (e.g., the bot engine 118D) detects that a chat communication requires one or more responses from one or more chat entities, the engine may spin up an agent to monitor or otherwise monitor for the one or more responses from the one or more chat entities. The agent may be configured to wait for a certain time having a time limit to detect and receive the requested and/or anticipated response(s) based on information included with the response communication(s) that may correspond to one or more user selectable option selections, content keywords, a chat message parameter, a digital identifier(s) of the one or more chat entities, a digital identifier of a chat originator of the chat communication requiring response, and/or an indication of the destination specification recognized by the engine upon evaluation of the response communication(s). When the expected one or more responses is not detected as received from the one or more chat entities within the time limit, the subsystem 118 may cause one or more additional notifications through other media channels (e.g., other proprietary communication applications such as iMobile, SMS, MMS, email, fax, phone, and/or the like) via other medium-specific controllers 118B to prompt one or more users to link to the chat room for expedited attention to the potential condition detected. In some embodiments, such notification escalation 1731-4 may be performed serially with similar application of time limits to detect requested responses before escalating to another notification method for the particular resource subsystem member. With sufficiently high scores of significance regarding the trigger event and the detected condition that satisfy one or more thresholds, multiple notification messages may be utilized simultaneously and/or different resource subsystem members may be notified with escalated notifications when the requested response from the particular resource subsystem member is not received within the time limit. Thus, the subsystem 118 (e.g., a bot) may determine when requested should be escalated based at least in part on monitoring.

The learning engine 118A may map multiple endpoint devices, along with the pertinent sets of endpoint user device profile data, to a single resource identifier when the learning engine 118A detects that the single endpoint entity utilizes the multiple endpoint devices. The conferencing profile data 101B-2 may likewise include one or a combination of the aforementioned aspects mapped to particular chat entities. Thus, for example, the learning engine 118A may map various data sets of the load profile data 101B-1, the conferencing profile data 101B-2, the device profile data 101B-3, and/or particularized pattern data 101B-4 to the single endpoint entity utilizes the multiple endpoint devices. Having generated, developed, and/or otherwise used the load profile data 101B-1, the conferencing profile data 101B-2, the device profile data 101B-3 to develop the particularized pattern data 101B-4, the learning engine 118A may use the particularized pattern data 101B-3 to identify and automatically employ the best routing 1731-1 of chat communications to appropriate chat channels for particular chat users and the best chat room populations controls 1731-3 for particular chat channels.

Accordingly, disclosed embodiments of the adaptive system 101 may perform intelligent chat room populations controls 1731-3 that may include ongoing mapping of appropriate resource subsystem members to particular chat channels, adding chat entities corresponding to the appropriate resource subsystem members to the appropriate chat channels, and removing chat entities from such chat channels when association of corresponding resource subsystems members with the chat channel is determined by the adaptive system 101 to be no longer appropriate. For example, the adaptive system 101 may update a particular chat channel by reconfiguring conferencing parameters of the particular chat channel to selectively grant authenticated access to at least one resource identifier such that the at least one resource identifier is added to the particular population of resource identifiers corresponding to the particular chat channel. Conversely, the adaptive system 101 may update a particular chat channel by reconfiguring conferencing parameters of the particular chat channel to selectively prohibit authenticated access to at least one resource identifier such that the at least one resource identifier is removed from the particular population of resource identifiers corresponding to the particular chat channel.

According to an initial screening protocol, the learning engine 118A may perform an initial screening of service requests (e.g., an electronic data set creation corresponding to an admission of a new load, a consequent automatic initialization of a load-specific chat room corresponding to the newly admitted load, and/or the like) to match the service requests to known profiles (e.g., conferencing profiles corresponding to a resource subsystem developed for the load). When a service request is processed and a digital identifier is identified from the service request, the adaptive system 101 may determine whether the service request corresponds to a first impression for the corresponding entity/device. For example, the adaptive system 101 may determine that the service request corresponds to a new load, in which case, the adaptive system 101 may create a load-specific chat room and may be begin adding chat entities to the chat room for the load. As another example, the adaptive system 101 may determine that the endpoint device transmitting the service request does not correspond to a known device profile, in which case, the adaptive system 101 may create a new device profile for the corresponding entity and begin developing device profile data 101B-3 for the entity.

With the intelligent chat room populations controls 1731-3, adding chat entities to a chat room by the adaptive system 101 may include selecting chat entities from the conferencing profile data 101B-2 based at least in part on pattern data 11B-4. The conferencing profile data 101B-2 may include a list of digital identifiers (e.g., names, user name, addresses, and/or the like contact options) for resources associated with the adaptive system 101. Chat entity selection for a given load may be a function of location and time. The location of the load may be matched with a set of subsystem resources, and corresponding chat entities, mapped to the location. Additionally, temporal factors may include which resource subsystem members are currently on-shift and/or on-call. Furthermore, chat entity selection for a given load may be a function of identifiers of one or more conditions of the load and/or one or more identifiers of services requested for the load. For example, the adaptive system may map an identifier for a condition and/or requested service to one or more specialists and corresponding chat entities. Still further, chat entity selection for a given load may be a function of system-analysis of one or more electronic data sets that the adaptive system may identify, pull, and analyze for a given load. Having a digital identifier corresponding to the load, the adaptive system may identify a set of one or more data sets for the load that the adaptive system may analyze to identify one more conditions of the load, one or more existing load relationships to resources, and/or the like. Accordingly, the adaptive system may take into account the multiplicity of factors in order to identify and add appropriate chat identifiers to a given chat channel for a given load.

Chat entity addition and subtraction (i.e., removing a chat entity from membership of a given chat room) may be an ongoing process performed by the adaptive system continually, periodically, and/or intermittently, according to a schedule and/or responsive to system detection of various events. For example, the adaptive system 101 may perform chat entity addition/subtraction according to changes indicated by temporal profile data that may include one or a combination of allocation information, availability information, date information, time of day information, time of week information, time of year information, time of month information, holiday information, and/or the like. When a resource subsystem member transitions from being unavailable to available (e.g., transitions from being off-shift or off-call to on-shift or on-call), the adaptive system may add the member's corresponding chat entity to one or more chat channels with which the chat entity when the resource subsystem member is mapped to particular load chat room. Likewise, in some embodiments, when a resource subsystem member transitions from being available to unavailable (e.g., transitions from being on-shift or on-call to off-shift or off-call), the adaptive system may remove the member's corresponding chat entity from one or more chat channels with which the chat entity was previously associated. However, in other embodiments, the adaptive system may not completely remove the corresponding chat entity with such transitions, but may instead change a status indicator of the corresponding chat entity to indicate the transition (e.g., change the status to indicate being off-line, unavailable, off-shift, off-call, and/or the like). Similarly, the adaptive system may change a status indicator of the corresponding chat entity to indicate a transition in the reverse (e.g., change the status to indicate being on-line, available, on-shift, on-call, and/or the like).

As another example of chat entity addition/subtraction, the adaptive system 101 may perform chat entity addition/subtraction according to changes indicated by user input 1740-1 regarding changes in resource subsystem members assigned to a load. Such user input 1740-1 may be entered via one or more the interface is disclosed herein in any suitable manner. In some cases, such user input 1740-1 may include explicit addition and/or subtraction of resource subsystem members via a chat interface and one or more user-selectable options. In other cases, such user input 1740-1 may include the adaptive system 101 analyzing one or more updates to one or more electronic data sets that the adaptive system 101 may identify as relating to a given load based at least in part on matching a digital identifier for the given load to the one or more data sets. With such analysis, the adaptive system 101 may identify changes in resource subsystem member assignments to a given load and may propagate such changes to the chat entities assigned to the load chat room.

As yet another example of chat entity addition/subtraction, the one or more bots may also monitor messages (e.g., HL7 messages in message streams on a messaging bus that are different and distinct from the chat room messages) relating to the load in order to add or remove users from the chat room. One or more bots/agents may be configured to detect messages indicating occurrence of trigger events that trigger addition and/or subtraction of chat entities in accordance with the rules and protocols 118B-5. As disclosed herein, trigger events may relate to a change in responsibility of a resource for the load, a change in condition of the load, and/or the like which could trigger chat entity addition/subtraction. For example, if vital signs indicate sepsis according to the rules and protocols 118B-5, a sepsis coordinator may be automatically added based at least in part on the profile data (as illustrated by FIG. 16).

Further, in response to detecting a trigger event, disclosed embodiments of the adaptive system 101 may perform workflow interaction controls 1731-3. The workflow interaction controls 1731-3 may present workflow suggestions, workflow selectable options, workflow-pertinent data, and other interactions via a chat interface responsive to any of the various types of trigger events disclosed herein (e.g., recognition of load specifications of a load condition, a change in responsibility for the load, a discharge event, a transfer of resource assignment event, an order event, a user data set adjustment event, a check-in event, changes in assigned resources, assigned resources, assigned rooms, services ordered, when tests are received, scheduling of procedures or treatments, commencement of procedures, conclusion of procedures, orders for tests, and/or the like). The bots may also present data in a proactive way. For example, if a bot determines that a load is preparing for discharge, the bot may present an interactive, adaptive checklist of discharge tasks for the resource subsystem.

In various aspects, disclosed embodiments may provide for resource subsystem member-specific chat interface adaptation. Resource subsystem member-specific chat interface adaptation may include system operational flow adaptation 1731-5 of particularized operational flows (e.g., workflows) for particular resource subsystem members. For each particular trigger event, the adaptive system 101 may initiate a particularized operational flow that is specific to the particular trigger event, load, and resource subsystem member. Thus, an operational flow interaction element may be directed to a resource subsystem member that is responsible for a particular task specified by the operational flow for the specific load condition that the adaptive system 101 determines (and/or event involving the load that the adaptive system 101 determines, such as regular load events (intake, discharge, etc.) and/or other events specific to (e.g., processes on) certain loads. In various embodiments, the operational flow interactions elements may correspond to any one or combination of a series of prompts configured to walk one or more of the resource subsystem members through a decision tree, a flowchart, an instructional narrative, a list, a graphical decision tree, a textual decision tree, and/or the like, which may correspond to procedure checklists and/or the like. Where additional information is required in certain circumstances, the operational flow can include a decision tree to gather information, e.g., information used in diagnosis with areas of resource input left to the resource. The operational flow may further provide for explanations describing the overall plan, tasks, resources, locations, and a corresponding timetable.

As part of the resource subsystem member-specific operational flow adaptation 1731-5, the operational flows may be automatically adapted by the adaptive system 101 as a function of a particular trigger event, load, and resource subsystem member. The adaptive system 101 may map a detected load condition and/or event to a set of one or more operational flows. The adaptive system 101 may refine the set of one or more operational flows as a function of resource subsystem members assigned to the load, each resource subsystem member having a particular role recognized and utilized by the adaptive system 101 to select particular operational flows of the set of one or more operational flows. For example, when the adaptive system 101 detects a particular load condition (e.g., sepsis) for particular load, the adaptive system 101 may select one operational flow for a particular resource assigned to the load and another operational flow for particular resource assigned to the load. Each of the operational flows may differ according to the role of the resource subsystem member (e.g., the operational flow for the resource may be contingent on resource input, whereas the operational flow for a resource may involve more routine tasks typical to the responsibilities of the resource).

Resource subsystem member-specific chat interface adaptation may include system adaptation of content particularized to resource subsystem members. This may include resource subsystem member-specific chat interface filtering 1731-6. With respect to operational flows, the adaptive system 101 may present the particularized operational flow to the attention of the resource in full via the chat room of the load (e.g., "@resourcename" along with the various interactive elements of the particular operational flow), and may present the particularized operational flow to the attention of the resource in full via the chat room of the load (e.g., "@resourcename" along with the various interactive elements of the particular operational flow), where the resource subsystem providers are identified based on the adaptive system-detected roles of the resource subsystem members. In some embodiments, each of the resource subsystem members may be presented with a different interface even though each interface corresponds to the same chat room. For example, the resource in the example may be presented with the full operational flow via the chat room interface, whereas the resource interface may not present the entire operational flow. Instead, the resource interface may either present no indication of the resource operational flow or present an abbreviated indication of the resource operational flow. The abbreviated indication of the resource operational flow may correspond to a brief description of the resource operational flow without the full interactive steps involved in the resource operational flow. Further, the abbreviated indication may indicate an operational flow status (e.g., any suitable indicator of the resource operational flow progress, such as "@resourcename Procedure X Not Started," "@resourcename Procedure X In Progress," or "@resourcename Procedure X Complete"). Likewise, in some embodiments, the resource interface may present either no indication of the resource operational flow or an abbreviated indication thereof. Accordingly, the chat room interfaces may be adapted to the particular resource with varying levels of detail tailored to the particular resource.

Further, having generated, developed, and/or otherwise used the load profile data 101B-1, the conferencing profile data 101B-2, the device profile data 101B-3 to develop the particularized pattern data 101B-4, the learning engine 118A may use the particularized pattern data 101B-3 to identify and automatically employ the best automatic chat interface customizations of the chat interface for the particular resource. The chat interface customizations may include content customizations 1731-7 and visual customizations 1731-8. With respect to other content presented in chat rooms, the resource subsystem member-specific chat interface adaptation likewise may include system adaptation of amounts of chat detail and/or types of chat detail as a function of resource subsystem members. With each load-specific chat room dedicated to a particular load, a large amount of chat detail can accumulate for a given chat room. However, not all resources need to see all the historical chatter captured in the chat room. Some roles need a micro level of detail, other roles only need a macro level of detail or a select set of chat details, and the levels of detail may vary with respect to the type of chat content. For example, certain resources only need to see a synopsis of certain types of chat content (e.g., load specifications and/or other indicators of load condition) and need not see other types of chat content (e.g., chat content regarding resource allocation changes and routine tasks). Thus, an interface presented for a resource may be different visually and content-wise from an interface presented for a resource. Likewise for one resource to the next, which could take specialty into account with the bot-performed customization. The adaptive system 101 may generate customized interface views and chat content that are a function of the resource role, the load, the context of the historical chat specific to the chat room, time (recency), and the load data.

For example, the adaptive system adaptation of amounts of chat detail and/or types of chat detail may include creating a summary of chat content pertinent to the particular resource accessing the particular chat room. As part of such operations, system adaptation of amounts of chat detail and/or types of chat detail may include the adaptive system 101 generating customized interface views and chat content that include chat content specifically directed to the resource (e.g., explicitly directed to the particular resource identifier, such as with indicators like "@resourcename"). To create a brief encapsulation of such chat communications, the adaptive system 101 may apply a time filter to the communications specifically directed at the resource. The time filter may, for example, only allow a window to only include such chat communications since the resource's last chat room access and/or to only include such communications that were not previously viewed by the resource.

This encapsulation, along with user-selectable options to reply to each chat communication, may allow the resource to quickly catch up on any communications directed to the resource. Such user-selectable options to reply to each chat communication in the encapsulation may provide for not only the reply by the resource, but also a repeat of the initial chat communication directed at the resource to which the resource may reply (e.g., which may include a copy and paste operation of the original chat communication directed to the resource). In some embodiments, the window may allow additional such chat communications beyond the resource's last chat room access and/or last viewing in order to provide more context when the adaptive system 101 detects a conversation thread between the resources based at least in part on indicators that chat communications are specifically directed to each resource and previous replies via user-selectable options. Thus, a resource's customized interface views and chat content may include chat content generated by that resource and any responses.

Additionally or alternatively, the summary of chat content may, for example, a quick synopsis of load specifications (e.g., load metric values) for the given chat room which may be created by the adaptive system 101 based at least in part on system selection of components input 1740. For example, the synopsis may include recent load metric values, such as load vitals, metric values generated by particular load monitoring devices currently monitoring the load. Such load metric values may again be selected by the adaptive system based at least in part on application of a time filter (e.g., since the resource's last chat room access and/or metric viewing). The time windowing of the load metric values may be supplemented with additional indicators of metric values gathered prior to the time window. For example, in addition to the load metric values within the time window (e.g., indicators of current muscle contraction intensities), the synopsis may include metric values of previous load metric values (e.g., indicators of averages, standard deviations, maximum levels, minimum levels, and so forth of previous muscle contraction intensities and/or the like). In some embodiments, the summary of chat content may be provided with one or more user-selectable options to jump to more data regarding load information, load metric values, and/or the like. In some embodiments, the synopsis may include one or more user-selectable options for each type of load-coupled device that was used to gather load-coupled device data for the load. For example, along with the synopsis, a user-selectable option to link and transition to a full chart, table, file, etc. of data for the load metric values may be provided so that the resource may inspect the full data set.

Additionally or alternatively, the summary of chat content may, for example, a quick synopsis of chat content in the given chat room which may be created by the adaptive system 101 based at least in part on system weighting of other indicators of load condition identified by the adaptive system 101 using components input 1740. As disclosed above, the adaptive system 101 may qualify load specifications according to a gradated scale, categorize load specifications according to a category scheme, score load specifications according to a load specifications scoring scheme, and/or the like in order to identify indicators of load conditions. The load specifications qualification operations may identify potential conditions that trigger execution of one or more particular adaptive controls 1731, such as an operational flow interaction 1731-2, operational flow adaptation 1731-5, and/or scaled notifications controls 1731-4. The synopsis may include indicators/descriptions of such conditions. Further, the synopsis may include any conditions and/or potential conditions identified by chat room input consequent to the adaptive system 101 detecting indicators of the conditions by way of language processing and recognition of the chat room input.

Additionally or alternatively, the summary of chat content may, for example, a quick synopsis of chat content in the given chat room which may be created by the adaptive system 101 based at least in part on system weighting of chat input. As disclosed above, the language processing by the adaptive system 101 may include correlating the keywords with keyword criteria that includes weighting assigned to words, word stems, phrase, word groupings, and/or the like according to significance. Increased word weights may be tied to increasing probability of significance of chat in the chat conversation and relevance to a particular resource and/or particular resource role. The adaptive system 101 may utilize word buckets/sets of high-correlation words, low-correlation words, and/or neutral words, that is, keyword information indicative, to varying extents of relevance and/or significance. With some word buckets/sets, the adaptive system 101 may score the relevance and/or significance with respect to a particular resource and/or particular resource role. For example, some chat conversation may be more significant and relevant to some resource roles than to other resource roles, and the adaptive system 101 may recognize those attributes. Similarly, some chat conversation may be more relevant to one resource of one specialty then to another resource of a different specialty, and the adaptive system 101 may likewise recognize such differences. Within each word bucket, various words may be assigned various weights according to their significance. Such word buckets may be implemented in any suitable manner, including word lists, word tables, matrices, and/or the like. And within a bucket, keywords may be organized in a rank order and/or any editable hierarchical structure according to weight. The adaptive system 101 may determine cumulative weights of one or more series of chat words and/or messages in order to determine whether the particular chat content satisfies one or more thresholds that trigger inclusion in a quick synopsis of chat content. The inclusion of the identified chat content in the synopsis may include a copy of the chat content, one or more replies to the chat content if applicable, or, worthy chat content corresponds to a reply, the previous chat content that prompts the reply. Such encapsulation may be provided with a user-selectable option to jump to the portion of the chat room thread that corresponds to the identified chat content, so that a resource viewing the quick synopsis may have the option to view the pertinent portion of the chat room thread in order to gather further context.

The summary of chat content may also include one or more indications of one or more system-identified operational flows particularized to the resource. As disclosed herein, the adaptive system 101 may map a operational flow that should be brought to the attention of the particular resource. In the summary of chat content, an abbreviated indication of the resource's need to perform one or more operational flow steps may be presented. The abbreviated indication may include a textual description of the operational flow (e.g., "@resourcename" along with one or more various interactive elements of the particular operational flow). The abbreviated indication in the chat content summary may also indicate an operational flow status (e.g., any suitable indicator of the resource operational flow progress, such as "@resourcename Procedure X Not Started," "@resourcename Procedure X In Progress," "@resourcename Procedure X Incomplete" or "@resourcename Next Step Y of Procedure X Incomplete"). The abbreviated indication may also be provided with a user-selectable option that links to a full presentation of one or more operational flow elements of the corresponding operational flow so that the resource may launch the operational flow and proceed through the operational flow steps via the chat room interface.

In various embodiments, the summary of chat content and other chat content provided by way of the chat room interface may be adapted for presentation to the resource in various ways. The interface could visually change the summary of chat content and/or relatively heavily weighted items flagged for the particular resource's attention to add emphasis by way of content and window positioning, modal windows, graphical characteristics, and the like. For example, as part of scaled notification features, the synopsis, indicators/descriptions of detected conditions, and/or tasks that the resource needs to complete may be presented with a modal window such that the resource must click through the modal window in order to access other aspects of the chat room interface.

As another example, the synopsis, indicators/descriptions of detected conditions, and/or tasks that the resource needs to complete may be centrally positioned with respect to the window, screen, panels, and/or the like of the presentation of the chat room interface in order to command the resource's attention. In such embodiments, one or more other chat room interface elements (e.g., the chat thread) may be temporarily positioned in a secondary position (e.g., on the side, behind, what below the centrally positioned window, panel, box, frame, etc.). After the resource clicks through one or more user-selectable options presented with the centrally positioned synopsis, indicators/descriptions of detected conditions, and/or tasks, the chat room interface may reconfigure presentation layout in order to present one or more of the other chat room interface elements (e.g., the chat thread) in a primary position (e.g., a central location). Various embodiments may utilize various other types of dynamic positioning of the chat interface elements in order to effect attention methods to present the synopsis, indicators/descriptions of detected conditions, and/or tasks. In some embodiments, the adaptive system 101 may detect the type of device that the resource is using to access the chat room interface and when the adaptive system 101 detects that the resource is utilizing a mobile device (e.g., a smart phone, a tablet, etc.), the adaptive system 101 may utilize the modal window attention method, whereas, when the adaptive system 101 detects that the resource is using a non-mobile device (e.g., a desktop computer, a workstation, etc.) the adaptive system 101 may utilize the dynamic positioning attention method. Such presentations may be presented when the resource accesses the chat room interface after a certain threshold time period of inactivity with respect to the chat room interface. Likewise, such presentations may be presented upon system-detection of a trigger event, in some cases, while the resource is active in the chat room.

With any one or a combination of the chat content customization features disclosed, some embodiments may additionally or alternatively transmit the customized content to an endpoint device 108 mapped to the resource via other media channels (e.g., other proprietary communication applications such as iMobile, SMS, MMS, email, fax, phone, and/or the like). In some embodiments, such content customizations may be sent in conjunction with the notification escalation features disclosed herein. Accordingly, various embodiments may provide the customized content in the conferencing environment and/or outside of the conferencing environment.

Various embodiments may further adapt chat room interface presentation according to priority particular to each resource subsystem member. The adaptive system 101 may implement one or more chat content qualification processes to determine prioritization of chat content items for the particular team member. The chat content items, for example, may include conditions and trigger events, operational flows and operational flow items, load metric values, and chat messages corresponding to the particular load and chat room. The chat content qualification may be executed when a resource initiates access to a particular chat room after a period of inactivity and/or no access. Accordingly, prioritization of one or more chat items may be updated and the presentation of the chat room may be adapted to command attention to the one or more chat items according to the updated prioritization when the resource initially accesses the chat room after the period of inactivity and/or no access. In various embodiments, the chat content qualification may be executed in real time as new items of components input 1740 are received or on a periodic basis. Accordingly, even as a resource is accessing a particular chat room, prioritization of one or more chat items may be updated and the presentation of the chat room may be adapted to command attention to the one or more chat items according to the updated prioritization.

The chat content qualification apply criteria for prioritizing chat content items. The criteria may specify rules and thresholds for various types of chat content items, including load conditions, operational flows, load metric values, and chat messages. For example, conditions qualified with a higher or score corresponding to a higher or lower probability that the condition exists, conditions qualified with a higher or lower score corresponding to a greater or lesser seriousness and/or urgency of the condition, operational flows qualified with a higher or lower correlation to such conditions, operational flows qualified with a higher or lower correlation to such conditions, operational flows qualified with temporal factors according to how soon operational flow tasks need to be accomplished, load metric values operational flows qualified with a higher or lower correlation to such conditions, default and/or critical load metric values, metric values previously selected for access by the particular resource, metric values mapped to the resource's role, metric values discussed by chat users, chat messages weighted according to significance, and/or the like. In some embodiments, the qualification could entail a prioritization scoring system where the chat content items are scored (e.g., with numerical expressions) according to any one or combination of the various factors disclosed herein and then organized in a rank order according to score. The ranked order may correspond to a precedence order in which the chat content items are presented and emphasized by the interface adaptation. The precedence order may be used by the adaptive system 101 determine the order in which items are to be presented and emphasized by way of content and window positioning, modal windows, graphical characteristics, and the like, as disclosed above.

Various embodiments may provide for intelligent recordation features 1731-9. The intelligent features 1731-9 may include one or a combination of creation, population, completion, and/or acceleration of load-specific recordation processes based at least in part on the components input 1740. Bots may monitor ongoing conversations in load-specific chat rooms in order to create, populate, complete, and accelerate recordation based at least in part on the conversations. Among other advantages, this approach may help to avoid double documenting. The adaptive subsystem 118 may correspond at least in part to a recordation acceleration subsystem that applies rules that define what type of recordation is required for different procedures, orders, etc. In addition to monitoring a chat room conversation, one or more bots can access a load data set and load-specific data (e.g., HL7 data) to at least partially complete the recordation and fill in the holes. For example, a surgery may be identified from the load data set and the conversation may be used to provide recordation relating to the operations.

Figure 18:
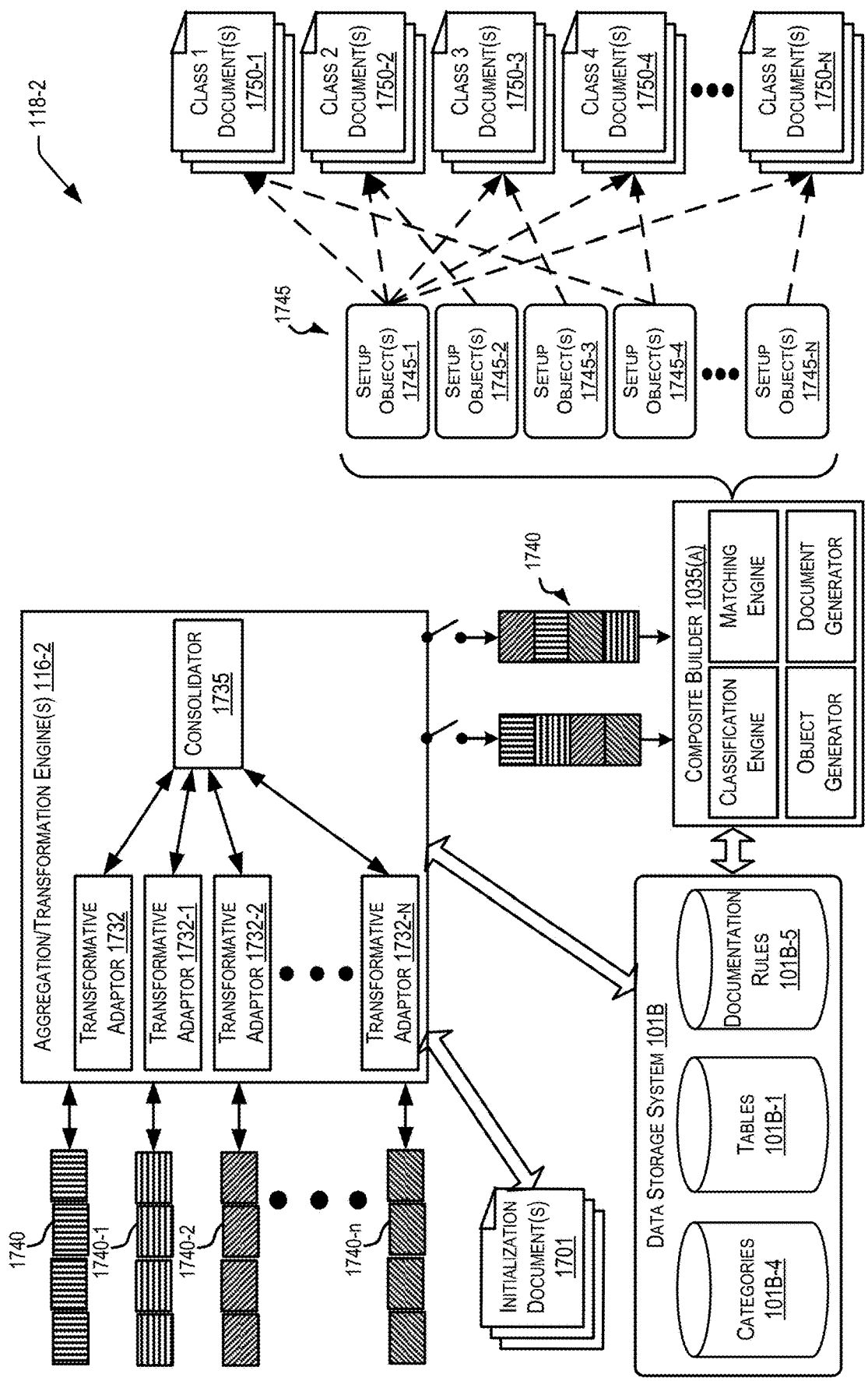
FIG. 18 illustrates a block diagram of certain aspects of the adaptive system that facilitate the documentation features, in accordance with embodiments of the present disclosure.

FIG. 18 depicts a diagram of certain aspects of the adaptive system 101 that facilitate the recordation features in accordance with present disclosure. The components input 1740 may be collected and processed by adaptive subsystem 118 at least partially to facilitate creation, population, completion, and acceleration of load-specific recordation. In some embodiments, the monitoring engine 116 may include or otherwise correspond to one or more aggregation and/or transformation engines 116. In various embodiments, the aggregation and/or transformation engines 116 may correspond to a single, integral engine or separate engines working in conjunction. The aggregation/transformation engines 116 may transform, translate, or otherwise adjust data collected. By way of example, the aggregation/transformation engines 116 may identify which data and data sets are about the same load, resource, entity, and/or the like, and may merge attributes from different sources into preliminary composites 1740 and particularized setup objects 1745 that can be used to create specific document instances of various document classes. In some embodiments, the aggregation/transformation engines 116 may include, for example, the one or more bots monitoring, parsing, and evaluating the user device input 1740-1, such as chat communications 134, sensor data 1740-2 detected by one or more of the sensors 130, and/or load-coupled device output 1740-3 from one or more of the components 106 to determine details about the message that fulfill message criteria mapped to load-specific recordation at least partially to facilitate the load-specific recordation operations. Likewise, the message extracts 1740-4 may be collected with one or more agents, the agent engine 118C, and/or the learning engine 118A parsing and evaluating the messages to determine details about the message that fulfill message criteria mapped to load-specific recordation and create the message extracts 1740-4 at least partially to facilitate the load-specific recordation operations.

The language processing disclosed above may include applying one or a combination of keyword criteria, keyword schemas, word buckets/sets, and/or the like mapped to load-specific recordation. For example, different keyword schemas may be tailored to different document categories 101B-4 with category-specific keyword lexicons. Category-specific tags or any other suitable means of linking, for example, via a code system, may be used to associate category-specific keyword schemas to specific document categories 101B-4. The adaptive subsystem 118 may utilize keyword information indicative and scored to varying extents of relevance and/or significance to the load-specific recordation and recognize particular communication content as triggers for recordation operations.

In some embodiments, the data corresponding to the input 1740 acquired may be in different formats, according to different data standards, in different document structures, including different types of data, etc. The data 1740 can then be transformed, translated, or otherwise adjusted by the engines 116. For example, acquired data may be converted from a first format to a second format using one or more conversion rules, which may be user-defined, heuristic, and/or machine-learned. In some embodiments, the engines 116 may perform similar operations with respect to other data generated by elements of the architecture. In some embodiments, the aggregation and/or transformation engines 116 may correspond at least in part to one or more of transformative integration engine 108, transaction management engine 106, aggregation engine 218, 420, third party aggregation engine 422, and/or interoperability engine 502.

In some embodiments, the aggregation and/or transformation engines 116 may include one or more transformative adaptors 1732. In some embodiments, one or more transformative adaptors 1732 may be associated with the content acquisition interfaces to effect the transformations. The transformative adaptors 1732 may be implemented, in various embodiments, in hardware and/or software. In some embodiments, a transformative adaptor 1732 may include a hardware device and/or software component that transforms, translates, converts, or otherwise adjusts the acquired data 1740. In some embodiments, the one or more transformative adaptors 1732 may correspond at least in part to one or more of adaptors 424, 426, 428.

In some embodiments, various processors and/or layers within the adaptive system 101 may can be specialized to perform various types of tasks. For example, a first set of processors may be configured to transform the data 1740 within a stream in real-time (e.g., to produce data in a standard format and/or one that corresponds to an alert, notification, and/or report protocol) and detect (e.g., based at least in part on data included in a header of a data element) whether the transformed data includes one or more particular types of data. In various embodiments, the first set of processors may utilize the transformative adaptors 1732 to effect the transformation and/or may further transform the data beyond first-stage transformations by the transformative adaptors 1732.

The aggregation/transformation engines 116 may process manifold data sets that may, for instance, come from different sources or the same source, for example, by way of one or more updates to data previously provided by a particular source, and the consolidator 1735 may consolidate the data sets to form a preliminary composite 1740. The consolidation may include applying one or more filtering techniques (or one or more filters) to the data sets, organizing, categorizing, qualifying, and/or comparing the sets of information; detecting, identifying, and/or handling errors/discrepancies; identifying redundancies; removing redundancies; discarding data irrelevant to setup object building for particular loads, resources, and operations; and/or otherwise processing the data sets. The consolidator 1735 may determine whether each element includes a data pattern that may be consistent with one or more defined protocols. A protocol may define a data pattern as one that includes, for example, one or more particular data elements and/or types of data elements. The consolidator 1735 may identify one or more applicable protocols (e.g., based at least in part on source identifier, metadata, a current time, a stream identifier, etc.).

In some embodiments, the consolidation may be performed upon detection of one or more particular data elements 1740. One or more first-stage processors of the engines 116, which may correspond to the consolidator 1735, may form one or more preliminary composites 1740 from consolidated data. The one or more first-stage processors may transmit the one or more preliminary composites 1740 (or replicated versions thereof) to one or more second-stage processors, which may correspond to a composite builder 1735(a). The composite builder 1735(a), which may or may not be integral with the engines 116 in various embodiments, may build particularized setup objects 1745. The composite builder 1735(a) may be configured to perform extraction, apply a rule to process the extracted data element, request, and/or retrieve supplemental data from a remote data source 1038, and/or develop setup objects 1745 with the supplemental data. Further, in some embodiments, the composite builder 1735(a) may include a classification engine and a matching engine configured to facilitate classifying and matching features disclosed herein.

In some embodiments, the composite builder 1745(a) may pull from the data stores 101B stored setup objects 1745, previously created by the composite builder 1735(a), to update the stored setup objects 1745 based at least in part on data 1740 newly received and processed. In some embodiments, the composite builder 1745(a) may pull from the data stores 101B data pertinent to the setup object 1745 to supplement data 1740 newly received and processed in order to create and/or update the setup object 1745. In some embodiments, the supplemental data can include, for example, template data and/or data previously collected and pertinent to forming a chronicle, load specifications/metric values, task specifications, resource specifications, and/or the like. Thus, the composite builder 1745(a) may use previously stored data and newly collected data 1740 to form and update the setup objects 1745. In some embodiments, the composite builder 1735(a) may transform the preliminary composites 1740 into understandable data, information, and/or content so that the setup objects 1745 contains the transformed data for surfacing at client devices as alerts, notifications, reports, and instances of documents 1750 according to the document categories 101B-4.

In some embodiments, the composite builder 1735(a) may attenuate, blur, and/or remove particular elements of the preliminary composites 1740. Blurring an element may include, for example, assigning a numeric composite value to a numeric bin, scrambling letters, assigning a numeric composite value to a functional category, etc. As another example the composite builder 1735(a) may selectively permit particular elements to pass according to one or more rules and/or based at least in part on what data may be required to build the setup objects 1745, an original source of a data element, a value (e.g., identifying a location, time stamp, or institution) associated with the data element, a destination, a current time, and/or the like.

The adaptive subsystem 118 may compile and consolidate the collected and processed data for a particular load into one or more tables 101B-1, which the adaptive subsystem 118 can use to create the specific recordation setup object of the different types. One or more initialization documents 1701 may include specifications for a plurality of document classes. The specifications may correspond to default specifications, system-derived parameters, general defaults, and/or entity-specific defaults, but the one or more initialization documents 1701 may be accessible via a user interface for modification and customization. Each of the specifications may correspond to document categories 101B-4 and entity categories. The document categories 101B-4 may be classified and coded according to document type and document subtype. Seeded document and entity defaults may be pre-seeded in the adaptive system. Using the example insurance-related recordation, for each carrier, the seeded defaults may specify one or a combination of procedure and treatment identification requirements with certain coding and other carrier-specific requirements. Other embodiments may include other attributes pertaining to document and entity defaults specified as seeded defaults.

The adaptive subsystem 118 may be configured to use recordation rules 101B-5, which may include any combination of rules to facilitate the features specific to particular entities, document types, document categories 101B-4, and/or the like. The rules 101B-5 may include mapping rules governing the handling of configuration and/or enforcement of data for various attributes to document setup objects. The rules 101B-5 may include a multiplicity of seeded defaulting rules and entity-specific rules to automatically generate necessary information to use in conjunction with underlying tables 101B-1 so that the setup objects are created and populated in a manner that follows appropriate category-specific and entity-specific rules.

The adaptive subsystem 118 may automatically utilize the data populated in the tables 101B-1 to create, populate, and/or update the setup objects for each document class according to the recordation class specifications of the one or more initialization documents 1701, the categories 101B-4, the document rules 101B-5, and/or metadata associated therewith. In various embodiments, a particularized setup object 1745 may include manifold components. For example, the manifold components may include one or more of a chronicle, load specifications, task specifications, resource specifications, and/or the like. A chronicle may include temporally keyed and/or demarcated index of past and current data with respect to a particular load. The chronicle may, for example, include time-annotated and date-annotated events pertinent to the load chronologically indexed since origination of the load within the interaction system 100. For example, the chronicle may be created upon admission of a load, and may be developed with attendance in ER, transfers to a room and/or bed, arrival of an orderly, examination by a resource, transfers to different units or facilities for particular treatments or tests, and/or the like. Load specifications may include specifications of load identifiers, load metrics, load characteristics, a pertinent history feature, resource needs, a load condition, a symptom, a diagnosis, a date, a time, a test, test result, and/or the like. Task specifications may include parameters specifying performed tasks (e.g., with a task type), resource subsystem members involved in the performance, and corresponding dates of performance of the tasks. Resource specifications may include parameters specifying one or more particular resources needed to effect operations specified by the task specifications for the particular load. The composite builder 1735(*a*) may update one or more of the manifold composites, and, hence, the setup objects 1745, in real time, periodically, or when triggered by certain events with respect to the particular load. The composite builder 1735(*a*) may generate one or more feeds of particularized setup objects 1745 transferred to one or more data stores 101B.

With the data and metadata populated into respective setup objects, the composite builder 1735(*a*) may utilize the setup objects, including data and metadata populated therein, to create instances of load-specific documents 1750 of various classes according to the document categories 101B-4. The document generator of the composite builder 1735(*a*) may create the documents 1750 in a manner that is compliant with each respective set of recordation specifications. The created recordation may be transmitted to one or more destinations. An address of a destination (e.g., an IP address) may be specified within a rule and/or protocol. Filtered and/or unfiltered, supplemented, and/or un-supplemented data elements can be transmitted to a destination via a discrete and/or continuous transmission. Exemplary types of transmission include, for example, transmission via messages (e.g., email messages, SMTP, or faxes), or file transfer (e.g., via FTP, SSH or other file transfer protocol). A transmission may include one to a single or to multiple defined destinations and/or, in some instances, a broadcast transmission. A transmission may occur, for example, repeatedly, continuously and/or upon detecting a particular event. An event may include, for example, a particular time, passage of a particular time period since a last transmission, detecting one (or a threshold number) of data elements ready for transmission, and/or receiving a request for the data. Such transmissions may include, for example, specifications of one or more task-performance locations, one or more task-performance times, a task duration, assignment and scheduling of resources corresponding to the tasks, and/or the like to initiate and cause resource allocation to facilitate task performance.

Accordingly, with embodiments of this disclosure, cumbersome and time-consuming processes, involving separate manual steps to create load-specific recordation are not necessary. Disclosed embodiments may provide a solution that is particularly advantageous by accelerating setups that factor in entity-specific recordation requirements. Disclosed embodiments improve the functioning of a computer system that accelerates system recordation conformance to differentiated requirements of multiple entities.

Therefore, the embodiments according to the present disclosure are well adapted to attain the ends, improvements, and advantages mentioned as well as those that are inherent therein. Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations may be performed in parallel or concurrently. In addition, the order of the operations may be re-arranged. A process is terminated when its operations are completed, but may have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" may include, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed:

1. A method for processing data streams to selectively transmit content to endpoint devices to facilitate conferencing, the method comprising:
   receiving, via one or more networks, a plurality of electronic communications from endpoint devices;
   segregating and routing electronic communications of the plurality of electronic communications to facilitate a plurality of conferencing environments based at least in part on a configuration of each conferencing environment of the plurality of conferencing environments being mapped to a digital identifier corresponding to a patient and a particular population of two or more resource identifiers,
      each resource identifier of the particular population of two or more resource identifiers corresponding to authenticated access to at least one of the electronic communications addressed to the conferencing environment;
   listening for data changes in one or more data streams, each data stream of the one or more data streams comprising medical data that is generated by a medical device;
   detecting a load condition from the data changes based on one or more trigger events that specify criteria for detecting the load condition;
   mapping the load condition to a particular digital identifier and a particular conferencing environment corresponding to the particular digital identifier;
   identifying a resource specification that corresponds to the load condition; and
   consequent to determining that the resource specification corresponds to the load condition, automatically identifying at least one resource identifier that corresponds to the resource specification, and automatically updating the particular conferencing environment, the automatically updating comprising:
      reconfiguring the configuration of the particular conferencing environment to grant authenticated access to the identified at least one resource identifier such that the identified at least one resource identifier is added to the particular population of two or more resource identifiers corresponding to the particular conferencing environment;
      composing content based at least in part on the load condition; and
      transmitting the content to a plurality of endpoint devices mapped to the particular population of three or more resource identifiers corresponding to the particular conferencing environment.

2. The method for processing data streams to selectively transmit content to endpoint devices to facilitate conferencing as recited in claim 1, where the updating the particular conferencing environment further comprises:
   reconfiguring conferencing parameters of the particular conferencing environment, where the content indicates the reconfigured conferencing parameters.

3. The method for processing data streams to selectively transmit content to endpoint devices to facilitate conferencing as recited in claim 2, where:
   the reconfiguring conferencing parameters corresponds to selectively prohibiting authenticated access of at least one resource identifier from a prior instance of the particular population; and
   transmitting content that corresponds to a subsequent instance of the particular population such that the content is not transmitted to an endpoint device mapped to the at least one resource identifier from the prior instance of the particular population.

4. The method for processing data streams to selectively transmit content to endpoint devices to facilitate conferencing as recited in claim 1, the method further comprising:
   identifying an action plan based at least in part on the load condition, the action plan specifying one or more actions responsive to the load condition, where:
      the load condition corresponds to at least one condition indicated by one or more of the data changes; and
      the content indicates the action plan.

5. The method for processing data streams to selectively transmit content to endpoint devices to facilitate conferencing as recited in claim 1, where the listening for the data changes in the one or more data streams comprises:
   monitoring a data network that is external and separate from the plurality of conferencing environments and the electronic communications corresponding to the conferencing environments, where the data changes are detected consequent to the monitoring; and
   recognizing a pattern from the data changes from the data network, where the pattern corresponds to one or more state changes.

6. The method for processing data streams to selectively transmit content to endpoint devices to facilitate conferencing as recited in claim 1, where the listening for the data changes in the one or more data streams comprises:
   monitoring patient specifications from one or more sensor devices that are configured to detect phenomena corresponding to respective patients of a plurality of patients, where the data changes correspond to the patient specifications detected consequent to the monitoring; and
   recognizing at least one trigger event of the one or more trigger events from the patient specifications, where the at least one trigger event corresponds to one or more state changes.

7. An adaptive communications and control system to process data streams to selectively transmit content to endpoint devices to facilitate conferencing, the adaptive communications and control system comprising:
   one or more network interfaces;
   memory configured to store computer-executable instructions; and
   one or more processing devices in communication with the memory and configured to execute the computer-executable instructions to perform operations comprising:
      processing a plurality of electronic communications received, via one or more networks, from endpoint devices;
      segregating and routing electronic communications of the plurality of electronic communications to facilitate a plurality of conferencing environments based at least in part on a configuration of each conferencing environment of the plurality of conferencing environments being mapped to a digital identifier corresponding to a patient and a particular population of two or more resource identifiers,
- each resource identifier of the particular population of two or more resource identifiers corresponding to authenticated access to at least one of the electronic communications addressed to the conferencing environment;
- listening for data changes in one or more data streams, each data stream of the one or more data streams comprising medical data that is generated by a medical device;
- detecting a load condition from the data changes based on one or more trigger events that specify criteria for detecting the load condition;
- mapping the load condition to a particular digital identifier and a particular conferencing environment corresponding to the particular digital identifier;
- identifying a resource specification that corresponds to the load condition; and
- consequent to determining that the resource specification corresponds to the load condition, automatically identifying at least one resource identifier that corresponds to the resource specification, and automatically updating the particular conferencing environment, the automatically updating comprising:
  - reconfiguring the configuration of the particular conferencing environment to grant authenticated access to the identified at least one resource identifier such that the identified at least one resource identifier is added to the particular population of two or more resource identifiers corresponding to the particular conferencing environment;
  - composing content based at least in part on the load condition; and
  - transmitting the content to a plurality of endpoint devices mapped to the particular population of three or more resource identifiers corresponding to the particular conferencing environment.

8. The adaptive communications and control system to process data streams to selectively transmit content to endpoint devices to facilitate conferencing as recited in claim 7, where the updating the particular conferencing environment further comprises:
- reconfiguring conferencing parameters of the particular conferencing environment, where the content indicates the reconfigured conferencing parameters.

9. The adaptive communications and control system to process data streams to selectively transmit content to endpoint devices to facilitate conferencing as recited in claim 8, where:
- the reconfiguring conferencing parameters corresponds to selectively prohibiting authenticated access of at least one resource identifier from a prior instance of the particular population; and
- transmitting content that corresponds to a subsequent instance of the particular population such that the content is not transmitted to an endpoint device mapped to the at least one resource identifier from the prior instance of the particular population.

10. The adaptive communications and control system to process data streams to selectively transmit content to endpoint devices to facilitate conferencing as recited in claim 7, the operations further comprising:
- identifying an action plan based at least in part on the load condition, the action plan specifying one or more actions responsive to the load condition where:
  - the load condition corresponds to at least one condition indicated by one or more of the data changes; and
  - the content indicates the action plan.

11. The adaptive communications and control system to process data streams to selectively transmit content to endpoint devices to facilitate conferencing as recited in claim 7, where the listening for the data changes in the one or more data streams comprises:
- monitoring a data network that is external and separate from the plurality of conferencing environments and the electronic communications corresponding to the conferencing environments, where the data changes are detected consequent to the monitoring; and
- recognizing a pattern from the data changes from the data network, where the pattern corresponds to one or more state changes.

12. The adaptive communications and control system to process data streams to selectively transmit content to endpoint devices to facilitate conferencing as recited in claim 7, where the listening for the data changes in the one or more data streams comprises:
- monitoring patient specifications from one or more sensor devices that are configured to detect phenomena corresponding to respective patients of a plurality of patients, where the data changes correspond to the patient specifications detected consequent to the monitoring; and
- recognizing at least one trigger event of the one or more trigger events from the patient specifications, where the at least one trigger event corresponds to one or more state changes.

13. One or more non-transitory, machine-readable media storing machine-executable instructions that, when executed by one or more computer systems, cause the one or more computer systems to perform operations comprising:
- processing a plurality of electronic communications received, via one or more networks, from endpoint devices;
- segregating and routing electronic communications of the plurality of electronic communications to facilitate a plurality of conferencing environments based at least in part on a configuration of each conferencing environment of the plurality of conferencing environments being mapped to a digital identifier corresponding to a patient and a particular population of two or more resource identifiers,
  - each resource identifier of the particular population of two or more resource identifiers corresponding to authenticated access to at least one of the electronic communications addressed to the conferencing environment;
- listening for data changes in one or more data streams, each data stream of the one or more data streams comprising medical data that is generated by a medical device;
- detecting a load condition from the data changes based on one or more trigger events that specify criteria for detecting the load condition;
- mapping the load condition to a particular digital identifier and a particular conferencing environment corresponding to the particular digital identifier;
- identifying a resource specification that corresponds to the load condition; and
- consequent to determining that the resource specification corresponds to the load condition, automatically identifying at least one resource identifier that corresponds to the resource specification, and automatically updating the particular conferencing environment, the automatically updating comprising:
reconfiguring the configuration of the particular conferencing environment to grant authenticated access to the identified at least one resource identifier such that the identified at least one resource identifier is added to the particular population of two or more resource identifiers corresponding to the particular conferencing environment;
composing content based at least in part on the load condition; and
transmitting the content composite to a plurality of endpoint devices mapped to the particular population of three or more corresponding to the particular conferencing environment.

14. The one or more non-transitory, machine-readable media as recited in claim 13, where the updating the particular conferencing environment further comprises:
reconfiguring conferencing parameters of the particular conferencing environment, where the content indicates the reconfigured conferencing parameters.

15. The one or more non-transitory, machine-readable media as recited in claim 14, where:
the reconfiguring conferencing parameters corresponds to selectively prohibiting authenticated access of at least one resource identifier from a prior instance of the particular population; and
transmitting content that corresponds to a subsequent instance of the particular population such that the content is not transmitted to an endpoint device mapped to the at least one resource identifier from the prior instance of the particular population.

16. The one or more non-transitory, machine-readable media as recited in claim 13, the operations further comprising:
identifying an action plan based at least in part on the load condition, the action plan specifying one or more actions responsive to the load condition, where:
the load condition corresponds to at least one condition indicated by one or more of the data changes; and
the content indicates the action plan.

17. The one or more non-transitory, machine-readable media as recited in claim 13, where the listening for the data changes in the one or more data streams comprises:
monitoring a data network that is external and separate from the plurality of conferencing environments and the electronic communications corresponding to the conferencing environments, where the data changes are detected consequent to the monitoring; and
recognizing a pattern from the data changes from the data network, where the pattern corresponds to one or more state changes.

* * * * *